US008063925B2

(12) United States Patent
Tainer et al.

(10) Patent No.: US 8,063,925 B2
(45) Date of Patent: Nov. 22, 2011

(54) THERMAL OR DENSITY MANAGEMENT OF IMAGING DEVICE

(75) Inventors: Christopher Tainer, Strongsville, OH (US); Jeremy Audino, Cleveland Heights, OH (US); James Bias, North Royalton, OH (US)

(73) Assignee: Codonics, Inc., Middleburg Heights, OH (US)

(*) Notice: Subject to any disclaimer, the term of this patent is extended or adjusted under 35 U.S.C. 154(b) by 1096 days.

(21) Appl. No.: 11/890,845

(22) Filed: Aug. 8, 2007

(65) Prior Publication Data

US 2007/0280710 A1 Dec. 6, 2007

Related U.S. Application Data

(63) Continuation of application No. 10/720,040, filed on Nov. 21, 2003, now Pat. No. 7,264,323.

(60) Provisional application No. 60/428,777, filed on Nov. 22, 2002.

(51) Int. Cl.
*G01D 15/16* (2006.01)

(52) U.S. Cl. ........................................ 347/183; 347/184

(58) Field of Classification Search .................. 347/171, 347/183, 184, 186, 188, 190–195
See application file for complete search history.

(56) References Cited

U.S. PATENT DOCUMENTS

| | | | | |
|---|---|---|---|---|
| 4,386,360 | A * | 5/1983 | Murayama et al. | 347/186 |
| 5,365,257 | A * | 11/1994 | Minowa et al. | 347/194 |
| 5,992,979 | A | 11/1999 | Barbour et al. | |
| 6,249,299 | B1 * | 6/2001 | Tainer | 347/191 |
| 6,597,385 | B2 * | 7/2003 | Verdyck | 347/171 |
| 6,801,234 | B2 | 10/2004 | Nishimura | |
| 2003/0193537 | A1 | 10/2003 | Tang | |

* cited by examiner

*Primary Examiner* — Kristal Feggins
(74) *Attorney, Agent, or Firm* — Pearne & Gordon LLP

(57) ABSTRACT

A multi-media printer includes an engine controller, a printhead controller, and a pulse activation table. The engine controller transmits a row of energy values. The printhead controller receives the row of energy values and transmits an activation signal. The activation signal is transmitted based on a comparison of an activating energy level for each pulse position in a pulse stream with the energy values in the row of energy values. Comparison logic performs the comparison and transmits an activation signal if the energy value for the row of energy values is greater than or equal to the activating energy level for the corresponding pulse positions.

27 Claims, 23 Drawing Sheets

THERMAL OR DENSITY MANAGEMENT OF IMAGING DEVICE

RELATED APPLICATIONS

This application is a continuation application of U.S. patent application Ser. No. 10/720,040, filed Nov. 21, 2003, now U.S. Pat. No. 7,264,323, which claims priority from U.S. provisional patent application Ser. No. 60/428,777, filed Nov. 22, 2002.

BACKGROUND OF THE INVENTION

1. Field of the Invention

The invention is generally directed to print enhancements in multi-media printers. Specifically, the invention is directed to speed and image quality advancements in thermal imaging technology, i.e., direct thermal and thermal transfer technologies in particular.

2. General Description of Background

In the medical imaging marketplace, the standard for digital image quality is wet laser imaging. In wet laser imaging, a modulated laser beam is scanned across light-sensitive film to draw the desired image on the film. The film is developed utilizing wet chemical baths, which develop and fix the image onto the film media. The image produced utilizing wet laser imaging is of high quality.

Health or medical images can also be produced or rendered utilizing a thermal printing process. In a direct thermal printing process, a thermally-responsive media is translated across a thermal printhead, and the thermal printhead is modulated to produce energy and temperature profiles to cause the media to respond to and produce desired gray levels (image densities).

Health or medical images can also be produced or rendered utilizing a thermal transfer printing process. In a thermal transfer printing process, a color-containing membrane, or "donor," is placed or sandwiched between the thermal printhead and a "receiver" sheet of media. The donor sheet is impregnated with color or black dyes, inks, or waxes. The donor and receiver sheets are translated together across the thermal printhead, and the thermal printhead is modulated to produce energy and temperature profiles to cause the color or black carrier materials to leave the donor sheet and enter or attach to the receiver media to produce desired gray or color levels (image densities).

The thermal printhead is a linear array of thermal heating elements. Thus, an entire line of dots or pixels can be marked on the thermally-responsive media in parallel. The time it takes to mark a print line is referred to as a "line time." Within a line time, a number of pixels, ranging from fewer than 1,000 and to more than 10,000, are marked in a row or line normal to the direction of the thermally-responsive media motion. The number of dots or pixels is typically equal to or less than the number of thermal heating elements on the printhead. The line time determines how fast the media can be moved across the printhead. In other words, the shorter the line time, the faster the media can be moved across the printhead, and the faster a full image sheet can be rendered or printed.

Thermal printing technologies have constraints on line time. In direct thermal printing, the media must be heated long enough for the heat to fully penetrate the emulsion and to allow the chemical reaction to occur. In the case of thermal transfer, the heat must be applied long enough for the dye, ink, or wax migration to occur. If the printing occurs too fast, with either technology, heat penetration and dwell times are not long enough, and grainy printing results because the heat accumulates at the peaks of the media surface and does not penetrate evenly into the low points.

Also, direct thermal printing media requires a certain dwell time in order for the intrinsic chemical reaction to go to completion. If the printing is occurring too fast, the chemical reactions cannot go to completion or they react in a manner that is complete, but result in slightly different chemical products. For example, if the printing is occurring too quickly, a purple or magenta hue will result, and if the printing is occurring too slowly, a neutral or greenish hue will result. In the medical imaging marketplace, neutral or greenish hues are favored because these hues match wet laser film. Thus, printing faster is normally at odds with a desirable color tone.

In addition, thermal transfer printing media requires a certain dwell time to allow the inks or dyes to penetrate deeply into the receiver media sheet. If the inks or dyes do not penetrate deeply enough, archival life and image stability are compromised. For instance, inks that have not penetrated deeply enough into the receiver sheet are more likely to be wiped off during handling or are more likely to diffuse out of the receiver sheet and into other sheets or materials that the receiver sheet comes in contact with.

Achieving medical image quality with a thermal printer requires compensation for the thermal storage elements in the printing system. Achieving this quality on different media types and at different print speeds requires an added measure of flexibility and performance. Thermal printing involves the application of energy to the thermal elements of the printhead. The energy applied to these thermal elements is not completely transferred into the media. Some or most of the energy applied to the thermal elements via the pulse streams are transferred from the thermal elements into the substrate of the printhead and its heatsink and then out of the heatsink through the use of forced or convected air. Because of this unintended transfer, the printhead components rise in temperature and have temperature gradients. This means that the thermal elements have different operating conditions when heating is performed for marking a line of an image. These conditions include, for example, the initial temperature of the thermal elements, the temperature of the substrate and printhead constructions behind the thermal elements, the rate of heat flow out of the thermal elements into their surroundings, and the fraction of heat that flows into the media versus the substrate. All of these factors affect marking density and must be counteracted if acceptable diagnostic medical printing is to result.

Artifacts that result from these thermal storage behaviors include the following: 1) large gradients from the top of the page to the bottom in which the measured density increases down the page as the printhead assembly components heat up; 2) vertical smearing effects in which a dark area of an image heats a local area of the printhead, causing subsequent marking for succeeding rows to be darker. This is especially noticeable when a dark area is followed by a light area or vice-versa; 3) horizontal crosstalk in which heat is transferred along the length of the printhead, causing the marking in one area of the page to affect density in neighboring areas of the page; 4) horizontal crosstalk in which the energy applied to individual thermal elements is shared with neighboring thermal elements based on temperature differences, resulting in loss of fine-resolution contrast; 5) pixel-sized artifacts in which a fast transition from light to dark or dark to light is required, and the thermal mass of the thermal elements does not allow such a fast transient (this is most visible when printing very fine detail, especially textual information in the image); and 6) artifacts resulting from the increase in printhead bow (curvature along its length) as the printhead heats up during the course of marking a page of media.

Traditional approaches to compensating for thermal memory in the thermal elements involves the application of a fixed matrix of coefficients that are multiplied by the image energy values that border and precede the pixel in question. This is commonly known in the art as "dot history compensation." The products of these energy values and coefficients are summed and the result is applied to the pixel energy value in question to provide a compensation that takes neighboring energy values and historical energy values into account. While this approach can provide limited success, it does not provide density uniformity that is in line with medical market expectations. It is also difficult to tune and make effective for all types of images produced. This is because the size of the matrix is limited for performance reasons, limiting the size of the artifacts that can be compensated, because determining effective values for the matrix coefficients is difficult and increases exponentially with the number of historical pixels to be considered, and because it does not effectively account for the physical properties of the thermal printing system.

Medical diagnostic imaging requires print engines to be able to produce large numbers of distinct gray levels ranging from minimum to maximum density. The gray levels are produced by applying a large number of on and off pulses to each printhead thermal element within each line time. The large number of pulses may be referred to as a pulse stream. For example, in order to produce 512 gray levels per image pixel, a multi-media printer must be able to provide at least 512 pulses to the thermal elements over and above the pulse times used to reach the minimum marking energy or blush energy. The time duration of a single pulse is referred to as a pulse time. The minimum marking energy or blush energy may be referred to as Dmin. Normally, this results in 1024 pulse times within a line time. In order to achieve 4096 gray levels, which is the standard that wet imager manufacturers claim is produced by the wet laser film process, an equivalent of 8000 pulses would have to be produced in a line time.

An alternative for achieving the 4096 gray levels with less than 8000 pulses involves utilizing a bias pulse with a length equivalent of 4096 pulses and applying the bias pulse to all thermal elements, regardless of gray level, to get the thermal elements up to blush temperature. Thus, streams of 4096 pulses could be applied to each data line for each thermal element of the printhead in parallel. This would require data transmission of 4096 bits of information per printhead thermal element within a line time. Unfortunately, the current state of printhead technology does not allow 4096 bits of information to be transmitted within a 5 ms line time because this large amount of data would have to be transferred to the printhead in too small of a time. This alternative would require 500 data lines running at 16 Megahertz (16 Mhz), in parallel. The use of this many data lines is expensive. In addition, data integrity and emission issues are also present due to the number of data lines operating at such a high speed.

Therefore, it is desirable to develop technologies that provide faster than normal printing and also still provide clinically acceptable tone on different media types. The technology also should produce minimal graininess on many media types.

These technologies would allow use of higher-resolution printheads. An embodiment of the new technologies allows a 14×17 inch film to be marked within 25 seconds at 500 dots per inch using two 16 Megahertz data lines while still providing 4096 gray levels. This is compared to current technology which would require 1200 data lines running at 16 MHz to be connected to the printhead. At these speeds, and allowing extra time to pick, feed, and eject the media, this embodiment provides the printing of 90 or more films per hour at resolutions higher than 500 dpi. In addition to the very high print speed this constitutes a reduction in data line count of more than two orders of magnitude.

DETAILED DESCRIPTION OF THE DRAWINGS

FIG. 4(*b*) illustrates a large, wide heating element according to an embodiment of the present invention;

Figure 12:
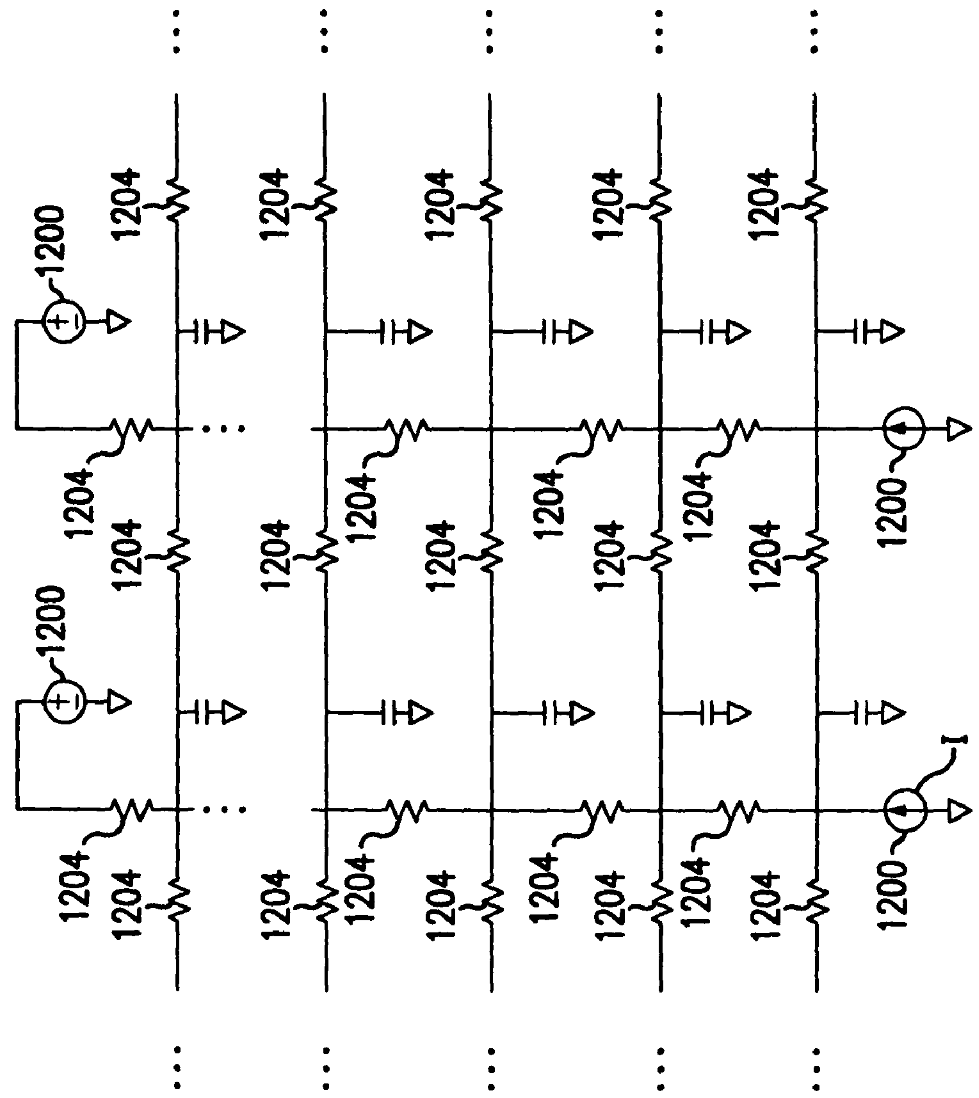
FIG. 12 illustrates an electrical equivalent of the software thermal printhead model.
Figure 12A:
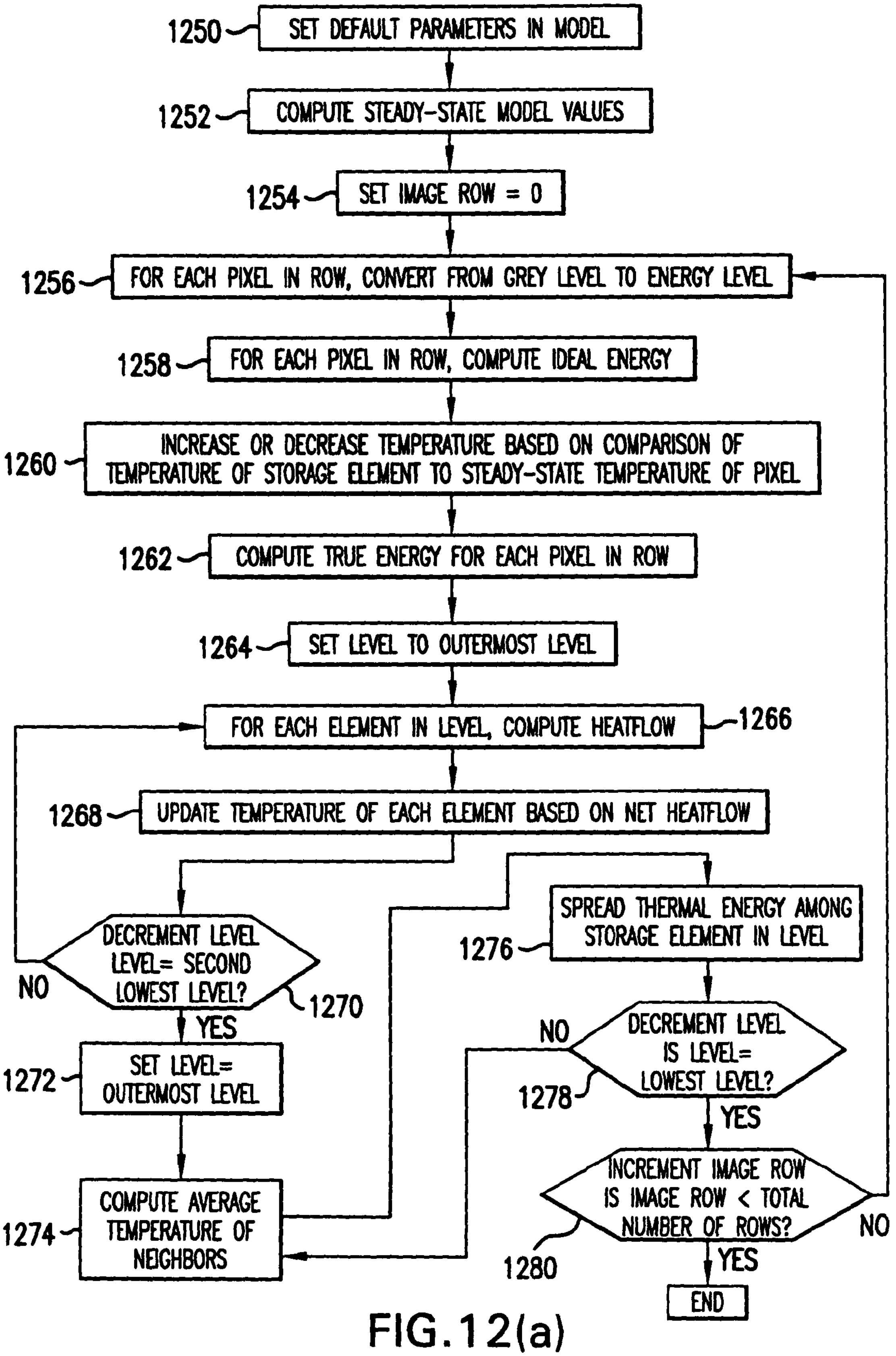
Figure 13A:
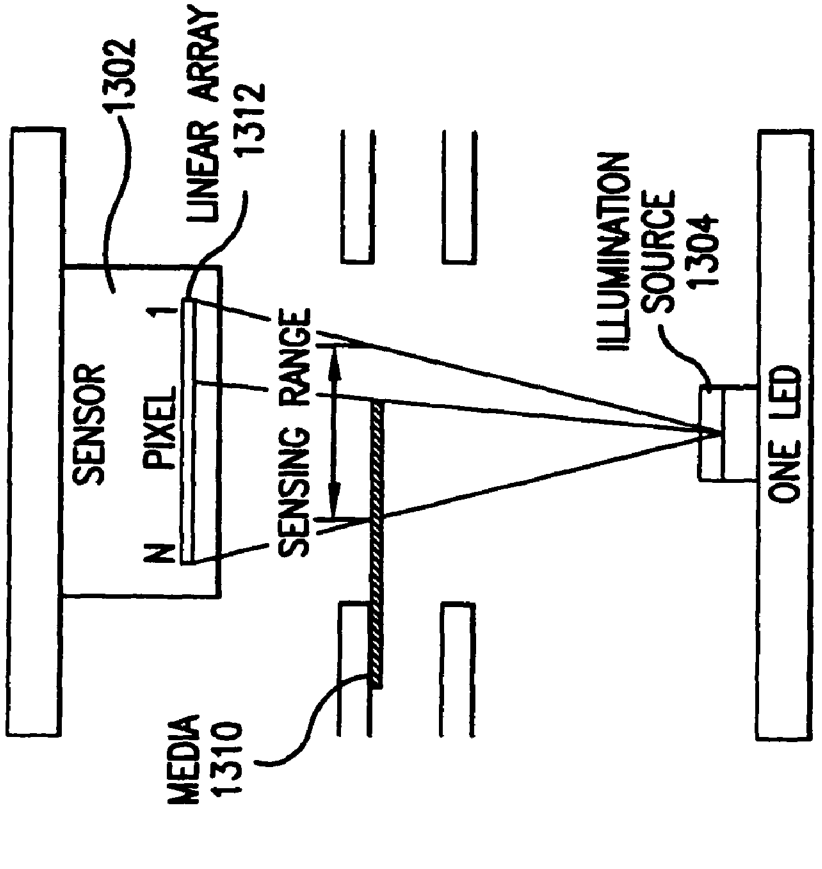
Figure 13B:
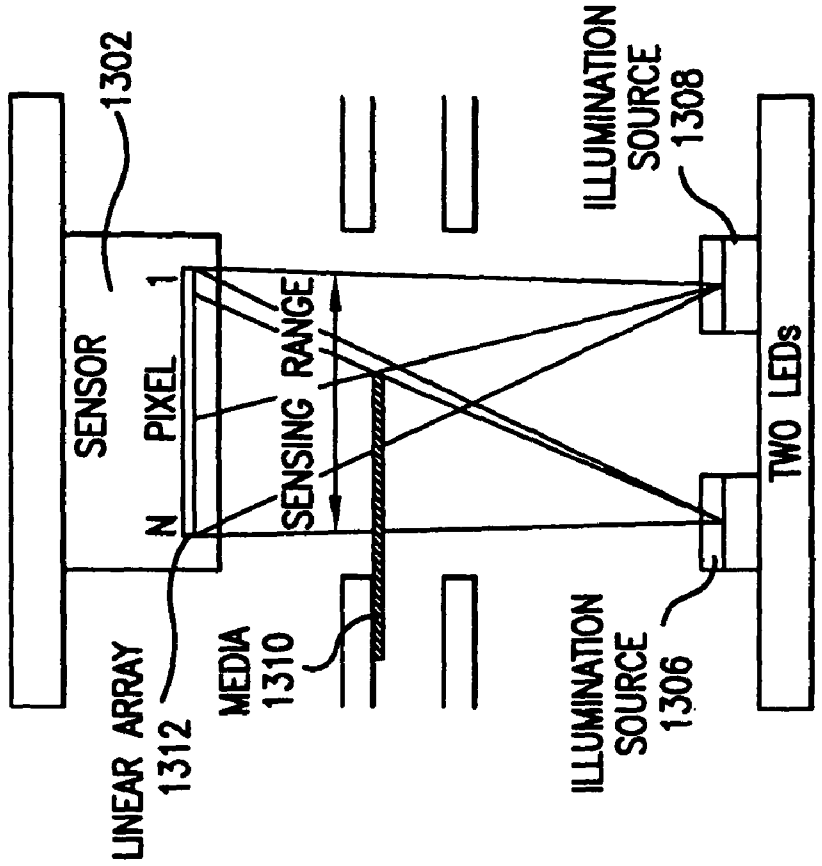
Figure 14:
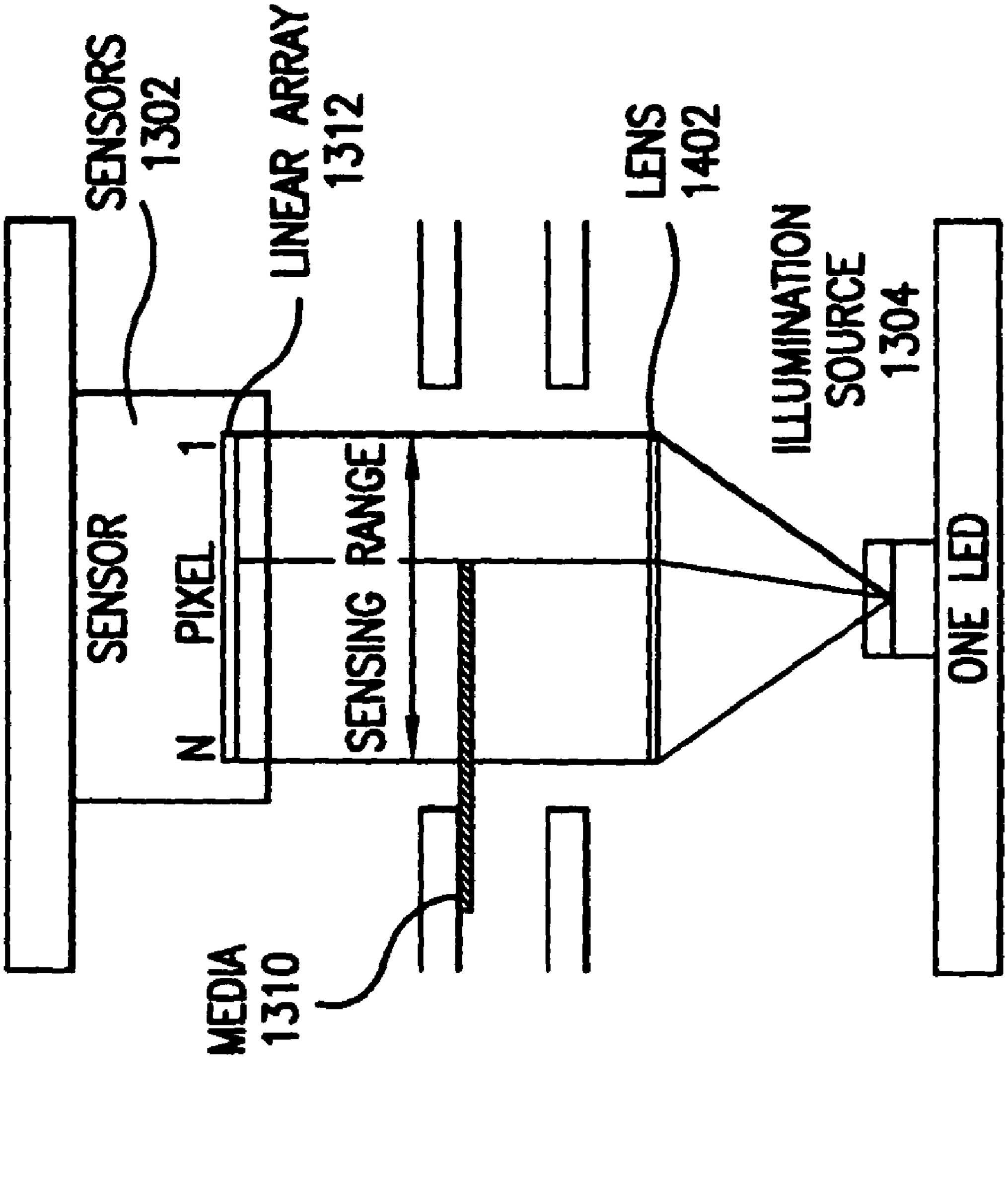
Figure 15:
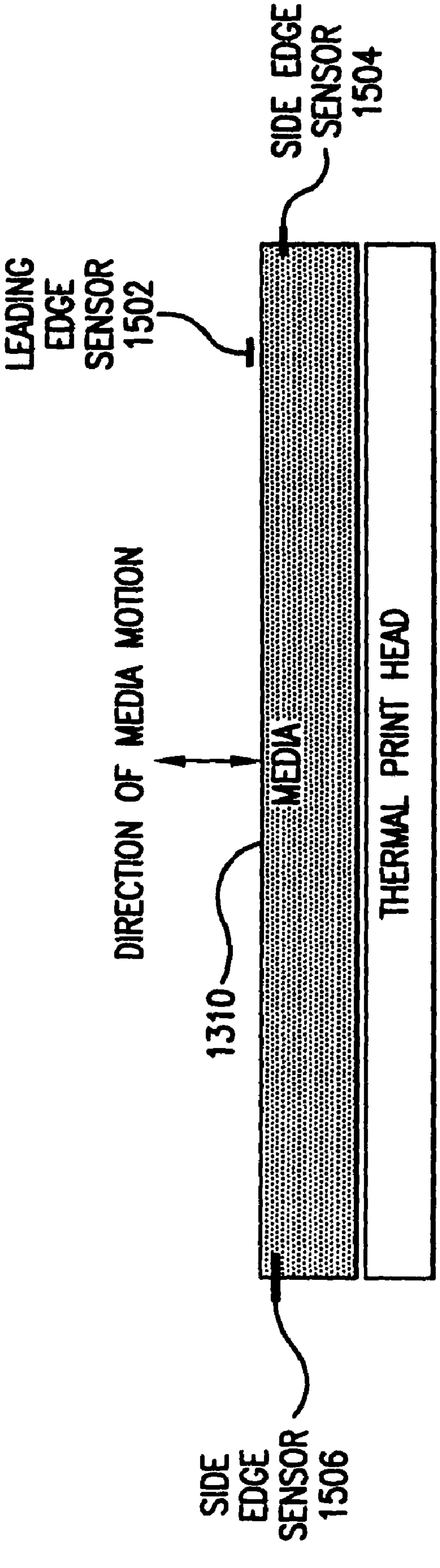
Figure 16:
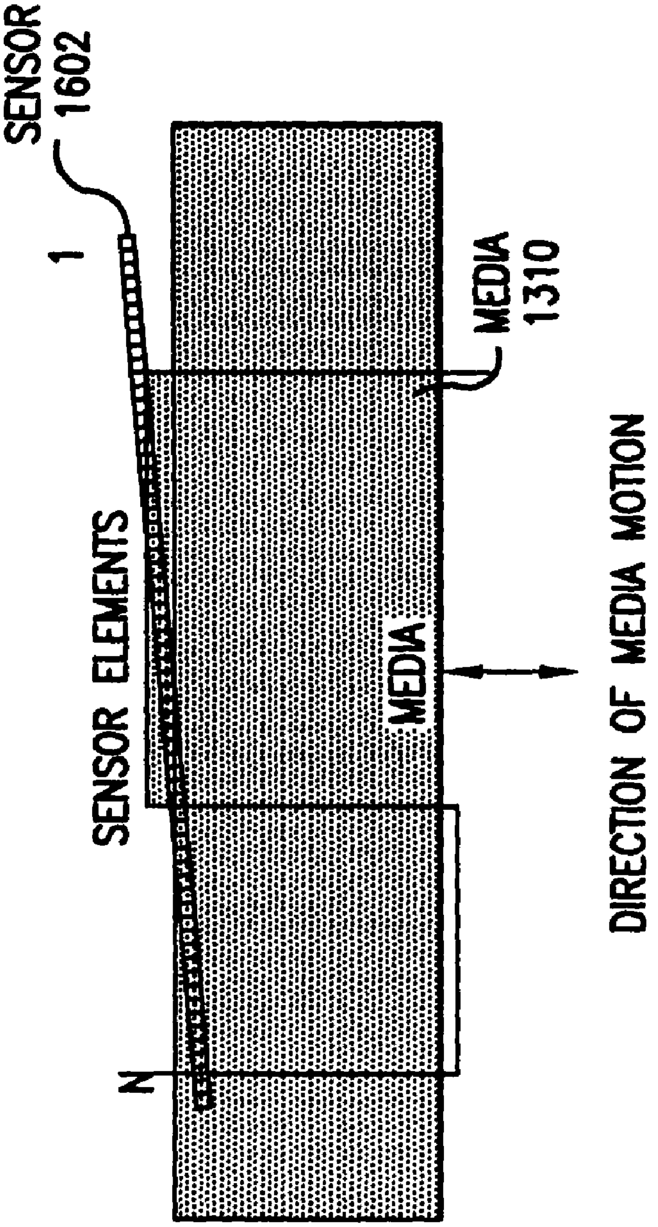
Figure 17:
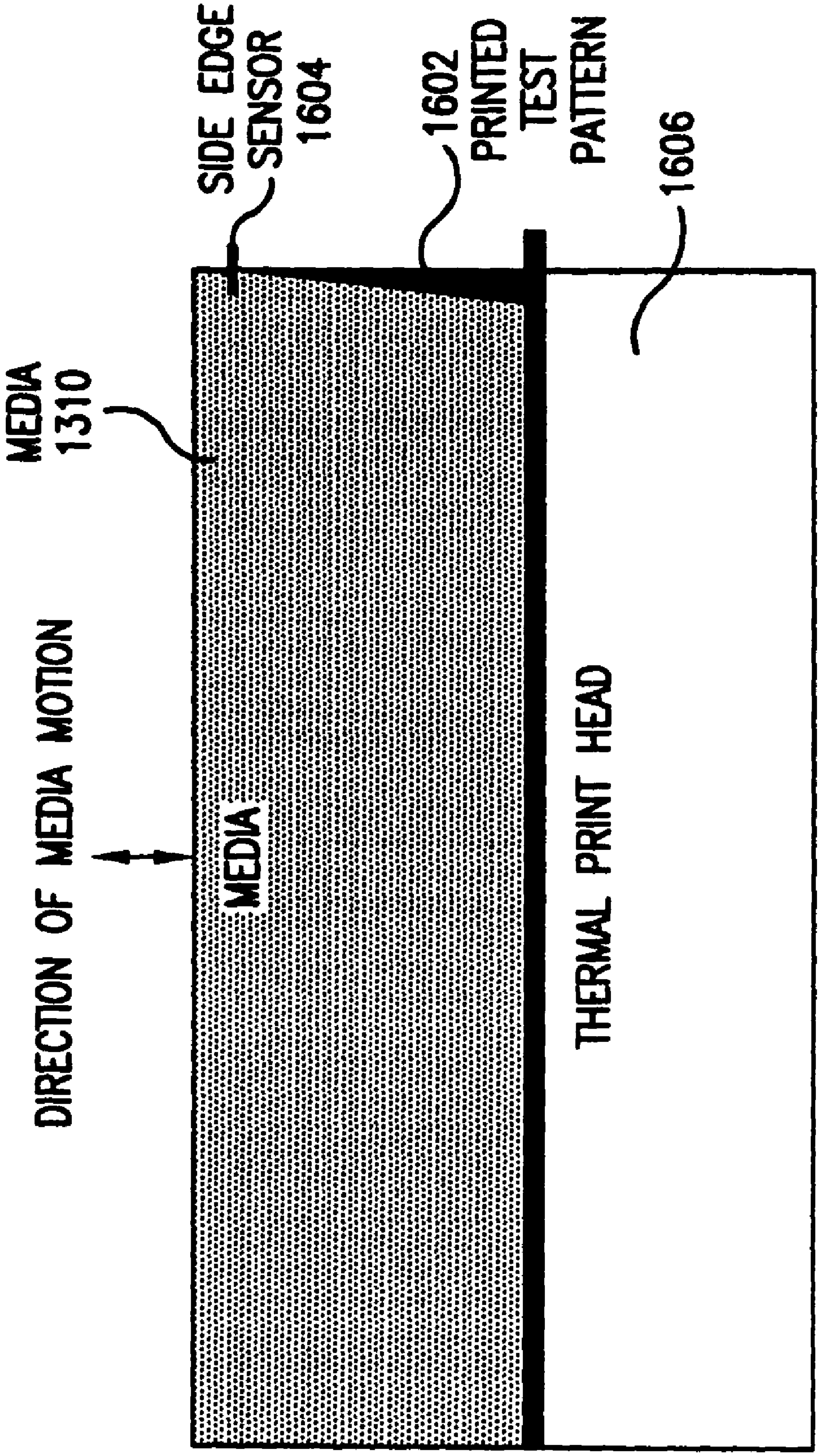
Figure 18:
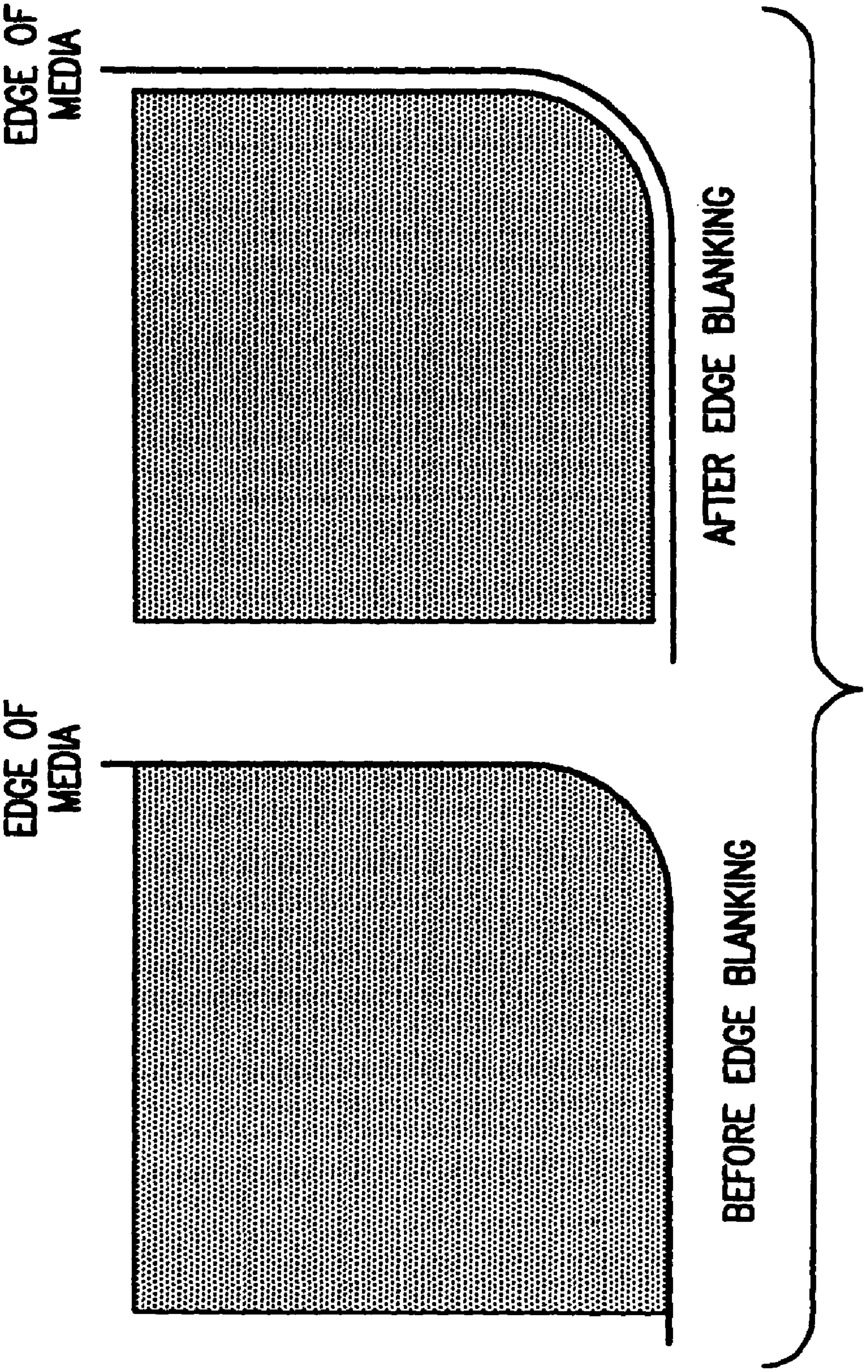
Figure 19:
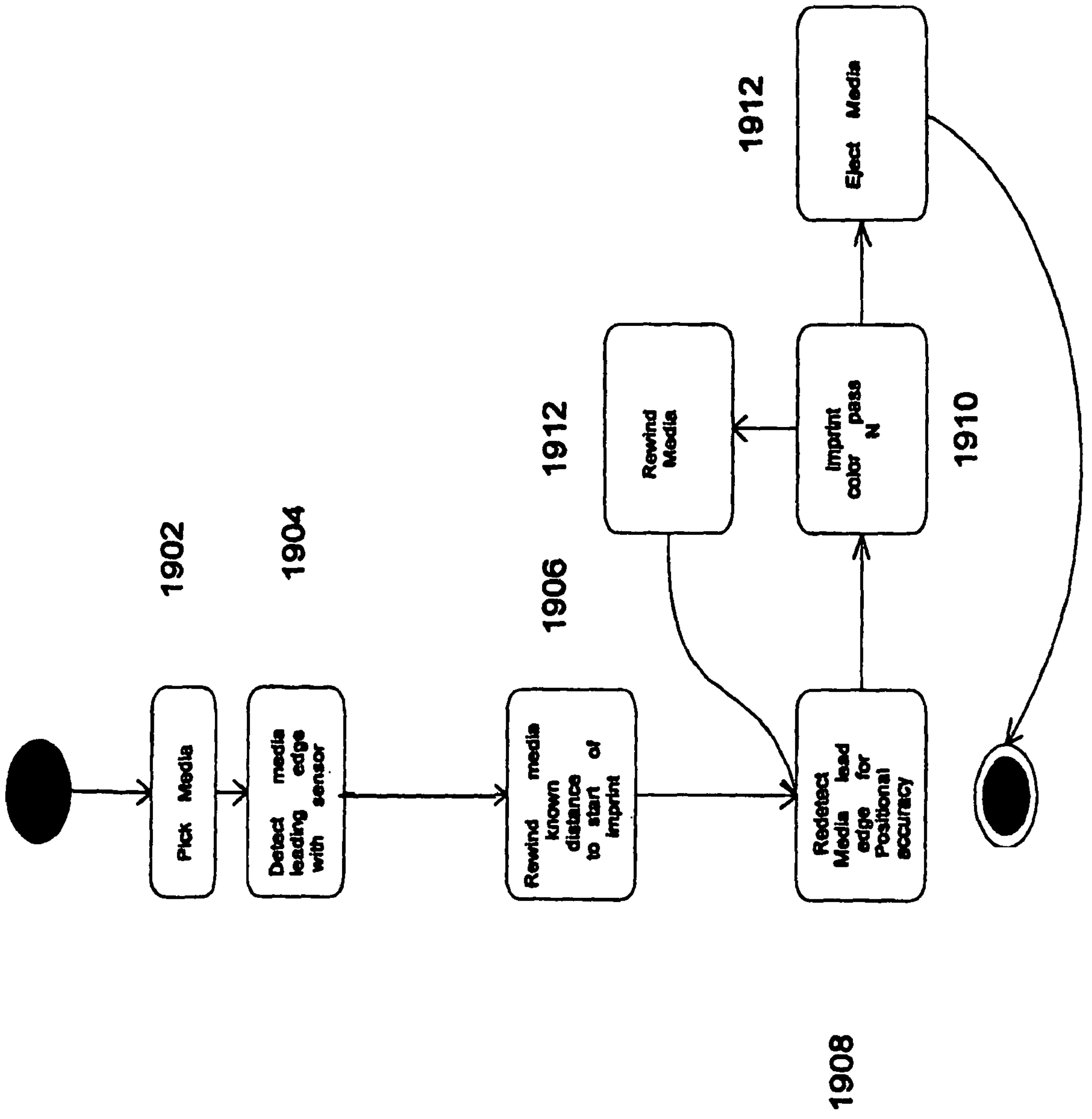
Figure 20:
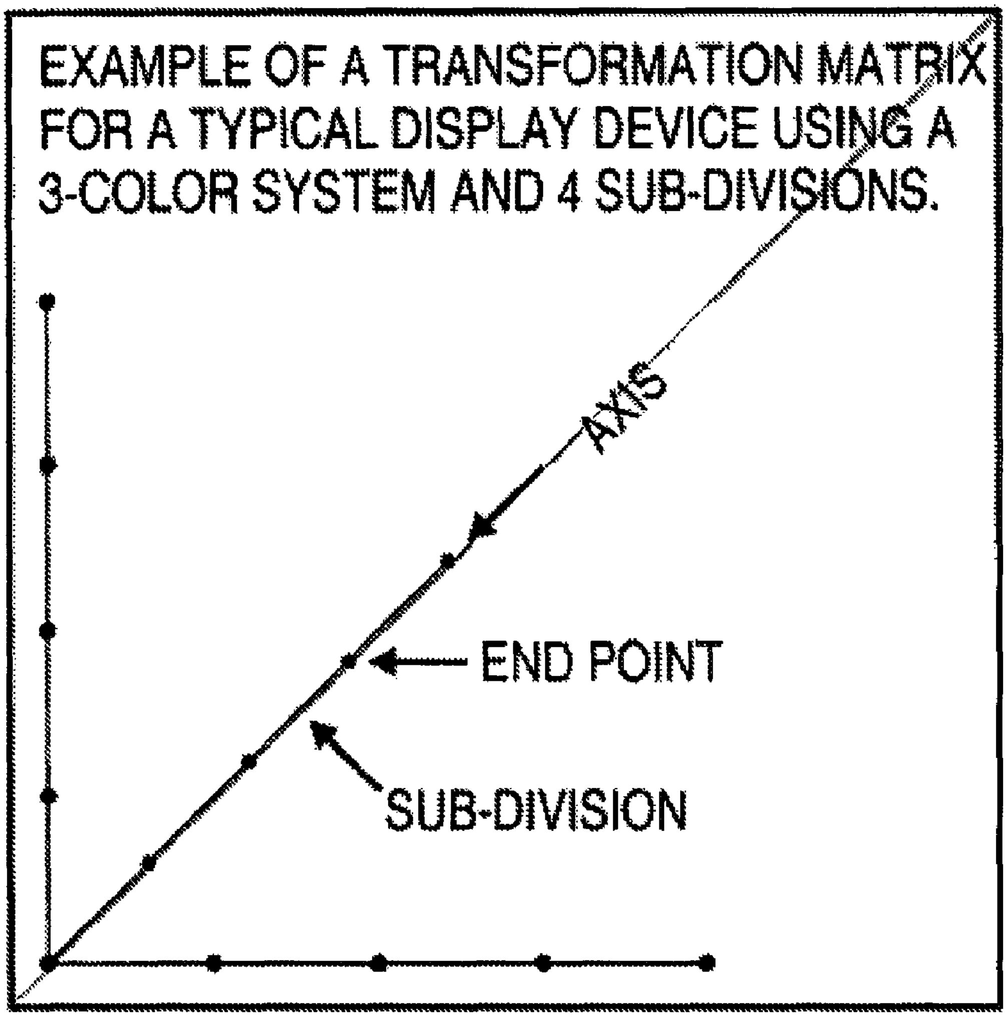
Figure 21:
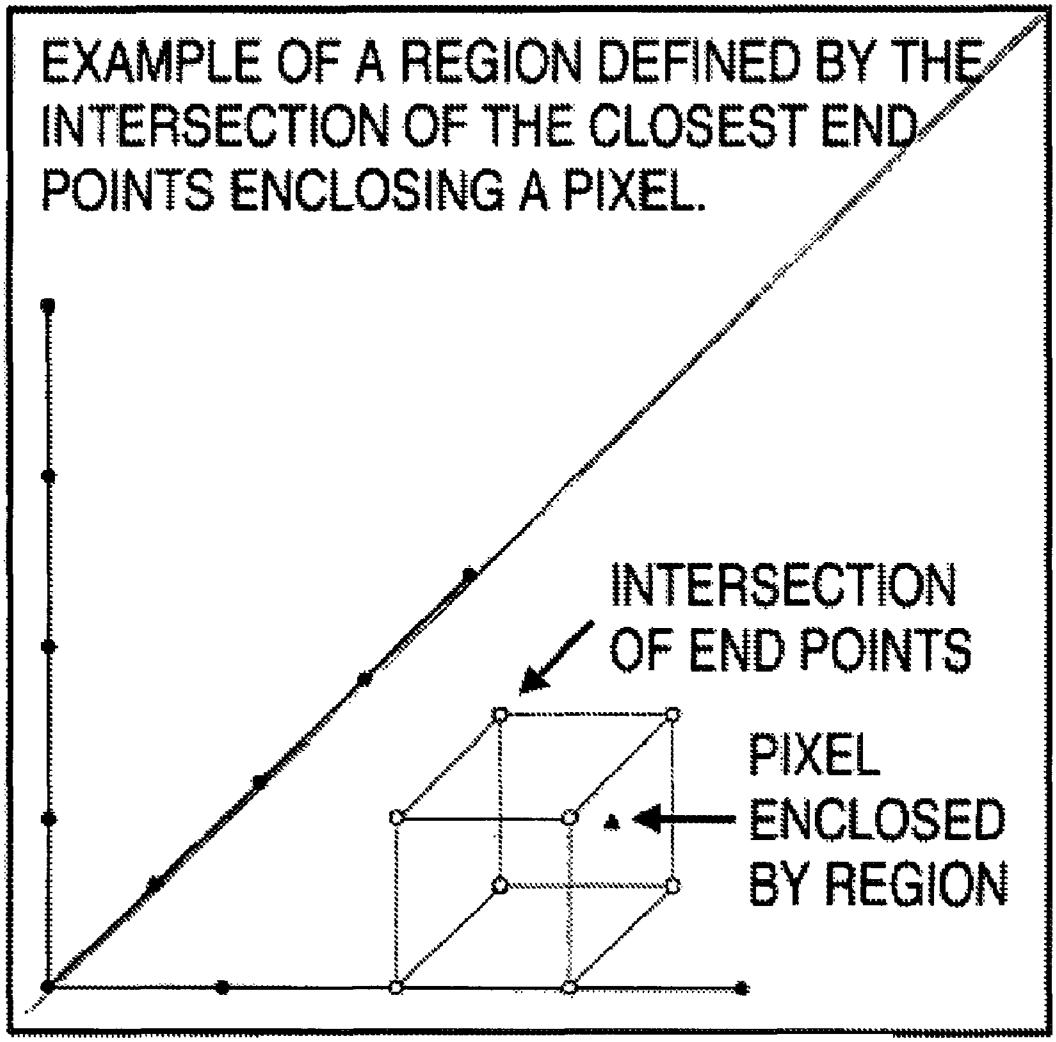
Figure 22:
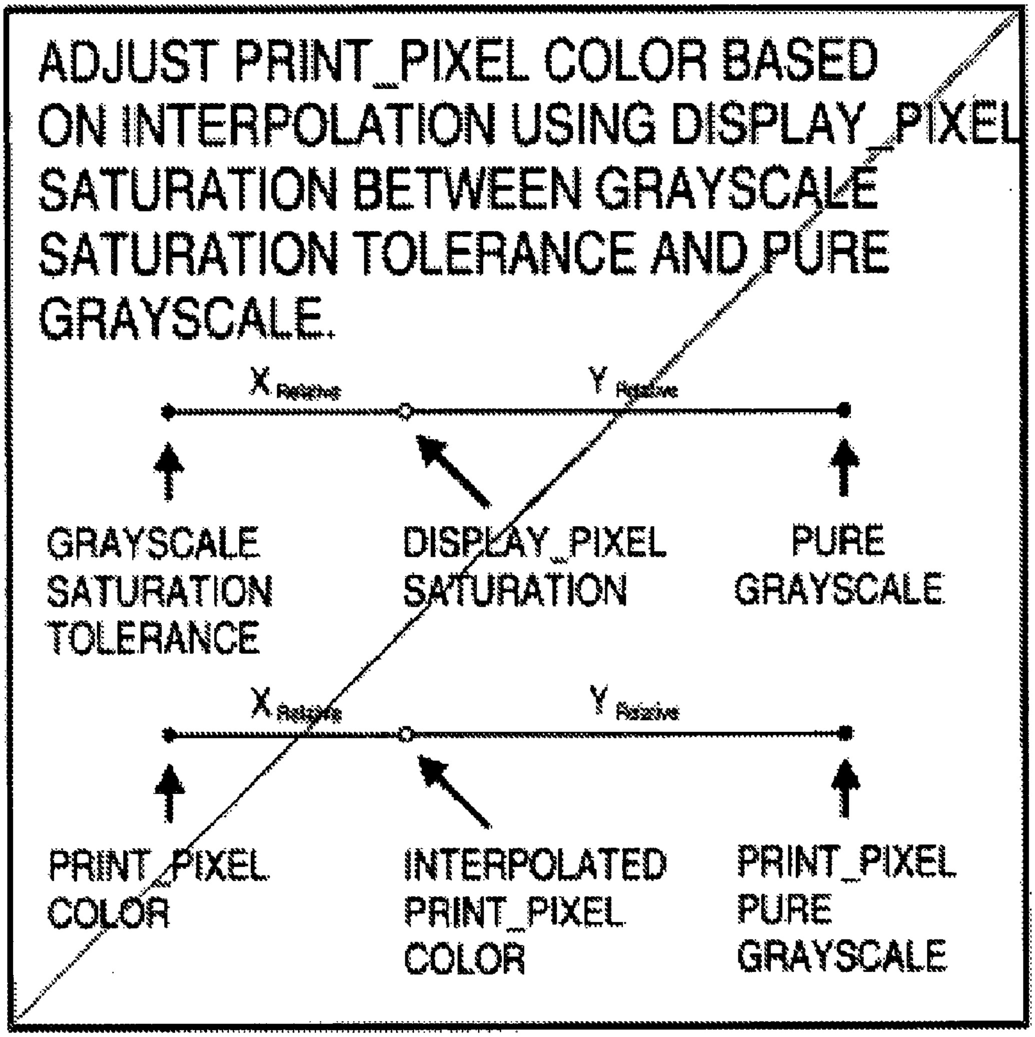

FIG. 12(*a*) includes a flowchart illustrating the software thermal printhead model;

FIGS. 13(*a*) and 13(*b*) illustrate edge sensing systems according to an embodiment of the present invention;

FIG. 14 illustrates an embodiment of the invention using a lens or series of lenses for edge detection according to an embodiment of the present invention;

FIG. 15 illustrates a placement of a leading edge sensor and a side edge sensor according to an embodiment of the present invention;

FIG. 16 illustrates a linear array slightly from a line that is parallel to an edge of media according to an embodiment of the invention;

FIG. 17 illustrates a calibration test pattern that is utilized to detect a side edge of the media according to an embodiment of the present invention;

FIG. 18 illustrates image data before and after edge blanking according to an embodiment of the present invention;

FIG. 19 illustrates a flowchart for multiple registration on media in a multi-media printer according to an embodiment of the present invention;

FIG. 20 illustrates an example of a transformation matrix for a typical display device using a 3-color system and 4 sub-divisions;

FIG. 21 illustrates an example of a region defined by the intersection of the closest end points enclosing a pixel; and FIG. 22 illustrates an example of adjust print_pixel color based on interpolation using display pixel saturation between grayscale saturation tolerance and pure grayscale.

DETAILED DESCRIPTION

Figure 1:
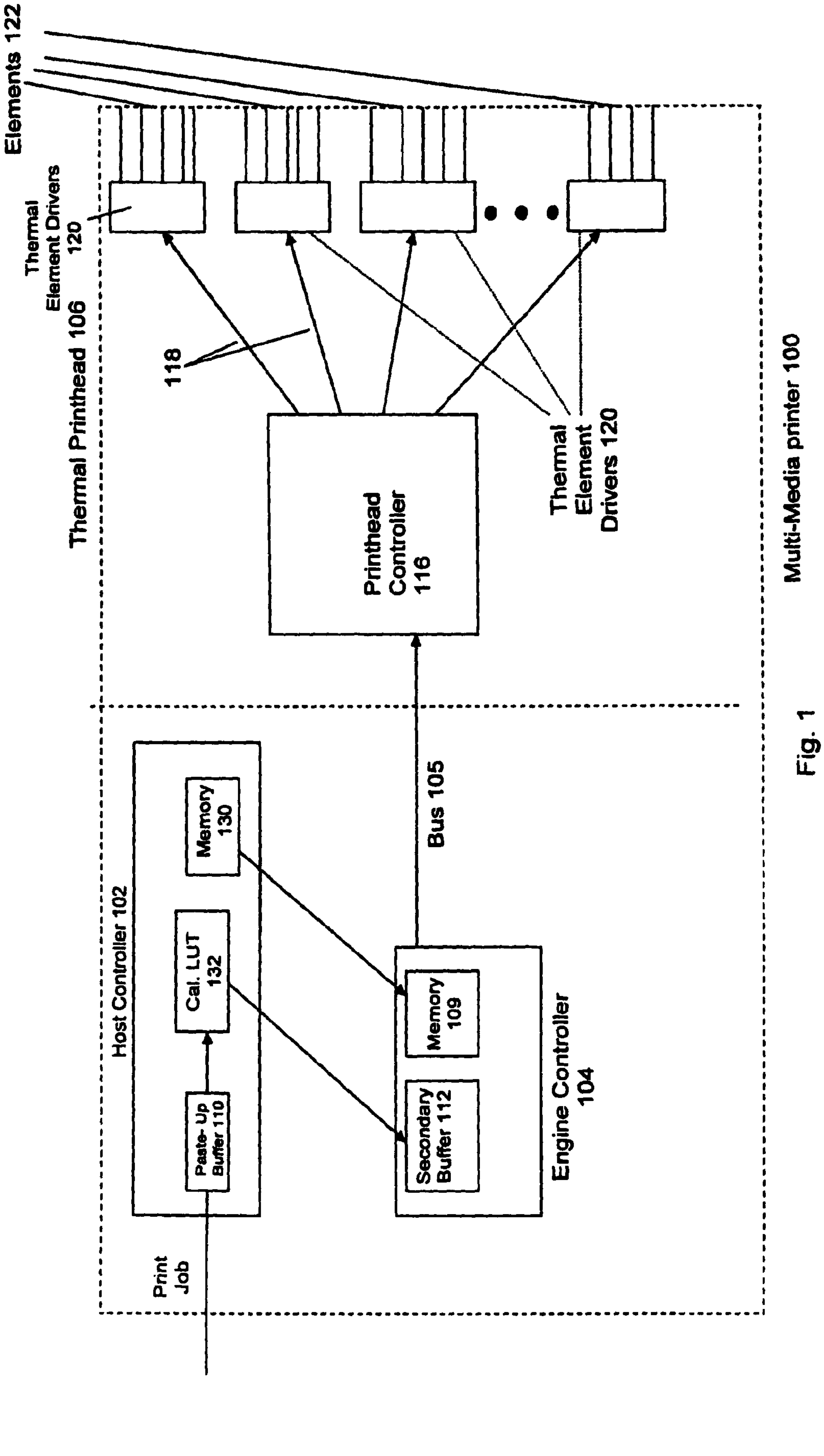
FIG. 1 illustrates a multi-media printer including a print speed enhancement according to an embodiment of the present invention.

FIG. 1 illustrates a multi-media printer including a print speed enhancement according to an embodiment of the present invention. A multi-media printer 100 includes a host controller 102, an engine controller 104, a communication bus 105, and a thermal printhead 106. In an embodiment of the invention, the engine controller 104 includes a memory 109 and a secondary buffer 112. In an embodiment of the invention, the thermal printhead 106 includes a thermal printhead controller 116, a plurality of driver communication lines 118, a plurality of thermal element drivers 120, and a plurality of thermal elements 122.

The multi-media printer 100 receives a print job from a print client device. The print job includes an image to be rendered. The print job may include multiple sub-images within the received image which are rendered on a single sheet of media. The image is comprised of a plurality of lines, each of the plurality of lines including a plurality of pixels. In an embodiment of the invention, 4096 pixels may be present in a line. The number of pixels may be equal to the number of the thermal elements 122 in the thermal printhead 106.

A plurality of pulse lookup tables (pulse LUTs) are stored in a memory 130 in the host controller 102. Each of the plurality of pulse LUTs correspond to a separate media type. In other words, different media types, such as grayscale paper, color paper, film, blue film, etc., each have a different pulse LUT. Each media type has different pulsing requirements necessary for achieving the desired optical density or gray level. The plurality of pulse LUTs may be created during the manufacturing of the multi-media printer 100 and stored in the memory 130. Pulse LUTs may be included in a new software release for the multi-media printer 100 and may be added to or replace the existing plurality of pulse LUTs. Under other operating conditions, pulse LUTs may be created by the host controller 102 or the engine controller 104 during initialization or boot-up of the multi-media printer 100. Under other operating conditions, pulse LUTs for specific media types may be created immediately before the print job is processed by the multi-media printer 100.

The host controller 102 of the multi-media printer 100 receives the print job including the image(s) to be rendered or printed. The print job may contain a plurality of images as well as instructions for 1) how image processing is to be performed and 2) how the images are to be laid out (displayed) on the page. The host controller 102 performs image processing on the image. Image processing may include color compensation, scaling, and pre-warping techniques. Pre-warping is compensating of the received image for artifacts that are inherent in thermal print engines. After image processing is performed on the received image, the processed image is stored in a paste-up buffer 110 in the host controller 102.

The contents of the paste-up buffer 110 may be referred to as a virtual page. Under certain operating conditions, the virtual page may include a plurality of images. The processed image or the virtual page includes a two-dimensional array of pixels. In other words, the processed image or the virtual page includes a plurality of rows, wherein each of the plurality of rows includes a plurality of pixels. The number of the plurality of pixels in a row may be equivalent to the number of thermal elements in the printhead. In an embodiment of the invention, the number of thermal elements is 4096.

The processed image is calibrated using a calibration look up table (calibration LUT) 132. The host processor 102 utilizes the calibration LUT 132 to convert image density values specified in the processed image to energy levels required to create, on media, the image density values specified in the processed image. In other words, the calibration LUT 132 maps input image density values to printing energy levels according to a desired optical density profile. The calibration LUT 132 may be pre-programmed in the multi-media printer 100. Under other operating conditions, the calibration LUT 132 may created during initialization of the multi-media printer 100. Under other operating conditions, the calibration LUT 132 may be created prior to the printing of the print job.

Each media type and each marking setting for each media type has an associated calibration LUT 132. Each media type and each different marking setting, e.g., printhead voltage, print speed, etc., provides a unique energy-to-density response from the multi-media printer. This response, referred to as "raw sensitometry" is the raw, uncompensated, density transfer function of the printer with a given media type and a given set of marking settings. The calibration LUT 132 is created to map an image value to energy such that a defined image value to density response is achieved in normal, calibrated operation. The desired image value-to-density response is user-selectable and may include a linear image value-to-density response, a linear image value-to-perceived lightness response, as well as user-defined image value-to-density responses. Application of the calibration LUT 132 converts the image value of each pixel in the image to an "energy index." After processing an image through the calibration LUT 132, the image is formed of a plurality of pixels, and may be referred to as a calibrated image. Each of the plurality of pixels includes an energy index instead of the image value.

The calibration LUT 132 may be stored in the host controller 102. In an embodiment of the invention, the calibration LUT 132 may be physically located in the memory 130 (which also includes the pulse LUT). In an embodiment of the invention, the calibration LUT 132 may be stored in the engine controller 104.

The processed image is transmitted from the paste-up buffer 110 in the host controller 102 to a secondary buffer 112 in the engine controller 104. In addition, in an embodiment of the invention, the host controller 102 downloads a pulse LUT for the specified media type to a memory 109 in the engine controller 104. The engine controller 104 verifies that the print engine 107 is in the proper state and controls the picking of the identified media from a media input tray. Generally, the media drive motor, which is controlled by the engine controller 104, is run at a controlled rate to pass the media across the thermal printhead 106.

After the calibrated image is stored in the secondary buffer 112, the engine controller 104 retrieves the energy index of each pixel in a first row of the calibrated image from the secondary buffer 112. The engine controller 104 matches the energy index of each of the pixels stored in the secondary buffer 112 to a corresponding entry in the pulse LUT stored in the memory 109. In other words, each of the energy indexes stored in the secondary buffer 112 correspond to a pulse stream in the pulse LUT. The engine controller 104 retrieves the corresponding pulse streams from the pulse LUT for each of the pixels (energy indexes). In one embodiment of the invention, the engine controller 104 transmits the plurality of pulse streams to a plurality of thermal element drivers 120 in parallel via a communications bus 105. The plurality of pulse streams may be transmitted through a printhead controller 116 to the thermal element drivers 120. In an embodiment of the invention, the thermal element drivers 120 may be located in the printhead controller 116.

Each of the thermal element drivers 120 may drive an integer number of thermal elements 122. For example, a thermal element driver 120 may drive sixty-four thermal elements 122. The plurality of thermal element drivers 120 activate the corresponding plurality of thermal elements 122 based on the contents of the transmitted plurality of pulse streams. In an embodiment of the invention, if the pulse stream has a value of 1, the thermal element 122 is activated and if the pulse stream has a value of 0, the thermal element 122 is not activated.

In this embodiment of the invention, each of the pulse streams stored in the pulse LUT in the memory 109 of the engine controller 104 may include a format referred to as a continuous interlace, which spreads energy out evenly over the entire line time. As discussed above, the line time is the time period required for a thermal printhead 106 to print a line on the media. Each of the plurality of pulse streams is formatted with the continuous interlace format. For simplicity of discussion, only a single pulse stream is described. The pulse stream includes a number of repeat blocks that spread thermal energy across the line time. In prior art pulse streams, such as a linear pulse stream, the beginning bits of the pulse streams are activated until the necessary energy level is attained. In the pulse stream of the instant invention, the pulse stream is divided into an integer number of repeat blocks. Under certain operating conditions, the contents of each of the integer number of repeat blocks are similar or the same. Under other operating conditions, the contents of the integer number of repeat blocks are different. In one embodiment of the invention, the integer number of repeat blocks for a pulse stream is four. Each of the four repeat blocks in the pulse stream includes nearly the same bit pattern.

In an embodiment of the invention, the pulse stream may also include bias pulse groups. At least one of the pulses in the bias pulse groups may have a variable duration. Under certain operating conditions, bias pulse groups can be utilized to fill up the line time. In other words, the bias pulse groups may pad out the needed line time. Illustratively, this may occur with dye-diffusion transparency, where more than 8 milliseconds is needed to print per line. Under other operating conditions, the bias pulse groupings are utilized to increase recognizable gray levels or optical densities.

Generally, for each pulse that is activated in the pulse stream, the energy level of the pulse stream is increased one pulse energy unit (PEU). The number of PEUs in a pulse stream identifies the energy level of the pulse stream. Without the inclusion of bias pulse groups, the number of different energy levels possible for a pulse stream is limited to the number of bits in the pulse stream, i.e., the number of pulses that may be activated. This number is limited by the number of pulses that may fit within a desired line time. The inclusion of bias pulse groups, sometimes referred to as bias pulse sub-addressing, allows increments of energy for a pulse stream to be increased in steps of $\frac{1}{4}^{th}$ or $\frac{1}{8}^{th}$ of a PEU. This allows either four or eight times the regular number of different energy levels.

In an embodiment of the invention, a bias pulse group is added to each repeat block. In the embodiment of the invention where four repeat blocks are included in a pulse stream, four bias pulse groups are added. In an embodiment of the invention, the bias pulse group is added to the end of the repeat blocks. A bias pulse group includes an integer number of pulses. A pulse in the pulse group that has a normal pulse duration is referred to as a normal pulse. A pulse in the pulse group that has a variable duration is referred to as a variable pulse. Normal pulses of the bias pulse group have a value opposite to the variable pulse, i.e., if the variable pulse is activated, the normal pulses are not activated. Illustratively, this combination of the two normal pulses and the variable pulse may result in two whole PEUs (if the variable pulse is not active), or 2 whole PEUs plus a fraction of the PEUs (if the variable pulse is active), where the fraction corresponds to the variable pulse duration above two normal pulse times. For example, if the variable pulse has a duration of 2.375 and the two normal pulses have durations of 2.0, then if the variable pulse is activated, the additional PEU is 2.375. If the two normal pulses are activated, the additional PEU is 2.0. Thus, the net effect of activating the variable pulse, in this example is the addition of 0.375 of an active pulse. In this embodiment, the combinations of the variable pulses with the subtracting pulses in each of the repeat blocks allow for increments in energy levels of $\frac{1}{8}^{th}$ or $\frac{1}{4}^{th}$.

In an embodiment of the invention, some of the plurality of pulse streams are offset from each other. The offsetting of the pulse streams is determined by specific bits in the energy index. In an alternative embodiment of the invention, the printhead controller 116 or the engine controller 104 may be programmed with the offset. In one embodiment of the invention, the energy index value may be specified in 12 bits, 2 bits of which identify the offset of the pulse stream. In other words, the energy index value (gray level value) transmitted for each pixel in this embodiment is identified in 12 bits and two of these bits identify the offset for the pulse stream. In an alternative embodiment, the gray level may be specified in 14 bits, 2 bits of which identify the offset of the pulse stream.

Pulse streams corresponding to the energy index values are offset in a pattern that favors no offset over the other offset. In one embodiment of the invention, each offset is an integer number of pulses that is a multiple of a first offset. Illustratively, an integer number of pulses may be four. In this embodiment, offset(1) is a four pulse offset; offset (2) is an eight pulse offset (a multiple of the four pulse offset); and offset(3) is a twelve pulse offset. The offsets for each of the thermal elements may follow a pre-established pattern. In an embodiment of the invention, the offset may be unchanged for the thermal element for each line in the image. Because the offsets are interspersed evenly among the thermal elements on the printhead, the offsets are balanced. The combination of this, the pulse streams minimally having $\frac{1}{4}^{th}$ of the pulses ON, and the order in which the pulses are filled in, guarantees that the power supply sees a minimum load of $\frac{1}{4}^{th}$ of all thermal elements turned on for all pulse times. This reduces power supply transient artifacts.

Figure 2:
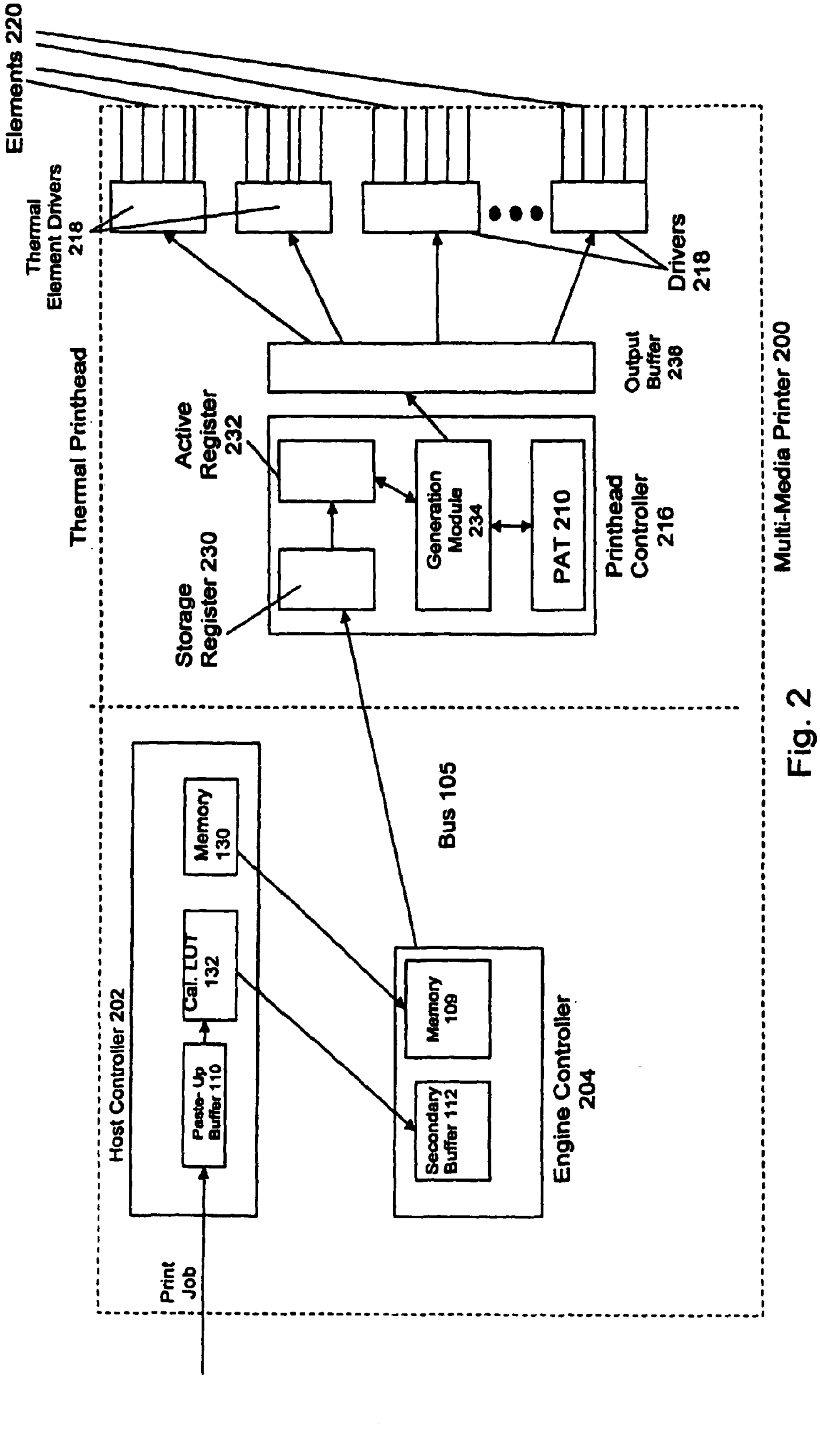
FIG. 2 illustrates an embodiment of the invention including a pulse activation table according to an embodiment of the present invention.

FIG. 2 illustrates an embodiment of the invention including a pulse activation table according to an embodiment of the present invention. The multi-media printer 100 includes a engine controller 204, a printhead controller 216, a plurality of thermal element drivers 218, and a plurality of thermal elements 220. The printhead controller 216 is located on the printhead. The printhead controller 216 may include the pulse activation table 210, the generation module 234, a storage register 230, and an active register 232. In an alternative embodiment of the invention, the pulse activation table 210 may be located in the thermal printhead but physically separate from the printhead controller 216.

The pulse activation table 210 may be created and preprogrammed into the multi-media printer 200. In an alternative embodiment of the present invention, the pulse activation table 210 may be created during initialization of the multi-media printer. In another embodiment of the present invention, the pulse activation table 210 may be created before each print job. The printhead controller 216 executes instructions and utilizes the pulse activation table 210 to create pulse streams that drive the thermal element drivers 218 which in turn energize thermal elements 220.

As discussed above, the received image is processed and stored in a paste-up buffer 110 (see FIG. 1). The processed image is then passed through a calibration LUT 132 to create a calibrated image. The calibrated image is then transmitted to the secondary frame buffer 112 on the print engine controller. The calibrated image is a two-dimensional pixel array of energy indexes. In other words, the calibrated image includes a plurality of rows, each row having a plurality of pixels where each of the pixels includes an energy index. In an embodiment of the invention, each energy index is represented by 12 bits.

When the print engine is activated, the engine controller 204 transmits the calibrated image, one row at a time, from the secondary frame buffer 112 to a storage register 230 located in the printhead controller 216. In an alternative embodiment, the engine controller 204 may transmit the calibrated image from the secondary frame buffer 112 to a plurality of storage registers 230. In an embodiment of the invention, the storage register 230 is located on the printhead controller 216. In an embodiment of the invention, the storage register 230 is located on the printhead separate from the printhead controller 216. In an embodiment of the invention, the printhead controller 216 may be implemented in a field programmable gate array (FPGA). Alternatively, the printhead controller may be implemented in an applications specific integrated circuit (ASIC).

The storage register 230 is a part of a double buffer. The double buffer also includes an active register 232. In an embodiment of the invention, the double buffer also includes a plurality of active registers 232. When the previous line (row of pixel data) has been printed, a succeeding line is transmitted or transferred from the storage register 230 into the active register 232. Thus, a line of desired energy indexes is transferred from the storage register 230 into the active register 232. A generation module 234 in the printhead controller 216 compares the desired energy index for each of the locations (pixels) in the transferred row against a pulse activation table entry corresponding to the first pulse of the pulse stream.

In an embodiment of the present invention, the pulse activation table (PAT) 210 includes a plurality of entries. The PAT 210 may be an array or a list including the plurality of entries. The number of entries in the pulse activation table 210 may be equivalent to the number of pulses in the pulse stream. The pulse number associated with a particular entry is determined by the location of the entry in the array or list. In other words, the PAT entry for pulse 10 is the 10$^{th}$ entry in the array or list. The PAT entry for pulse 20 is the 20$^{th}$ entry in the array or list. The value in each of the plurality of entries provides a comparison value for the generation module 234. If the energy index for the pixel to be printed is greater than or equal to the PAT entry for a given pulse, then the given pulse will be activated in the pulse stream (meaning the thermal element will be ON for the duration of that pulse.)

In an alternative embodiment of the invention, the pulse activation table 210 includes a plurality of entries, each of the plurality of entries having a first field identifying each pulse number in the pulse stream. A second field in the pulse activation table (PAT) 210 identifies the energy index at which the corresponding pulse of the first field is activated. In other words, in this embodiment, the first field is an index to the second field in the PAT 210.

Because additional pulses need to be activated to achieve higher energy levels, the PAT 210 is utilized to identify the specific energy level in the pulse stream at which the specific pulse will be activated and remain activated for higher energy levels.

The generation module 234 utilizes comparison logic to compare the energy indexes stored in the active register 232 against a first PAT entry, e.g., the energy level identified in the PAT 210 for the first pulse. If the energy index stored in the active register for a pixel is greater than or equal to the PAT entry energy level, an activation value is generated for that pixel. Alternatively, if the energy index stored in the active register 232 for the pixel is less than the PAT entry energy level, a non-activation value is generated for that pixel. The generation module 234 comparison is made for all of the pixels located in the active register 232. After all the first pulse values for each of the pixels stored in the active register 232 are determined, the first pulse values are latched in parallel to an output buffer 238 or a plurality of output buffers 238. The first pulse values may then be transmitted to the corresponding thermal element drivers 218 and then on to the corresponding thermal elements 220. The first pulse activates the corresponding thermal element for a first pulse time. As this is occurring the energy index values for the first row of pixels are being compared by the generation module 234 to a second PAT entry for the second pulse in the pulse stream to generate second pulse values. This continues for all of the pulse positions (and thus PAT entries) in the plurality of pulse streams. After the last pulse values are latched out and transmitted to the plurality of thermal element drivers 218, the next row of image energy data is transferred from the storage register 230 into the active register 232. The above-mentioned process occurs again for each row of the calibrated image.

Raster-free printing is defined as thermal printing in which no evidence of print lines or pixels at the dot pitch of the printhead are evident in a flat gray field in the printed hardcopy output. Raster-free printing occurs due to thermal printhead pulsing techniques, and because of the geometry of the heating portion of the thermal elements of the printhead. In order to achieve raster-free printing, the temperature or thermal energy that the plurality of thermal elements applies to the media surface must uniformly cover an area that is fully equal to or greater than the dot pitch of the printhead in both the axis parallel to the direction of media travel (the “x-axis”), as well as in the direction normal to the direction of media travel (the “y-axis”). In other words, the energy applied by a thermal element very closely abuts the energy provided by its succeeding thermal element or preceding thermal element. Alternatively, the energy applied by the thermal element must overlap the energy applied by of the succeeding or preceding thermal elements in a manner that the space between the thermal elements has a density consistent with that of the center of the pixels. These techniques provide raster-free printing in the y-axis. To achieve raster-free printing in the x-axis, the energy applied by each thermal element must be continuous down the page. No voids or low-energy points in the marking process should be present as the thermal element moves down the page.

Figure 3:
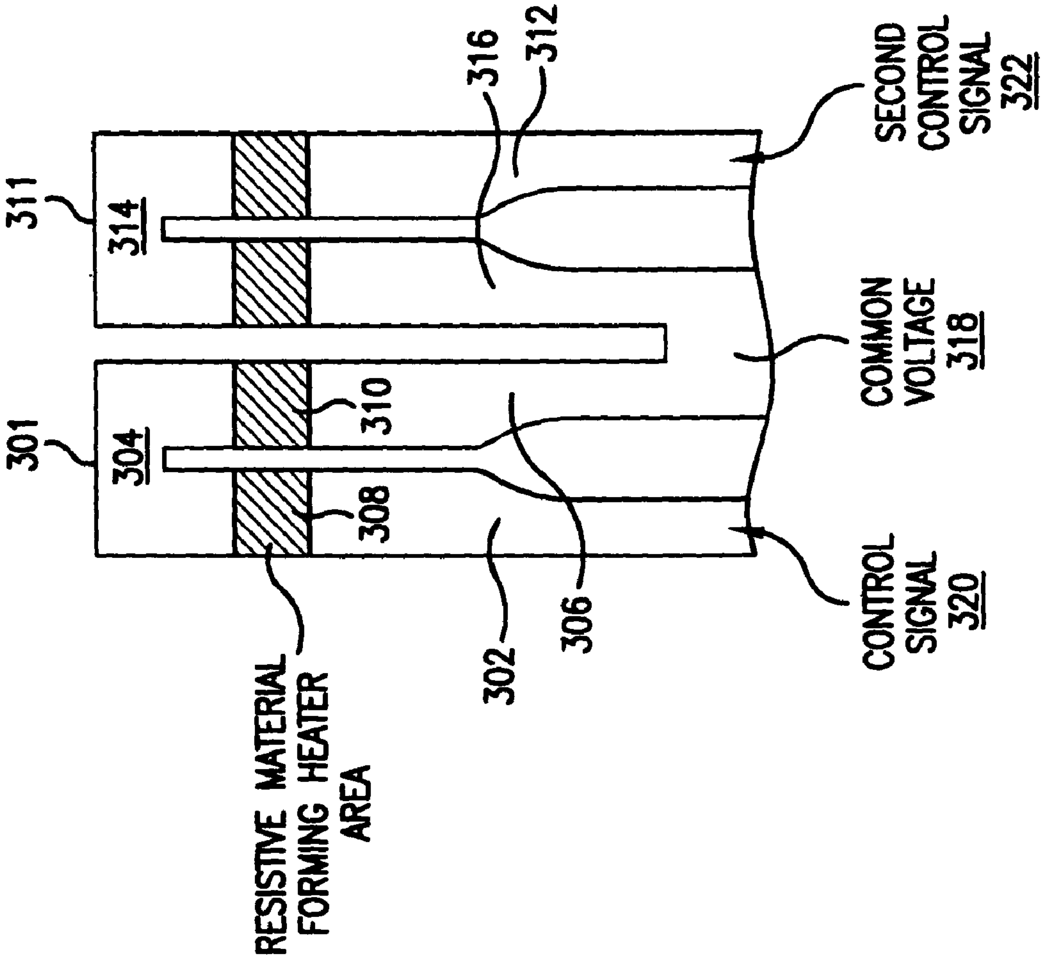
FIG. 3 illustrates two u-shaped thermal elements according to an embodiment of the present invention.

In an embodiment of the invention, raster-free printing in the y-axis is provided by the geometry of the thermal printhead. In am embodiment of the invention, the thermal printing system uses a thermal printhead that has u-shaped thermal elements. FIG. 3 illustrates two u-shaped thermal elements according to an embodiment of the present invention. A first u-shaped thermal element 301 receives a first control signal 320 at a first leg 302 and the first control signal 320 travels to a turn 304 of the u-shaped thermal element and down to the second leg 306 of the u-shaped thermal element. In this embodiment, the first u-shaped thermal elements have two heating sections 308 and 310 that reside on the first leg 302 and the second leg 306, respectively. A second u-shaped thermal element 311 receives a second control signal 322 at a third leg 312 and the second control signal travels to a turn 314 and down the fourth leg 316. The second u-shaped thermal element 311 includes two heating sections 318 and 320. An area 319 receives a common bus or voltage level. This common bus or voltage level is the same for all thermal elements and is not switched. The common is connected to a high-level voltage, e.g., $V_h$, which is applied to all thermal elements. In an embodiment of the present invention, the thermal element drivers, connect the thermal element to ground via semiconductor, e.g., MOSFET, switches. In an alternative embodiment of the present invention, the common could be connected to ground, and the thermal element drivers could connect the thermal elements to $V_h$ via high-side semiconductor switches.

The nature and the geometry of the u-shaped thermal element is to provide a wide heating profile such that the energy output of the thermal elements tends to abut or overlap neighboring thermal elements in a way in which the marked media has no density voids between marked pixels in the y-axis. As illustrated in FIG. 3, the geometry of the U-shaped thermal element applies the energy across the whole pixel or printing area and not just the center of the pixel or printing area.

Figure 4A:
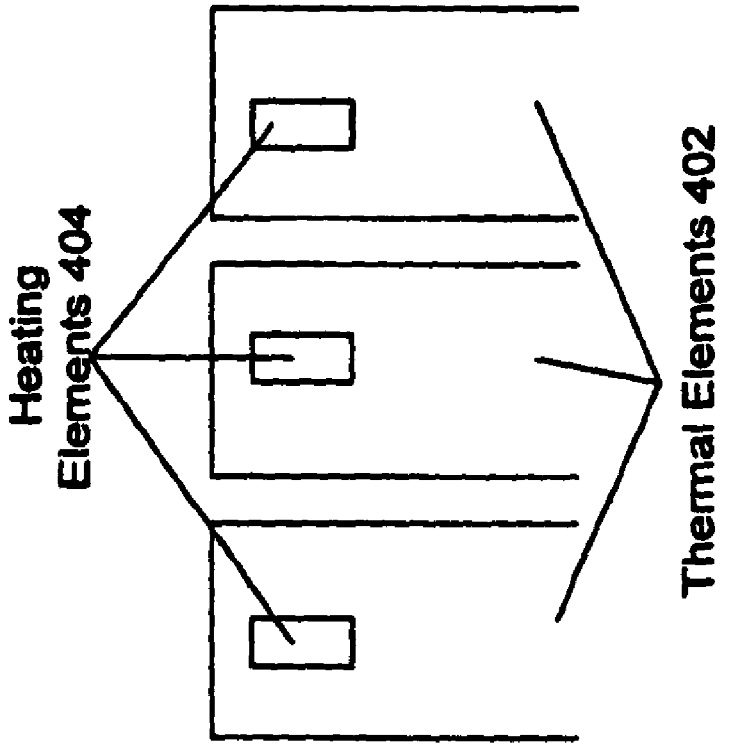
FIG. 4(*a*) illustrates a long, thin heating element according to an embodiment of the present invention.
Figure 4B:
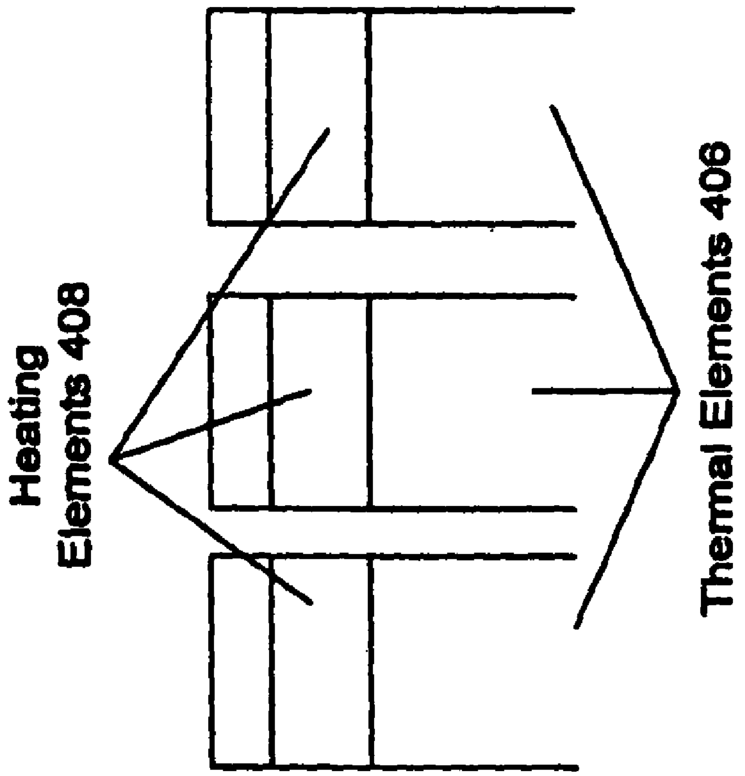

FIGS. 4(*a*) and 4(*b*) illustrate thermal printheads with heating portions according to an embodiment of the present invention. FIG. 4(*a*) illustrates a long, thin heating element according to an embodiment of the present invention. FIG. 4(*b*) illustrates a large, wide heating element according to an embodiment of the present invention. In an embodiment of the invention, the thermal printhead has non-u-shaped thermal elements. The non-effective heating design of FIG. 4(*a*) includes thermal printheads 402 with thin heating elements 404, where the heating elements are not close to each other. In FIG. 4(*b*), the heating portion 408 of each of the thermal elements 406 has a wide heating profile such that the energy output of each of the thermal elements 406 tends to abut or overlap neighboring thermal elements 406 in a way in which the marked media has no density voids between marked pixels in the y-axis.

Raster-free printing in the x-axis is provided by the methods used in heating the thermal elements of the printhead. The thermal pulsing techniques discussed above, i.e., the interlaced pulses including repeated blocks of pulses, bias pulses and the use of offsetting, generate raster-free printing in the x-axis. By spreading the heating energy applied to the thermal elements as uniformly as possible for the full duration of the line time, and by not allowing for a cooling time between lines, the thermal pulsing techniques described above provide uniform heating as one marked pixel stretches into the next. In this manner, there are no density voids between each marked pixel and the ones that precede and follow them. Therefore, no visible rasters are present. In other words, the interlaced pulsing mechanism described above provides a pulse-width modulated heating signal to each thermal element, the duty cycle of each signal being consistent for the full length of the marked pixel, and changes to a new duty cycle immediately at the start of the next marked pixel in the x-axis. This way, the energy delivered is uniform and clearly demarcated at the borders of the rectangular pixel area on the page.

In an embodiment of the invention, a heating profile may be applied to thermal elements where enough of the line time is filled with energy. This line-filling heating profile should be constructed such that it is sufficiently even, so that the marked media does not exhibit density variations at the pitch of the thermal printhead between marked pixels and the ones that precede and follow them when marking an even-density flat image field.

Figure 5:
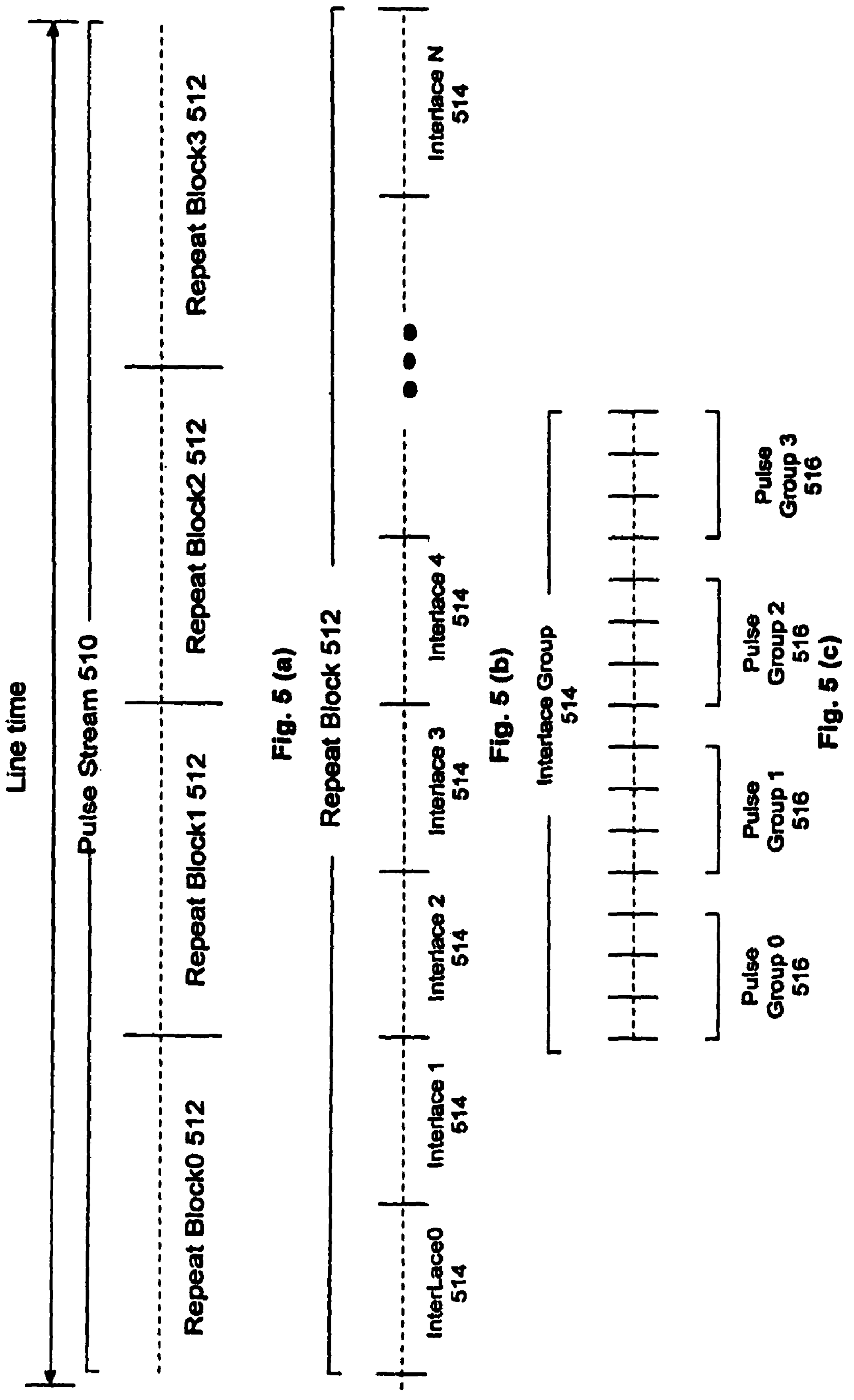
FIG. 5 illustrates a continuously interlaced pulse stream in a pulse LUT according to an embodiment of the present invention.

FIG. 5 illustrates a continuously interlaced pulse stream in a pulse LUT according to an embodiment of the present invention. In an embodiment of the invention, a pulse stream generation module 234 (see FIG. 2) may generate a plurality of pulse streams each corresponding to a specific gray level, or desired density. The pulse stream generation module 234 may be resident within the multi-media printer 100 (see FIG. 1) or alternatively may be resident on a computing device separate from the multi-media printer 100. In an embodiment of the invention, the pulse stream generation module generates pulse streams after initialization of the multi-media printer 100. In an embodiment of the present invention, the pulse stream generation module 234 generates pulse streams upon receipt of a print job.

In the embodiment of the invention illustrated in FIG. 1, a pulse lookup table (pulse LUT) is a list of entries or an array. Each entry includes a pulse stream corresponding to an energy index. For example, the $3^{rd}$ element in the array or $3^{rd}$ item in the pulse LUT list corresponds to an energy index of 3. Similarly, the $25^{th}$ element in the array or the $25^{th}$ item in the pulse LUT list corresponds to an energy index of 25. In an embodiment of the invention, 4096 potential energy indexes or gray levels are represented in the pulse LUT. In an embodiment of the invention, 400 potential energy levels or gray levels above Dmin are represented in the pulse LUT. In an embodiment of the invention, 3200 energy levels/indexes or gray levels above Dmin are represented in the pulse LUT. Any integer number of energy levels/indexes may be represented in the pulse LUT. In an alternative embodiment of the invention, the pulse LUT includes at least two fields. One of the fields lists all of the potential energy indexes or gray levels. A second field of the pulse LUT includes a pulse stream which is utilized by the thermal printhead to produce the energy level/index for the corresponding energy index or gray level field in an image to be marked. Illustratively, in this embodiment of the invention, a third entry in the pulse LUT may include a first field with a gray level or energy level of 3, and the second field has a corresponding pulse stream of 011011110000011, which produces the energy level of three on the selected media. A $16^{th}$ entry may include a gray level or energy level of 15 in the first field, which is generated by pulse stream 1111000011111111, which is stored in the second field.

FIG. 5(*a*) illustrates an interlaced pulse stream including a plurality of repeat blocks according to an embodiment of the present invention. The pulse stream 510 includes a plurality of repeat blocks. The bits in the pulse streams are not illustrated in FIG. 5(*a*) due to size constraints but the pulse stream is divided into an integer number of repeat blocks 512. Each of the plurality of repeat blocks 512 may have similar or repetitive contents, i.e., bit streams. In an embodiment of the present invention, each of the plurality of repeat blocks 512 may not have similar streams. In the embodiment of the invention illustrated in FIG. 5(*a*), the number of repeat blocks is four, e.g., RepeatBlock0, RepeatBlock1, RepeatBlock2, and RepeatBlock3. The number of repeat blocks 512 may be any integer number.

FIG. 5(*b*) illustrates a repeat block in a interlaced pulse stream according to an embodiment of the invention. Each repeat block 512 has a plurality of interlace groups 514. The number of interlace groups 514 may be an integer number. In an embodiment of the invention, the number of interlace groups 514 may be 256 interlace groups. In an embodiment of the invention, the number of interlace groups 514 in each repeat block 512 is the same. In an embodiment of the invention, the number of interlace groups 514 in each repeat block 512 is different. In the embodiment illustrated in FIG. 5(*b*), the number of interlace groups 514 is n. In an embodiment of the invention, each of the repeat blocks has the same number of interlace groups. In an embodiment of the invention, the same number of interlace groups 514 for each block. In an embodiment of the invention, a variable number of interlace groups 514 may be utilized.

Figure 6:
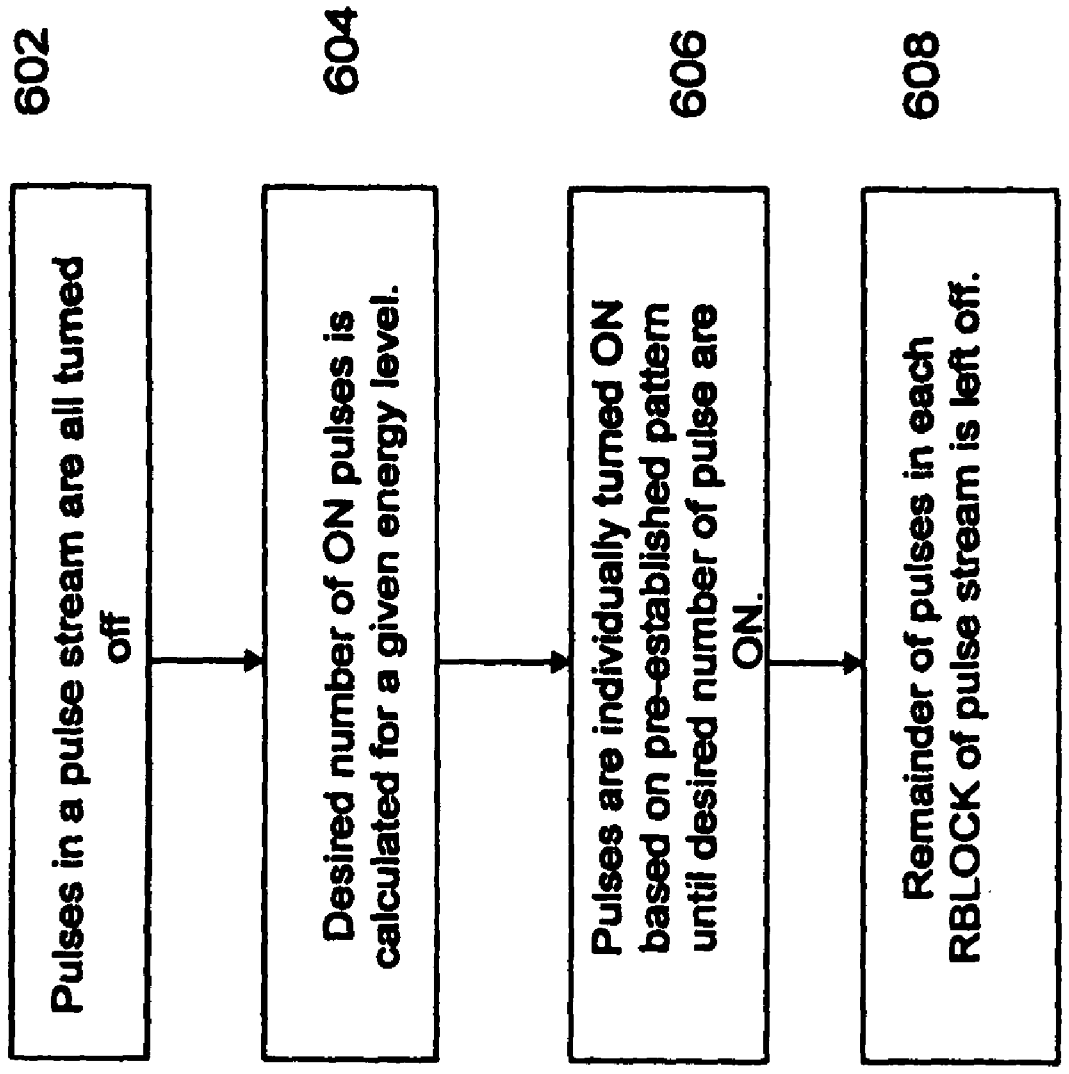
FIG. 6 illustrates a flowchart for the activation of pulses in a certain order according to an embodiment of the present invention.

A computer program may be implemented to turn on the pulse in a specific order for certain energy levels. The illustrated computer program assumes there are four repeat blocks, and that the number of interlace groups is the same for all repeat blocks. The pseudo code for the computer program to turn on the pulses in a specific order is listed below. A brief summary of the operation of the computer program is as follows. FIG. 6 illustrates a flowchart for the activation of pulses in a certain order according to an embodiment of the present invention. The pulses in a pulse stream for a given energy index are first all turned off 602. The desired number of ON pulses is calculated 604 for the given energy index. The pulses are individually turned ON, 606 e.g., by statement pulse [index]=1 until the desired number of ON pulses have been achieved. The pulses are turned ON based on a pattern established by the computer program. The remainder of the pulses in each of the RBLOCKs of stream for that energy index are left off 608.

```
Pulse [energy_index_Ei][pulse_num 0.. pulse num n] = 0
  for pulse_group in 0 .. 3:
  for interlace_group in (interlace groups per RBLOCK):
    for pulse_num in 0 .. 3:
      for rblock in 0 .. 3:
        index = rblock * rblock_size +
                interlace_group * interlace_group_size +
                pulse_group * pulse_group_size +
                pulse_num;
          if (on_pulses < desired_on_pulses);
            pulse[Ei][index] = 1;
            on_pulses=on_pulses + 1;
          else
            pulse[Ei][index] = 0;
```

FIG. 5(*c*) illustrates a plurality of pulse groups in an interlace group according to an embodiment of the present invention. Each of the interlace groups 514 includes a plurality of pulse groups 516. In an embodiment of the invention illustrated in FIG. 5(*c*), an interlace group 514 includes four pulse groups 516. In this embodiment, each of the four pulse groups 516 includes four pulses.

Values of bits in illustrative pulse groups 516 may be

| | |
|---|---|
| 1111 1111 0000 0000 | 1111 0000 0000 0000 |
| Pulse Groups 1-4 | Pulse Groups 5-8 |

By filling in pulse groups in the above matter, i.e., making each value in the pulse group the same, the thermal element drivers 218 (see FIG. 2), which receive the pulse streams, are exposed to less switching. MOSFET power switches in the thermal element drivers 218 do not switch as often as the power switches would if the pulse groupings allowed different values within the same pulse group 516. The reduced amount of switching produces reduced capacitive effects and reduced switching losses. The reduced capacitive effects and reduced switching losses means less vertical streakiness on the printed media.

As discussed above, in an embodiment of the invention, the pulse stream may also include bias pulses. The use of bias pulses to increase the recognizable number of optical densities or gray levels may be referred to as bias pulse subaddressing. For each pulse that is activated in a pulse stream, the value of the pulse stream is increased one pulse energy unit (PEU). The number of PEUs in a pulse stream identifies the energy level of the pulse stream, i.e., the energy level produced by the pulse stream on the specified media.

In an embodiment of the invention, a bias pulse group is added to each repeat block. In the embodiment of the invention where four repeat blocks are included in a pulse stream, four bias pulse groups are added. In an embodiment of the invention, the bias pulse groups are added to the end of the repeat blocks.

A bias pulse group includes an integer number of pulses. A variable pulse of the integer number of pulses in the bias pulse group has a variable duration. Normal pulses of the bias pulse group have a value opposite to the variable pulse, i.e., if the variable pulse is activated, the normal pulses are not activated.

In an embodiment of the invention, a bias pulse group includes four pulses. In this embodiment of the invention, the four pulses include a pair of normal pulses, a filler pulse, and a variable pulse. The pair of normal pulses and the filler pulse each have a duration of one pulse time. The variable pulse has a variable pulse time or duration. In this embodiment of the invention, the value of the pair of normal pulses is the opposite of the value of the variable pulse, i.e., if the pair of normal pulses are activated, the variable pulse is not activated.

In one embodiment of the invention, the duration of the variable pulse for each repeat block is different. Illustratively, if four repeat blocks are utilized, the variable pulse duration or time for the variable pulse for each repeat block are 2.125 (Repeat Block 0), 2.25 (Repeat Block 1), 2.25 (Repeat Block 2), and 2.375 (Repeat) times a standard pulse time. As will be illustrated below, the use of these bias pulses in various combinations allow for increments in pulse energy levels of 0, $\frac{1}{8}^{th}$, $\frac{1}{4}^{th}$, $\frac{3}{8}^{th}$, ½, $\frac{5}{8}^{th}$, $\frac{3}{4}^{th}$, and $\frac{7}{8}^{th}$. This leads to an increase in realizable gray levels by a factor of 8. Alternatively, if the variable pulse duration for each repeat block is the same, then a variable pulse duration of 2.25 times a standard pulse time may be utilized. Illustratively, if four repeat blocks are utilized and the variable pulse duration for the variable pulses in each of the four repeat blocks are 2.25, increments in pulse energy levels of 0, $\frac{1}{4}^{th}$, ½, or $\frac{3}{4}^{th}$ may be realized. This leads to an increase in realizable gray levels by a factor of 4 of energy levels/energy indexes.

The utilization of variable pulses in four repeat blocks, where the variable pulse durations are 2.125, 2.25, 2.25, and 2.375, is illustrated below. For example, gray level 150 may be an energy level that is achieved by a pulse stream of 600 ON pulses and 200 OFF pulses and gray level 151 may have an energy level that is achieved by a pulse stream of 601 ON pulses and 199 OFF pulses. In this illustration, the number of total gray levels or energy levels is limited by the number of pulses, which is 800. In an embodiment of the invention, 400 of the pulses are necessary to reach Dmin, or the minimum optical density level required to mark on the media. If the bias pulse groups are utilized, eight additional gray levels are realized between the 600 ON pulses and 601 ON pulses. The bias pulse group includes two normal pulses (pulses 0 and 1), an activation pulse (pulse 2), and a variable pulse (pulse 3).

Utilizing the bias pulse groups listed below allows the equivalent ON pulse energies of 600, 600.125, 600.25, 600.375, 600.500, 600.625, 600.750, and 600.875.

| additional pulse energy units | bias pulse group 0<br>pulse 0 1 2 3 | bias pulse group 1<br>pulse 0 1 2 3 | bias pulse group 2<br>pulse 0 1 2 3 | bias pulse group 3<br>pulse 0 1 2 3 |
|---|---|---|---|---|
| 0.000 | 1 1 X 0 | 1 1 X 0 | 1 1 X 0 | 1 1 X 0 |
| 0.125 | 0 0 X 1 | 1 1 X 0 | 1 1 X 0 | 1 1 X 0 |
| 0.250 | 1 1 X 0 | 0 0 X 1 | 1 1 X 0 | 1 1 X 0 |
| 0.375 | 0 0 X 1 | 0 0 X 1 | 1 1 X 0 | 1 1 X 0 |
| 0.500 | 1 1 X 0 | 0 0 X 1 | 0 0 X 1 | 1 1 X 0 |
| 0.625 | 1 1 X 0 | 1 1 X 0 | 0 0 X 1 | 0 0 X 1 |
| 0.750 | 0 0 X 1 | 1 1 X 0 | 0 0 X 1 | 0 0 X 1 |
| 0.875 | 1 1 X 0 | 0 0 X 1 | 0 0 X 1 | 0 0 X 1 |
| Durations | | | | |
| PEU (pulse energy units) | 1.0 1.0 2.125 | 1.0 1.0 2.250 | 1.0 1.0 2.250 | 1.0 1.0 2.375 |

As illustrated above, an incremental energy level of 0.625 may be obtained by activating the variable pulse in bias pulse groups 2 and 3. The incremental energy level is obtained because in bias pulse group 2, an additional 0.25 ON (activated) pulse is generated (if bias pulse group is not activated then 2 PEUs are generated, if the bias pulse group is activated, 2.25 PEUs are generated. In bias pulse group 3, an additional 0.375 ON (activated) pulse is generated. In an embodiment, the filler pulse is a placeholder and always provides 1 PEU to the pulse stream, but does not affect the fractional PEUs.

As discussed above, in an embodiment of the invention, some of the plurality of pulse streams transmitted in parallel to the plurality of thermal element drivers 220 (see FIG. 2) are offset from each other. In other words, pulse streams for different thermal elements 220 may have an offset. In the embodiment of the invention illustrated in FIG. 1, the engine controller 104 controls the offsets for the plurality of pulse streams. In the embodiment of the invention illustrated in FIG. 2, the printhead controller 216 controls the offset for the plurality of pulse streams. The offsetting of the pulse streams is determined by specific bits in the gray level values or density values, which may be referred to as offset bits. In an embodiment of the invention, the multi-media printer may have four complete pulse LUTs. Each of the pulse LUTS may have a different offset. In this embodiment, the 2 bits of the energy index of each pixel indicates which pulse LUT to use when selecting the pulse stream for that particular energy index in the image. Thus, the engine controller 104 may select the pulse LUT based on 2 bits, e.g., the high-order 2-bits. In an alternative embodiment of the invention, the engine controller 104 may read the offset bits and transmit zero (0) values to create the offset identified in the offset bits. In an embodiment of the invention, the printhead controller 216 may read the offset bits and transmit zero values to create the offset.

In one embodiment of the invention, the gray level or energy level value for a specific pixel may be specified in 12 bits, and 2 bits of the 12 bits identify the offset of the pulse stream for the specific thermal element. Any integer number of bits in the gray level or energy level value may be utilized as offset bits. In an alternative embodiment, the gray level may be specified in 14 bits, 2 bits of which identify the offset of the pulse stream.

The plurality of pulse streams corresponding to the plurality of thermal elements are offset in patterns that favor no offset over another offset. In other words, it is best if the different offsets are balanced. Illustratively, if there are 96 pulse streams for 96 thermal elements and 8 different offsets, then each of the eight offsets should be applied to 12 thermal elements. In one embodiment of the invention, each offset is an integer number of pulses and the integer number of pulses is a multiple of a first offset. Illustratively, an integer number of offset pulses may be four. Under operating conditions where four different offsets are utilized, offset(0) has no offset; offset(1) is a four pulse offset; offset(2) is an eight pulse offset (a multiple of the four pulse offset); and offset(3) is a twelve pulse offset. The offsets for each of the thermal elements 220 may follow a pre-established pattern. In an embodiment of the invention, the offset may be unchanged for the thermal element 220 for each line of the calibrated image. In an embodiment of the invention, the offsets are interspersed evenly among the thermal elements 220 on the printhead, e.g., the offsets are balanced.

In an embodiment of the invention, the printhead may include 4512 thermal elements. In this embodiment of the invention, the first offset (offset 0) is no pulses, the second offset (offset 1) is four pulses, the third offset (offset 2) is eight pulses, and the fourth offset (offset 3) is 12 pulses. The pulse values for the offset pulses may be zero, i.e., the offset pulses may not activate the thermal elements 220. Alternatively, the pulse values for the offset pulses may be programmed to be the values of the pulses shifted past the end of the line time due to the offsetting operation. In other words, the pulses shifted past the end of the line time due to offset delay may be wrapped around to the start of the pulse stream. In an embodiment of the invention, a pattern of offset may be as follows:

Thermal elements 0, 1, 14, 15, 16, 17, 30, 31, etc. have offset 0

Thermal elements 2, 3, 12, 13, 18, 19, 28, 29, etc. have offset 1

Thermal elements 4, 5, 10, 11, 20, 21, 26, 27, etc. have offset 2

Thermal elements 6, 7, 8, 9, 22, 23, 24, 25, etc. have offset 3

In an embodiment of the invention, the offset pattern, referred to as offset pattern 2, may be as follows:

Thermal elements 0, 1, 8, 9, 16, 17, 24, 25, etc. have offset 0

Thermal elements 2, 3, 10, 11, 18, 19, 26, 27, etc. have offset 1

Thermal elements 4, 5, 12, 13, 20, 21, 28, 29, etc. have offset 2

Thermal elements 6, 7, 14, 15, 22, 23, 30, 31, etc. have offset 3.

The offset pattern 2 may be simplified in the following manner as 0 0 1 1 2 2 3 3 0 0 1 1 2 2 3 3. The offset patterns, or distribution of offsets can be any pattern as long as the different offsets are evenly distributed among the thermal elements so that no offset is preferred over any other.

If either of the above-illustrated offset patterns are utilized, and the pulse streams minimally have $1/4^{th}$ of their respective pulses ON, and in combination with the order in which the pulses are filled in, this guarantees that the printhead power supply sees a minimum load of $1/4^{th}$ of all thermal elements 220 turned on for all pulse times. This reduces power supply transient artifacts.

The chart below illustrates the offsetting and resulting balancing in a graphical fashion. The first 16 thermal elements of the printhead are depicted, along with thermal element offsets, as are the resulting pulse streams (for the first 16 pulses) after the offset is applied. Illustratively, the minimum level pulse streams are depicted to show that even at the lowest energy levels, $1/4^{th}$ of all pulse streams are activated.

| thermal element → | 0 | 1 | 2 | 3 | 4 | 5 | 6 | 7 | 8 | 9 | 10 | 11 | 12 | 13 | 14 | 15 | pulses | out |
|---|---|---|---|---|---|---|---|---|---|---|---|---|---|---|---|---|---|---|
| offset → | 0 | 0 | 1 | 1 | 2 | 2 | 3 | 3 | 3 | 3 | 2 | 2 | 1 | 1 | 0 | 0 | ON | of |
| pulse 0 | 1 | 1 | 0 | 0 | 0 | 0 | 0 | 0 | 0 | 0 | 0 | 0 | 0 | 0 | 1 | 1 | 4 | 16 |
| pulse 1 | 1 | 1 | 0 | 0 | 0 | 0 | 0 | 0 | 0 | 0 | 0 | 0 | 0 | 0 | 1 | 1 | 4 | 16 |
| pulse 2 | 1 | 1 | 0 | 0 | 0 | 0 | 0 | 0 | 0 | 0 | 0 | 0 | 0 | 0 | 1 | 1 | 4 | 16 |
| pulse 3 | 1 | 1 | 0 | 0 | 0 | 0 | 0 | 0 | 0 | 0 | 0 | 0 | 0 | 0 | 1 | 1 | 4 | 16 |
| pulse 4 | 0 | 0 | 1 | 1 | 0 | 0 | 0 | 0 | 0 | 0 | 0 | 0 | 1 | 1 | 0 | 0 | 4 | 16 |
| pulse 5 | 0 | 0 | 1 | 1 | 0 | 0 | 0 | 0 | 0 | 0 | 0 | 0 | 1 | 1 | 0 | 0 | 4 | 16 |
| pulse 6 | 0 | 0 | 1 | 1 | 0 | 0 | 0 | 0 | 0 | 0 | 0 | 0 | 1 | 1 | 0 | 0 | 4 | 16 |
| pulse 7 | 0 | 0 | 1 | 1 | 0 | 0 | 0 | 0 | 0 | 0 | 0 | 0 | 1 | 1 | 0 | 0 | 4 | 16 |
| pulse 8 | 0 | 0 | 0 | 0 | 1 | 1 | 0 | 0 | 0 | 0 | 1 | 1 | 0 | 0 | 0 | 0 | 4 | 16 |
| pulse 9 | 0 | 0 | 0 | 0 | 1 | 1 | 0 | 0 | 0 | 0 | 1 | 1 | 0 | 0 | 0 | 0 | 4 | 16 |
| pulse 10 | 0 | 0 | 0 | 0 | 1 | 1 | 0 | 0 | 0 | 0 | 1 | 1 | 0 | 0 | 0 | 0 | 4 | 16 |
| pulse 11 | 0 | 0 | 0 | 0 | 1 | 1 | 0 | 0 | 0 | 0 | 1 | 1 | 0 | 0 | 0 | 0 | 4 | 16 |
| pulse 12 | 0 | 0 | 0 | 0 | 0 | 0 | 1 | 1 | 1 | 1 | 0 | 0 | 0 | 0 | 0 | 0 | 4 | 16 |
| pulse 13 | 0 | 0 | 0 | 0 | 0 | 0 | 1 | 1 | 1 | 1 | 0 | 0 | 0 | 0 | 0 | 0 | 4 | 16 |
| pulse 14 | 0 | 0 | 0 | 0 | 0 | 0 | 1 | 1 | 1 | 1 | 0 | 0 | 0 | 0 | 0 | 0 | 4 | 16 |
| pulse 15 | 0 | 0 | 0 | 0 | 0 | 0 | 1 | 1 | 1 | 1 | 0 | 0 | 0 | 0 | 0 | 0 | 4 | 16 |
| . . . | | | | | | | | | | | | | | | | | | |

As illustrated, each of the pulse times, e.g. pulse time 3, pulse time 10, and pulse time 13 have four pulses on. This results in the printhead power supply seeing at the minimum $1/4^{th}$ of a full load for each pulse time. This results in good power supply load balancing even at minimum energization time. With more pulses activated, as is the case for any additional energy levels, the power supply would have more than $1/4^{th}$ of a full load. The pulse stream offsets repeat for each row on the page. In other words, in an embodiment of the invention, the offset never changes for a given thermal element as the page travels past it.

Figure 7:
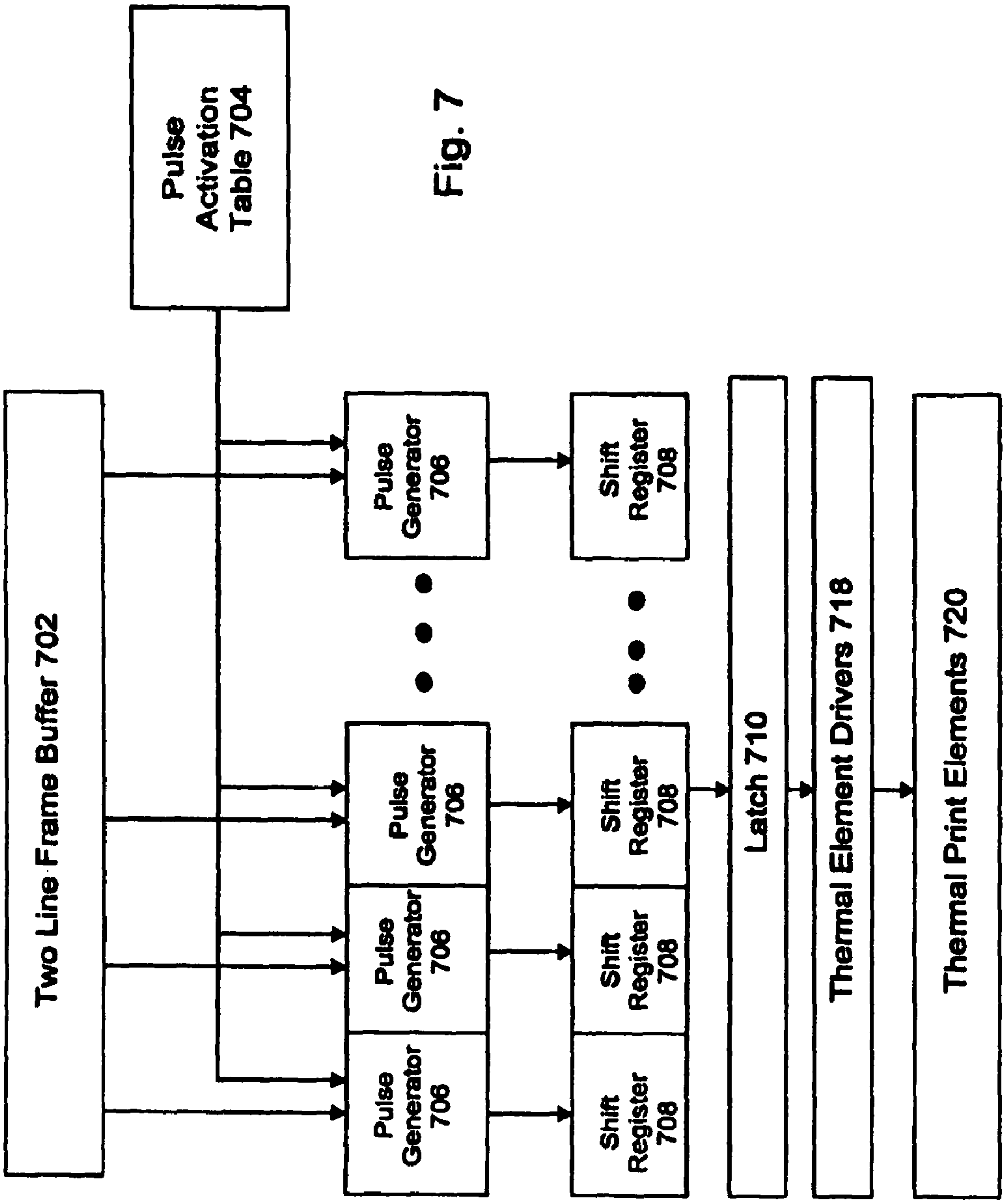
FIG. 7 illustrates a thermal printhead including a pulse activation table (PAT) according to an embodiment of the present invention.

FIG. 7 illustrates a thermal printhead including a pulse activation table (PAT) according to an embodiment of the present invention. The thermal printhead 700 includes a multiple line frame buffer 702, e.g., 2 line frame buffer 702, a pulse activation table 704, a plurality of pulse generator modules 706, a plurality of shift registers 708, an output latch 710, a plurality of thermal element drivers 718, and a plurality of thermal elements 720. In an embodiment of the present invention, a printhead controller 216 (see FIG. 2) may include the above-mentioned elements except for the plurality of thermal element drivers 718 and the plurality of thermal elements 720.

The pulse activation table 704 is stored on the printhead controller 216. The pulse activation table (PAT) 704 may be originally configured during manufacture and may be stored on the printhead controller 701. In an embodiment of the invention, the PAT may be stored in the host controller 102 and transmitted to the printhead controller 216, specifically the PAT memory 704, during initialization of the multi-media printer. In an embodiment of the invention, the host controller 102 may download the PAT to the printhead controller 216 and it may be stored in the PAT 704.

A simple pulse activation table (PAT) is illustrated below. The pulse LUT which corresponds to the PAT illustrated below is as follows.

| | Pulse Number: | | | |
|---|---|---|---|---|
| Energy Index | 0 | 1 | 2 | 3 |
| 0 | 0 | 0 | 0 | 0 |
| 1 | 1 | 0 | 0 | 0 |
| 2 | 1 | 0 | 1 | 0 |
| 3 | 1 | 1 | 1 | 0 |
| 4 | 1 | 1 | 1 | 1 |

In the example illustrated above, pulse 0 is activated for gray levels (energy indexes) 1 and above. Pulse 1 is activated for gray levels (energy indexes) 3 and above. Pulse 2 is activated for gray levels (energy indexes) 2 and above. Pulse 3 is activated for gray levels (energy indexes) 4 and above. A pulse activation energy for a given pulse tells the energy, at which, and above which, the pulse should be activated. For example, if the PAT entry is 512 for the $400^{th}$ pulse, then any pixel with an energy index or level of 512 or higher will have the $400^{th}$ pulse enabled. As discussed above, in an embodiment of the invention, the PAT entry for the $400^{th}$ entry. In other words, the location of the PAT in the list or array of PAT entries identifies the pulse that the PAT entry corresponds to.

| Pulse Number | Pulse Activation Energy |
|---|---|
| 0 | 1 |
| 1 | 3 |
| 2 | 2 |
| 3 | 4 |

Illustratively, as the chart above illustrates, in order to generate a pulse activation energy of 4 and higher, pulse number three needs to be active, along with pulses number 2, 1, and 0. This is true because pulses will not be deactivated to achieve higher gray levels, only more pulses will be activated. In other words, pulses are only activated with increasing energy. As energy increase, no pulse turned ON at a lower energy will ever be turned OFF at a higher energy.

As discussed above, after a line or row of pixels has been printed, the next line of calibrated pixels (energy indexes) is transmitted from the plurality of storage registers to the plurality of active registers in the double buffer 702 (2 line frame buffer). The plurality of pulse generators 706 may each receive a plurality of energy indexes from the active register of the frame buffer 702. In one embodiment of the invention, each of the energy indexes is represented in sixteen bits. In an embodiment of the invention, each of the energy indexes is represented in thirteen bits. In the embodiment of the invention illustrated in FIG. 7, each of the plurality of pulse generators 706 may receive 64 energy indexes from the plurality of active registers. In an embodiment of the invention, the pulse generators 706 may receive the 64 pixel energy indexes in parallel or the pulse generators may receive the 64 energy indexes in serial. In this embodiment of the invention, 71 pulse generators may each receive 64 energy indexes in order to coincide with the 4512 thermal print head elements.

The plurality of pulse generators 706 retrieve the pulse activation energy for a corresponding pulse from the pulse activation table 704. For the line being printed, if this is the first pulse, a counter is initialized at zero. The plurality of pulse generators 706 each compare the plurality of energy indexes for each of the pixels or energy indexes to the pulse activation energy for the pulse location being generated. While the plurality of pulse generators 706 operate in parallel, the comparison between the energy indexes and the pulse activation energy for the pulse location occurs in a serial manner. In other words, if 64 pulses are input to a pulse generator 706 and are being compared to the pulse activation energy for a pulse position, e.g., position 128, each of the 64 pulses are compared in a serial manner. In the comparison, a pulse generator 706 determines whether the energy index is greater than or equal to the pulse activation energy, and if the energy is greater than or equal to the pulse activation energy, then an active pulse is transmitted from the pulse generator 706 to the shift register 708 for the pixel or energy index that is being compared. To maintain the flow of data between the thermal elements, the shift register 708 allows data to be shifted out as the next data is being shifted in. In an embodiment of the invention, the shift register 708 contains two banks where data is shifted into the first bank while it is being shifted out of the second bank. When the first bank is full, the data is shifted to the second bank from the first bank.

If the pulse generator 706 determines the energy index is less than the pulse activation energy, then an inactive (non-active) pulse is generated. Each of the plurality of pulse generators 706 performs this operation and makes the comparisons for the integer number of energy indexes it receives. In the embodiment of the invention illustrated in FIG. 7, each of the plurality of pulse generators 706 may perform 64 comparisons.

The plurality of pulse generators 706 transmit the generated pulses to the corresponding plurality of shift registers 708. The plurality of shift registers 708 waits until all of the comparisons are performed by the plurality of pulse generators 706 and then the plurality of shift registers 708 output a plurality of output pulses in parallel to the output latch 710. After the plurality of output pulses are received by the output latch 710, the output latch 710 transmits the output pulses to the corresponding thermal element drivers 718, which in turn transmit the output pulses onto the corresponding thermal elements 720. After this occurs, the counter is incremented, and the energy index in the plurality of active registers is compared to the next pulse activation energy for the next pulse position. For example, the pulse activation energy for the second pulse is compared the energy indexes in the plurality of active registers 702. The next pulse for all thermal elements 720 is generated by repeating the process described above. In an embodiment of the invention, the process continues until the counter reaches a maximum value, equal to the number of pulses that may fit into a line time, or, in another embodiment, when no more pulse activation energies remain in the pulse activation table 704. After this occurs, the next line of energy indexes, i.e., pixels, is transferred from the plurality of storage registers to the plurality of active registers in the frame buffer 702 and the next line of data is transmitted from the engine controller to the printhead controller's plurality of storage registers in the frame buffer 502.

Figure 8:
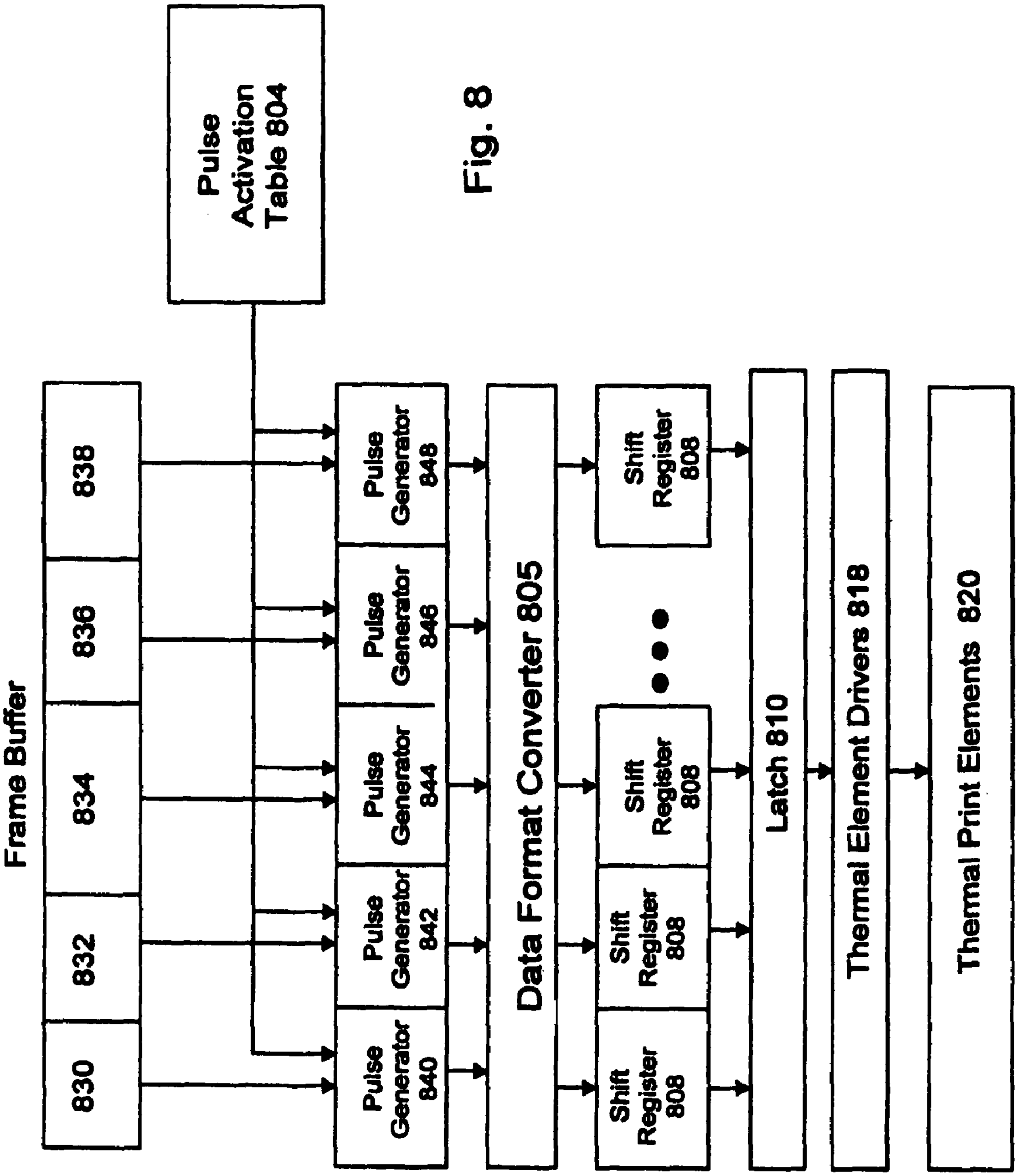
FIG. 8 illustrates a printhead including a pulse activation table including a smaller number of pulse generators and a divided frame buffer according to an embodiment of the present invention.

FIG. 8 illustrates a printhead including a pulse activation table including a smaller number of pulse generators and a divided frame buffer according to an embodiment of the present invention. The thermal printhead 800 includes five frame buffers 830, 832, 834, 836, and 838, five pulse generators 840, 842, 844, 846, and 848, a data format converter 805, seventy-one 64-bit shift registers 808, an output latch 810, a plurality of thermal element drivers 818, and a plurality of thermal elements 820. In this embodiment, active registers in each of the five double buffers 830, 832, 834, 836, and 838 transfer energy indexes to corresponding plurality of pulse generators 840, 842, 844, 846, and 848. Because of the smaller number of pulse generators 840, 842, 844, 846, and 848, the pulse generators are operating at a higher frequency and can process a greater number of pixels or energy indexes. In an embodiment of the invention, 1024 pixels may be stored in each frame buffer 830, 832, 834, 836, and 838, and these may be received at each of the pulse generators 840, 842, 844, 846, and 848 after transmission from the corresponding frame buffer. The pulse generators 840, 842, 844, 846, and 848 transmit the pulses, as described above, by making the comparisons between the pulse activation energies for a pulse position and the energy indexes for the pixel being compared.

The generated pulses, or activation levels for the pulses, are output to a data format converter 805. The data format converter 805 then redistributes the generated pulses to the proper location in the corresponding shift-register 808, e.g., a 64-bit shift register, in the plurality of shift registers. The plurality of shift registers 808 waits until all of the comparisons are performed by the plurality of pulse generators 840, 842, 844, 846, and 848, and then the plurality of shift registers 808 output a plurality of output pulses in parallel to the output latch 810. To maintain the flow of data to the thermal elements, the plurality of shift registers 808 and the data converter 805 allow data to be shifted out as it is being shifted in.

In one embodiment of the invention, the plurality of shift registers 808 and the data converter each contain two banks. Data is shifted into the first bank while it is shifted out of the second bank. When the first bank is full, data is then shifted into the second bank, while it is shifted out of the first.

After the plurality of output pulses are received by the output latch 810, the output latch 810 transmits the output pulses to the corresponding thermal element drivers 818, which in turn transmits the output pulses onto the corresponding thermal elements 820. The reduction in the amount of the pulse generators reduce the amount of hardware resources in the multi-media printer.

Figure 9:
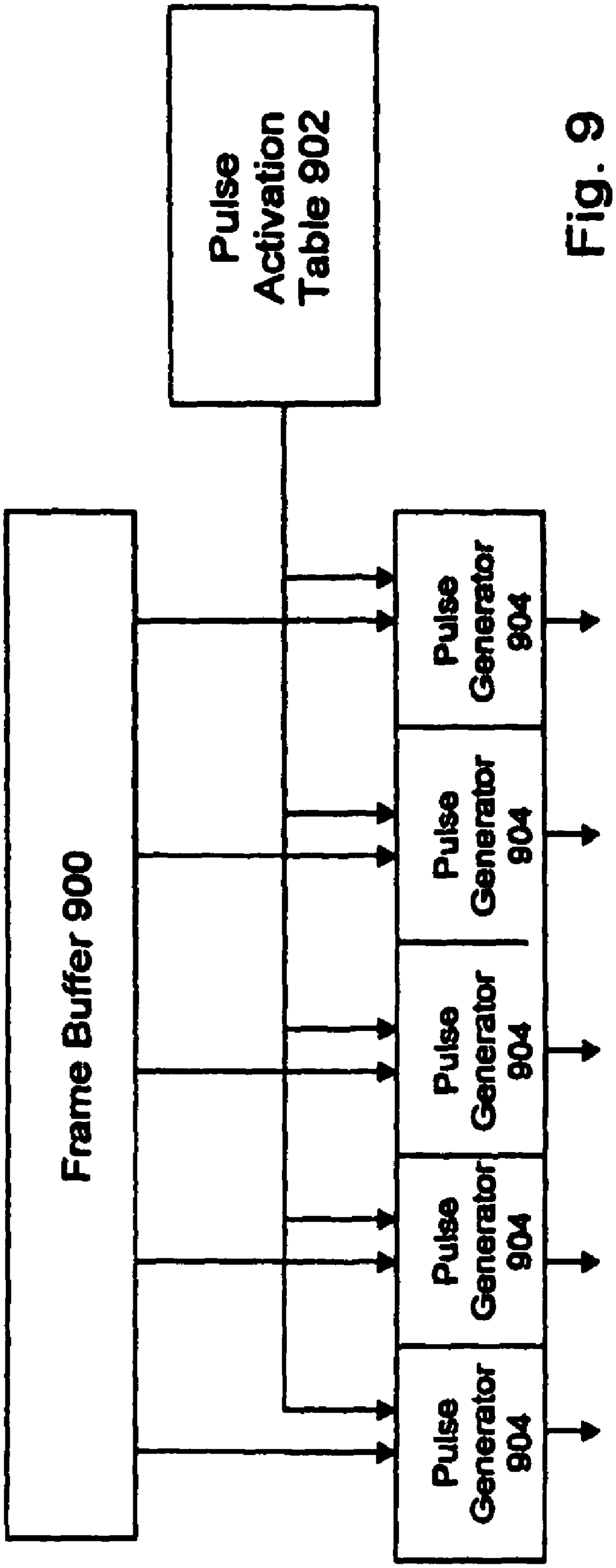
FIG. 9 illustrates a frame buffer, a pulse activation table, and a plurality of pulse generators according to an embodiment of the present invention.

FIG. 9 illustrates a frame buffer, a pulse activation table, and a plurality of pulse generators according to an embodiment of the present invention. As discussed above, the energy indexes stored for plurality of pixels in the frame buffer 900 are compared to entries in the pulse activation table 902 by a plurality of pulse generators 904. Each pulse generator generates a pulse stream for each of the plurality of pixels based on the comparison. In an embodiment of the invention, bias pulse sub-addressing and offsetting may be added to the use of the pulse activation table technology. To perform bias pulse sub-addressing and offsetting, the pulse generator 902 may be programmed to perform sub-addressing and offsetting, the data in the pulse activation table 902 contains certain information, and the energy values in the frame buffer 900 contain certain information. All three pieces work together.

The frame buffer 900 contains an array of pixels in a desired image (a row of the desired image), each pixel having been processed through a calibration LUT such that the value associated with the pixel is an energy index or energy value. The energy values output from the calibration LUT have a size of an integer number of bits. Under certain operating conditions, the number of bits is 13 per pixel and under other operating conditions, the number of bits is 16 bits per pixel.

When the energy indexes or energy values are processed by the pulse generator 904 using the PAT table 902, different bits of the energy indexes or values are evaluated separately. In an embodiment of the invention where 16 bits represent the energy values, the bits of the energy values for pixels stored in the frame buffer 900 are evaluated as follows:

| Bit | Name | Description |
|---|---|---|
| 15-13 | Unused | Unused |
| 12-3 | WHOLE_PULSE | 10 bit value indicating number of whole pulses |
| 2-0 | SUB_ADDRESS | 3 bit bias sub-pulse-addressing value |

As the above table illustrates, the low-order "SUB_ADDRESS" bits are treated as bias sub-addressing bits. This means that the low-order bits indicate the fraction of a whole pulse that an energy value requires for the corresponding pixel. The high-order "WHOLE_PULSE" bits are treated as indicating the number of whole pulses in the pulse stream required by the energy value for the corresponding pixel.

As the pulse generator 904 is building the pulse stream, i.e., making the comparisons for each of the pulse positions, the whole pulse value is mapped one-to-one with the number of normal heating pulses that are turned on. While, as discussed above, 25% of the normal pulses are ON, even for whole pulse value 0, i.e., the lower energy level, subsequent energy levels starting with whole pulse value 1 will turn on identically one and only one additional pulse for each increment of one in the whole pulse value. In other words, for whole pulse value 2, one additional pulse will be turned on and for whole pulse value 3, one more additional pulse will be turned on. This is important for maintaining an energy map from the pulse stream that has no holes (missing energy levels) in it and that maintains monotonicity.

The pulse generator 904 handles the SUB_ADDRESS bits differently. When making bias pulses in the pulse stream, the PAT entries corresponding to the bias pulses are encoded to tell the pulse generator whether the pulses are to be energized or not, depending on the value of the sub-address bits in the image value. Thus, the pulse generator uses the PAT entries and the high- and low-order bits of the image energy value to generate normal pulses and also bias pulses of the pulse stream.

In order to tell the pulse generator 904 which pulse blocks are bias pulse blocks, the PAT entries are encoded with flags to indicate which of the pulses are bias pulses. In an embodiment of the invention, each entry in the PAT list or array of entries 902 is an integer number of bits.

In one embodiment, each entry in the PAT list 902 is composed of 16 bits. Encoding for the 16 bits is illustrated in the table below. In an embodiment of the present invention, the pulse activation thresholds stored in the PAT 902 may be one bit larger than the WHOLE_PULSE bits (which may be 10 bits long) in the image energy value. Under certain operating conditions, some pulse stream types require some pulses to be turned OFF. In order to have some pulses that are always OFF, the number of bits in the image value must be less than the number of bits in the PAT entry.

| Bit | Name | Description |
|---|---|---|
| 15 | BIAS_BLOCK | If set, this pulse is a bias pulse |
| 14 | BIAS_NEXT_BLOCK | If set, the next pulse block in the pulse stream will be a block of bias pulses. (provides advance notice to the pulse generator). |
| 13-11 | | Unused. |
| 10-0 | | If this is a normal pulse (not a bias pulse), bits 10-0 hold the pulse activation threshold (11 bits) for the pulse. Is compared against the whole pulse bits portion of the pixel image energy value from the frame buffer. |
| 7-0 | | If this is a bias pulse, bits 7-0 encode pulse energization based on value of low-order sub-address portion of pixel image energy value. |
| 7 | | If bias pulse, this bit holds pulse energization if value of SUB_ADDRESS = 7 |
| 6 | | If bias pulse, this bit holds pulse energization if value of SUB_ADDRESS = 6 |
| 5 | | If bias pulse, this bit holds pulse energization if value of SUB_ADDRESS = 5 |
| 4 | | If bias pulse, this bit holds pulse energization if value of SUB_ADDRESS = 4 |
| 3 | | If bias pulse, this bit holds pulse energization if value of SUB_ADDRESS = 3 |
| 2 | | If bias pulse, this bit holds pulse energization if value of SUB_ADDRESS = 2 |

-continued

| Bit | Name | Description |
|---|---|---|
| 1 | | If bias pulse, this bit holds pulse energization if value of SUB_ADDRESS = 1 |
| 0 | | If bias pulse, this bit holds pulse energization if value of SUB_ADDRESS = 0 |

A sample PAT Table 902 is illustrated in the table below. Bit 14 is set for the four pulses in block 1 to indicate that the next block includes a bias pulse. In block 2, bit 15 is set to identify this pulse group as a bias pulse group and then the bits 7-0 of block 2 indicate the pulse energization value depending on the subaddress. In other words, depending upon the Sub_Address specified in the energy level field of the pixel in the frame buffer 900, a certain bit will hold pulse energization. For example, if the sub_address field is 2, the value contained in the second bit (bit 2) determines the value of this pulse in the pulse stream for this pixel in the frame buffer. If the sub_address field is 7, the value contained in bit 7 determines the activation level of this pulse.

advanced by 8 pulses (1 pulse block). Similarly, pixels (8×n)+6 and (8×n)+7 are advanced by 12 pulses (3 pulse blocks). In this embodiment, pulse blocks that contain a bias pulse are not offset.

The following table illustrates how the pulse streams may be offset by the pulse generator 904. Each column in the table is the numbers of the pulse blocks in a sample (incomplete) pulse stream. A pulse block that represents a bias pulse block is highlighted in bold, e.g. pulse block 8. In this embodiment

| | | Bit | | | | | | | | | | | | | | | |
|---|---|---|---|---|---|---|---|---|---|---|---|---|---|---|---|---|---|
| Block | Pulse | 15 | 14 | 13 | 12 | 11 | 10 | 9 | 8 | 7 | 6 | 5 | 4 | 3 | 2 | 1 | 0 |
| 0 | 0 | 0 | 0 | Unused | | | 11-bit pulse activation threshold | | | | | | | | | | |
| 0 | 1 | 0 | 0 | Unused | | | 11-bit pulse activation threshold | | | | | | | | | | |
| 0 | 2 | 0 | 0 | Unused | | | 11-bit pulse activation threshold | | | | | | | | | | |
| 0 | 3 | 0 | 0 | Unused | | | 11-bit pulse activation threshold | | | | | | | | | | |
| 1 | 0 | 0 | 1 | Unused | | | 11-bit pulse activation threshold | | | | | | | | | | |
| 1 | 1 | 0 | 1 | Unused | | | 11-bit pulse activation threshold | | | | | | | | | | |
| 1 | 2 | 0 | 1 | Unused | | | 11-bit pulse activation threshold | | | | | | | | | | |
| 1 | 3 | 0 | 1 | Unused | | | 11-bit pulse activation threshold | | | | | | | | | | |
| 2 | 0 | 1 | 0 | Unused | | | | | | 7 | 6 | 5 | 4 | 3 | 2 | 1 | 0 |
| 2 | 1 | 1 | 0 | Unused | | | | | | 7 | 6 | 5 | 4 | 3 | 2 | 1 | 0 |
| 2 | 2 | 1 | 0 | Unused | | | | | | 7 | 6 | 5 | 4 | 3 | 2 | 1 | 0 |
| 2 | 3 | 1 | 0 | Unused | | | | | | 7 | 6 | 5 | 4 | 3 | 2 | 1 | 0 |
| 3 | 0 | 0 | 0 | Unused | | | 11-bit pulse activation threshold | | | | | | | | | | |
| 3 | 1 | 0 | 0 | Unused | | | 11-bit pulse activation threshold | | | | | | | | | | |
| 3 | 2 | 0 | 0 | Unused | | | 11-bit pulse activation threshold | | | | | | | | | | |
| 3 | 3 | 0 | 0 | Unused | | | 11-bit pulse activation threshold | | | | | | | | | | |

The pulse generators 904 are also pre-programmed to perform pulse stream offsetting as described above. The offsetting may be pre-programmed into the pulse generators 904 in which the offset used is keyed to the position of the thermal element of the printhead such that no offset is favored over any other.

In an embodiment of the invention, pulses are generated in blocks of 4 pulses at a time. Because pulses are interlaced and offset in blocks of 4 pulses, the generating of 4 pulses at a time is efficient. In an embodiment of the invention, the offsetting is selected in groups of 2 neighboring thermal elements. Pixels numbered (8×n)+0 and (8×n)+1 (where n=0:563) all utilize the non-shifted (non-offset) pulse stream. For pixels (8×n)+2 and (8×n)+3, the pulse stream is advanced (offset) by 4 pulses (1 pulse block). Pixels (8×n)+4 and (8×n)+5 are of the invention, the bias pulse blocks are not offset. This is because the variable-length bias pulses must all occur at the same point in time since the bias pulses have a different pulse duration. Pulse duration is controlled for all thermal elements of the printhead simultaneously. If not all of the 1024 available pulses in the pulse stream are used, the first 3 pulse blocks are repeated at the end of the PAT table (meaning if the PAT entries are not greater than 1024, meaning less than 1024 bit positions are utilized, then the first three pulse blocks are repeated. This allows the offsetting mechanism to simply keep advancing in the PAT table beyond the number of pulses rather than wrapping around at the end of the pulse stream for offsets that run out. If all 1024 pulses are used, the pulse generator will automatically wrap around to the beginning of the PAT table for pulse blocks 256, 257, and 258.

| Pixel 8n + 0 | Pixel 8n + 1 | Pixel 8n + 2 | Pixel 8n + 3 | Pixel 8n + 4 | Pixel 8n + 5 | Pixel 8n + 6 | Pixel 8n + 6 | Pixel 8n + 0 | . . . |
|---|---|---|---|---|---|---|---|---|---|
| 0 | 0 | 1 | 1 | 2 | 2 | 3 | 3 | 0 | |
| 1 | 1 | 2 | 2 | 3 | 3 | 4 | 4 | 1 | |
| 2 | 2 | 3 | 3 | 4 | 4 | 5 | 5 | 2 | |
| 3 | 3 | 4 | 4 | 5 | 5 | 6 | 6 | 3 | |
| 4 | 4 | 5 | 5 | 6 | 6 | 7 | 7 | 4 | |
| 5 | 5 | 6 | 6 | 7 | 7 | 9 | 9 | 5 | |
| 6 | 6 | 7 | 7 | 9 | 9 | 10 | 10 | 6 | |
| 7 | 7 | 9 | 9 | 10 | 10 | 11 | 11 | 7 | |
| **8** | **8** | **8** | **8** | **8** | **8** | **8** | **8** | **8** | |
| 9 | 9 | 10 | 10 | 11 | 11 | 12 | 12 | 9 | |
| 10 | 10 | 11 | 11 | 12 | 12 | 13 | 13 | 10 | |
| 11 | 11 | 12 | 12 | 13 | 13 | 14 | 14 | 11 | |
| 12 | 12 | 13 | 13 | 14 | 14 | 15 | 15 | 12 | |
| 13 | 13 | 14 | 14 | 15 | 15 | 16 (0) | 16 (0) | 13 | |
| 14 | 14 | 15 | 15 | 16 (0) | 16 (0) | 17 (1) | 17 (1) | 14 | |
| 15 | 15 | 16 (0) | 16 (0) | 17 (1) | 17 (1) | 18 (2) | 18 (2) | 15 | |

To better address the thermal management problem discussed above, a multipart approach was developed. Real-time voltage control is developed to address darkening down the page as the printhead heats up. Real-time voltage control is implemented that measures printhead temperature during the course of marking and also smoothly adjusts the voltage or some other control signal applied to the thermal elements. In doing so, marked density is maintained at nominal despite gross changes in printhead temperature. A compensation is implemented to address the change in printhead bow. The compensation is applied to the desired image prior to printing so that the compensation approximates the bow and provides the inverse of the density effect of bow, canceling its effect. A finite-element thermal model is utilized to address all other thermal heat storage artifacts. The finite-element thermal model is used to predict the initial conditions of the thermal elements prior to each line and the rate of heat flow out of them, and the finite-element thermal model determines a corrected amount of energy to apply for every pixel in the image such that the output correctly matches the desired input. The real-time voltage control, the bow compensation, and the finite-element thermal model may be referred to as the thermal management model.

During the marking of a page of media, thermal energy is imparted to the thermal elements. This energy for a given thermal printhead is given as:

$$E_i = P_i \cdot t_i = (V^2/R_i) \cdot t_i \quad (1)$$

Where: $E_i$ is the energy imparted to thermal element i $P_i$ is instantaneous power developed in thermal element i $t_i$ is duration that thermal element i is turned on. This is the aggregate time that the pulse stream is enabled for this thermal element during a line time V is the "printing voltage" applied to the thermal elements of the printhead. The voltage is common to all thermal elements.

$R_i$ is the electrical resistance of thermal element i

The total energy developed in each print line is the sum of $E_i$ for all thermal elements in a line. As lines are printed, this energy is mostly directed into the printhead substrate and heatsink, raising their temperature. The increased temperature increases the initial condition temperature of the thermal elements for printing subsequent lines, affecting the subsequent lines output density marked on the media.

To correct for this, the aggregate heatsink temperature is measured by use of thermistors built into the printhead or its heatsink. This temperature is correlated to density variation. Because the relationship of temperature and density is direct and measurable, a compensation for the density effect of temperature can also be achieved.

In one embodiment of the invention, a profile relating the variance of temperature from nominal to the variance of density from nominal is created and saved in memory. Another profile relating printing voltage variation to density variation is also stored in memory. The memory may be non-volatile. During printing, the temperature is measured in real-time at fixed or variable intervals and the voltage is adjusted in a manner such that the predicted density error due to any measured temperature difference from nominal is restored by a counterbalancing voltage change. Each time a voltage change is commanded by the controller, the voltage change is provided in small increments over a range of lines such that the commanded change is imperceptible to the trained eye in the marked media.

In an embodiment of the invention, multiple profiles relating variance of temperature from nominal to the variance of density from nominal, given multiple temperatures at the start of the marking of a page, are created and saved in memory. Similarly, multiple profiles relating printing voltage variation to density variation, given different temperatures at the start of marking a page, are also stored in memory. The memory may be non-volatile. During printing, the temperature at the start of marking the page is recorded, and the family of profiles closest to this starting temperature is selected. From this point, the voltage is adjusted in a manner that counteracts the predicted density difference expected based on the temperature difference from nominal or from the start of the page.

In an embodiment of the invention, a single profile is created that directly maps temperature error to the voltage change that will produce the desired counteraction. Alternatively, multiple profiles are created for different temperatures at the start of marking a page that directly map temperature error to the voltage change that will produce the desired counteraction.

In an embodiment of the invention, the pulse width of the pulses applied to the thermal elements can be adjusted according to a profile that correlates pulse width duty cycle to density variation for a single starting temperature or for multiple starting temperatures.

In an embodiment of the invention, a pulse stream is modified in real-time to counteract the predicted density variation due to heatsink temperature.

In an embodiment of the invention, the predicted change in printhead temperature over the course of marking a page is pre-computed by a printer controller generating a profile.

This profile is then used in place of real-time printhead or heatsink temperature measurements for determining the predicted density error. This predicted density error is then used for generating the commanded change in voltage, pulse width, or other signal to counteract the change in density from nominal. The predicted change in temperature is created using the measured electrical resistance profile of the thermal printhead and knowledge of the printhead voltage, and the image being printed.

In an embodiment of the invention, two or more thermistor banks are used at locations in the printhead and heatsink assembly, respectively, and possibly also in the ambient air to measure temperature at different locations as heat travels away from the thermal elements toward the environment. Using these measured temperatures, a computation of heat flow can be created that determines the rate at which heat is flowing away from the thermal elements or their substrate. By combining the temperature of the substrate with the rate of heat flow out of the thermal elements or substrate, an adjusted voltage can be computed that provides an adjusted energy to the thermal elements such that the energy built up in the thermal elements during the line time is restored to nominal. Alternatively, a pulse width duty cycle or the pulse stream can be modified in real time to provide the energy adjustment.

In addition to the use of real-time voltage control to compensate for printhead heatsink temperature variations, the adjustable nature of the printhead voltage is used in an embodiment of the invention to compensate for overall density variations in the system. These variations include variations in media density response from production lot to production lot, variations in the average resistance of the thermal heating elements of the printhead, variations in print pressure, heatsink bow, platen hardness, and variations in ambient temperature. By providing a power supply with variable-voltage capability for the thermal printhead energization voltage and by providing the engine controller with the ability to command the power supply to produce desired voltages, the voltage can be changed prior to printing and during printing to compensate for these and other effects.

In an embodiment of the invention, a calibration film or transparent media is printed and measured with a densitometer that is either built into the multi-media printer or supplied by the user. The densitometer readings are fed back into the engine controller that uses the densitometer readings according to a predetermined table to adjust the voltage applied to the printhead so that desired average densities are obtained.

In an alternative embodiment of the invention, the calibration film consists of multiple marked density patches that are varied in real-time by known printing voltage adjustments with known values. The density patches are measured by an internal densitometer or a user-supplied densitometer, and the measurements are fed back into the engine controller. In this case, the voltage that will produce the density closest to the target is interpolated or extrapolated from the measured density patches and the voltages that printed the measured density patches. This interpolated voltage is used as the target voltage for printing so that the desired output densities are obtained.

In an embodiment of the invention, the average resistance of the thermal printhead heating elements is measured. This resistance is used to compute a desired nominal printing voltage based on a nominal power for marking the desired media. This nominal voltage is then modified by the densitometer calibration results to account for other density variation in the thermal printing system.

In an embodiment of the invention, the calibration of film or transparent media using a test print and a densitometer reading generates a power adjustment factor that is used to adjust the nominal printing power for a given media. This power factor is then used to adjust the nominal power setting for all media types. In this case, the other media types are ones that cannot be measured with the internal densitometer or the external densitometer equipment. As a result, the power adjustment factor computed for achieving desired output densities for film media is used as a reference for adjusting other media as well.

In an embodiment of the invention, the power factor measured for film media is measured using calibrated and controlled media such that the power factor decided upon is calibrated and controlled. In this case, the effect of applying the film power factor to other media types will have more uniform results from one production lot of printers to the next.

In an embodiment of the invention, the power adjustment factor created using calibrated and controlled media is used to adjust the target marking power of non-film media. In this case, additional film calibrations can be run by the user, according to the embodiments discussed above, and the voltage adjustment factor is used instead of the pre-existing power adjustment factor for film media. In an alternative embodiment, the film calibration is used in addition to the pre-existing calibration for film media.

Printhead bow compensation is handled in a variety of manners. In an embodiment of the present invention, the density variation of uniform gray value images of different nominal density values is measured. The hardcopy output is measured at multiple points across the width and height of the marked field generating a profile. This profile is used to pre-adjust images prior to printing to counteract for the effect of the change in printhead bow during the course of marking an image.

In an alternative embodiment of the invention, an idealized curve shaped similar to the effect of bow on density is generated. This curve is used to pre-adjust an image prior to printing according to a profile of gain and polarity that is pre-generated such that the effect of the change in printhead bow during the course of a print is counteracted.

To compensate for the remaining thermal memory effects of the printing system, a finite element model of the printing system is used. In an alternative embodiment of the invention, this model can be expanded to also include compensation for page-length thermal gradients in place of the real-time voltage control system described above.

Figure 10:
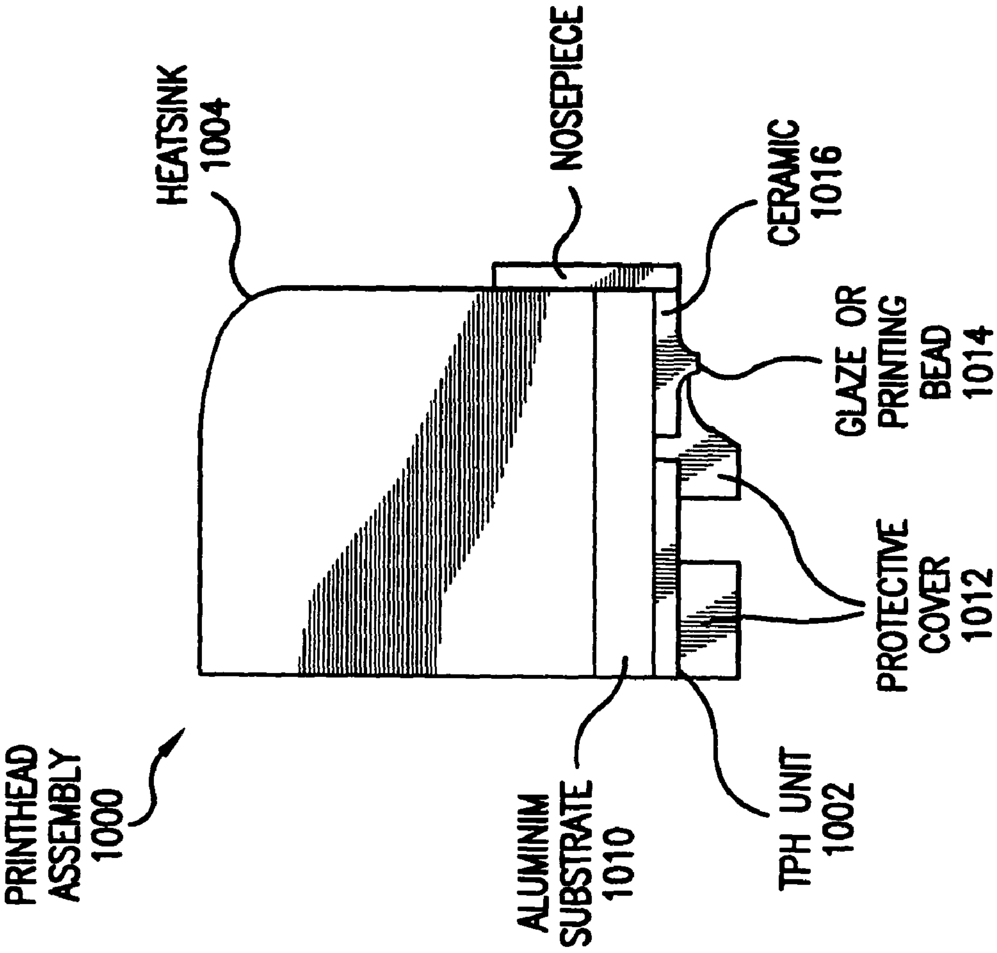
FIG. 10 illustrates a thermal printhead assembly according to an embodiment of the invention.

FIG. 10 illustrates a thermal printhead assembly according to an embodiment of the invention. The thermal printhead assembly 1000 shown in FIG. 10 is constructed with a thermal printhead unit ("tph") 1002 and a heatsink 1004. The thermal printhead assembly includes an aluminum substrate 1010, a protective cover 1012, glaze or a printing bead 1014, a ceramic portion 1016, and a nosepiece 1018. The heatsink 1004 is designed to allow airflow through fins to remove excess thermal energy via convection. The thermal printhead assembly 1000 presents a number of layers of thermal storage, each layer presenting a certain thermal mass. These layers of thermal mass are connected to each other with thermal interfaces, each providing a certain thermal impedance. Energy can be shared between adjacent layers of thermal mass according to the laws of thermodynamics. Energy can also be shared or spread out within particular thermal layers via an intrinsic thermal impedance associated with each thermal layer. In general, the farther a thermal storage layer is from the thermal heating elements, the greater its thermal mass. This is not necessary, but it is generally true for most thermal printing systems.

Figure 11:
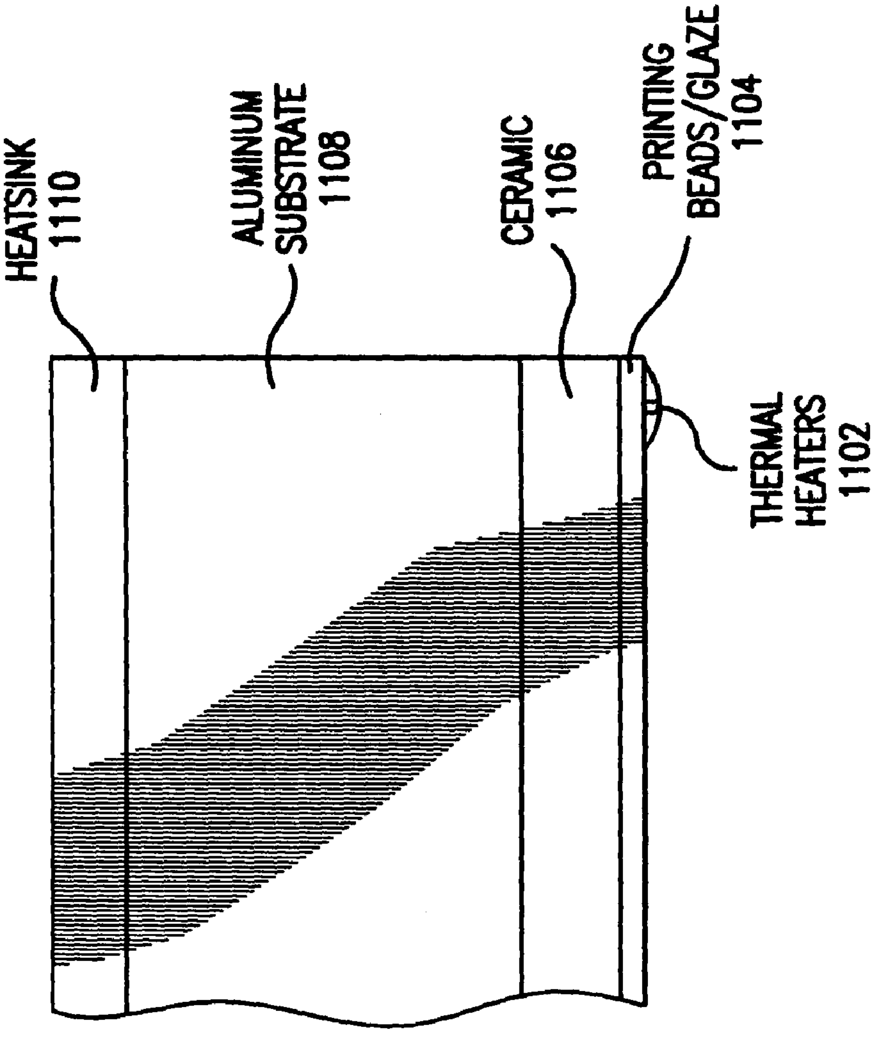
FIG. 11 illustrates a thermal printhead and the layers of thermal mass according to an embodiment of the present invention.

FIG. 11 illustrates a thermal printhead and the layers of thermal mass according to an embodiment of the present invention. The layers of thermal storage begin with the thermal elements 1102, followed by the printing bead or "glaze" 1104, the ceramic substrate 1106, the aluminum substrate 1108, and the heatsink 1004 (see FIG. 10). This general grouping can be expanded to include more layers of thermal storage or to include sub-layers of the ones stated here. The grouping can also be simplified by aggregating layers or sub-layers.

To compensate for the effects of the physical properties of the printhead assembly 1000 on printing, this thermal printhead system is modeled in software. The software thermal printhead model is used by the engine controller prior to printing each image to predict the effect of the image on the thermal system and to pre-adjust the image taking these effects into account so that the marked output will accurately reflect the desired densities input in the source image.

The layers of thermal mass in the software thermal printhead model are not required to be perfectly correlated with the actual physical storage elements in the system. Instead, it is sufficient that the model effectively express a number of layers of different thermal mass with different thermal impedances between them. The printing system also includes heat storage layers in the media, an interface between the thermal heaters and the media, and a heat source provided by the thermal elements as they are modulated according to pulse streams to impart the desired image on the target media.

This system is superior to previous art in that the software thermal printhead model is very effective at eliminating thermal storage artifacts for use in highly-scrutinized medical applications. It is also very compute-efficient. It is media independent. The software thermal printhead model is easily adapted to be run at different print speeds and energy levels. The software thermal printhead model can express and compensate for thermal time constants as large as an entire page with as few as one additional layer of storage elements in the model. The large amount of guesswork and computation required by fixed matrix algorithms of the prior art is eliminated.

In order to create the software thermal printhead model, a simple thermal circuit model is assumed. In the actual printhead assembly 1000, different thermal layers of the system are decomposed into multiples of thermal storage elements, each connected to its neighbor via an intra-layer thermal impedance. Between layers, adjacent thermal storage elements are connected with inter-layer thermal impedances. Energy is provided to the system via a multiple of thermal heating elements that impart thermal energy directly into the lowest layer of thermal storage elements. Energy is also shared between the highest level of thermal storage elements and the environment via other assumed thermal impedances.

In the software thermal printhead model, thermal storage elements are expressed as thermal masses. They have a state expressed as temperature. The thermal connections are expressed as thermal impedance and they have a state expressed as heat flow. The energy applied to the system is modeled as Joules of thermal energy applied to the thermal storage elements associated with the thermal heating elements.

FIG. 12 illustrates an electrical equivalent of the software thermal printhead model. In an alternative embodiment, the system can be implemented assuming an electrical equivalence model in which temperature is represented by voltage 1200, heat flow is represented by electrical current 1202, thermal impedance is represented by electrical resistance 1204, thermal storage elements are represented as electrical capacitors 1206, 1208, 1210, 1212, and 1214, and thermal energy applied to the system by the thermal elements is represented by the application of electrical charge to the capacitors 1206, 1208, 1210, 1212, and 1214 modeling the thermal elements. Either model is computationally equivalent, the models are just expressed differently. The storage element for the thermal element is represented by capacitor 1206. The storage element for the glaze is represented by capacitor 1208. The storage element for the ceramic substrate is represented by capacitor 1210. The storage element for the aluminum substrate is represented by capacitor 1212. The storage element for the heatsink is represented by capacitor 1214.

In an embodiment of the invention, four levels of heat storage are modeled. The layer 1 is located directly at the thermal element heating traces. These are assumed to have negligibly-small thermal mass such that all energy applied to a thermal element 1102 is either transferred to the media or the next layer of thermal storage. The thermal heaters 1102 are modeled to share energy between themselves, however. The heaters 1102, with such small thermal mass, have thermal time constants of less than one line time in magnitude. In the software thermal printhead model, one thermal storage element is modeled per thermal element 1102.

The second level of heat storage is the print bead (or glaze) 1104 on which the thermal elements 1102 are etched. The time constant is a little slower, encompassing approximately 5 or 10 print lines. The third level of heat storage is the ceramic substrate 1106 behind the print bead 1104, with a thermal time constant of approximately one or two inches of media marking. Fourth is the aluminum baseplate or substrate 1108 of the printhead. This has an even larger time constant. In an embodiment, thermistors are embedded in this baseplate, and the average temperature of the aluminum substrate 1108 is compensated for with real-time voltage control, but gradients across it are not. Finally, there is a large heatsink 1110 to which the head is attached. This has the slowest time constant and, in the embodiment, is ignored because the time constant is page-length in size and the effect of its state is compensated by real-time voltage control. In addition, due to its very large relative thermal mass, the temperature of the heatsink 1110 can be considered constant relative to the temperatures of the lower layers. Because of these factors, the heatsink is considered to be the environmental or ambient condition.

In alternative embodiments of the present invention, the thermal storage of the heatsink 1110 is included in the software thermal printhead model, possibly eliminating the need for real-time voltage control, and possibly improving density uniformity. The improvement in density uniformity is due to the better knowledge of the system provided by the software thermal printhead model versus the point temperature measurements provided by the thermistors attached to the printhead.

In this embodiment of the invention, the number of finite thermal storage elements modeled per thermal storage layer is equal to the number of thermal elements on the printhead. This provides ease of computation, but it requires algorithmic heat spreading within each layer among these storage elements. In an alternative embodiment of the invention, the number of thermal storage elements modeled per layer decreases as distance from the thermal elements increases. This provides intrinsic heat spreading eliminating algorithmic code for computing heat spreading within layers. But it complicates computation of heat transfer from one layer to the next. In this discussion, the former is assumed, but application to the latter is also a presumed extension.

In an embodiment of the invention, a capacitance and a temperature is stored for each thermal storage element. The capacitance for each level is fixed. The temperature is stored as degrees Centigrade. The temperature can be set to a range including the actual temperatures. It is more important that the relative temperatures are correct. The capacitance multiplied by the thermal impedances determines the thermal time constants at each node of the software thermal printhead model. Each capacitor is represented as a register. The change in temp of each capacitor, which is updated with each print line, is a result of the net inflows of heat into it and its capacitance.

In the model, heatflow INTO an element is defined as having positive sign, and heatflow OUT of an element has a negative sign.

Finally, the amount of energy that must be applied to any given thermal element for the purpose of marking the desired density on the media is a result of the initial temperature of the thermal element at the start of each print line and the expected heat flows out of the thermal element into neighboring pixels and into the glaze.

In the software thermal printhead storage model, the following storage is defined.

rate of flow of thermal energy between two objects is proportional to the difference in temperature between them. The rate of flow of thermal energy between two objects is inversely proportional to the thermal impedance that connects them. The temperature of an object is directly proportional to the thermal energy stored within it. The change in temperature of an object is proportional to the flow of thermal energy into it and inversely proportional to the thermal capacitance or thermal mass of the object.

As a matter of principle, the application of a compensation for print artifacts must not change net printing density in the steady-state. To achieve this goal with thermal history compensation, the steady-state of the software thermal printhead model is precomputed for each image gray level. This is the state of the software model after printing many lines of flat gray field data until the model state stops changing. When actual compensation of the image data is performed, the predicted state of the glaze is compared with the steady-state of the glaze in order to arrive at a difference that is used to adjust the energy in the image. By comparing with the steady-state, actual steady-state printing does not receive a net compensation, which means that flat field data will not receive a net change in density due to application of this compensation.

In an alternative embodiment of the invention, the predicted temperature of the glaze layer is compared to a fixed

| Storage Name | Description |
|---|---|
| mp_DHTemps[ HEAT_STORAGE_LEVELS ][ CapsPerLevel ]: | This is a matrix of temperatures of each of the heat storage elements or “capacitors” in the printing system. The heat storage levels begin with level 0, which is the print bead, and ends with level (HEAT_STORAGE_LEVELS − 1), which is the large heatsink, or else the farthest thing away from the print bead that we store data for. |
| m_DHCapacitance[ HEAT_STORAGE_LEVELS ] | These are the thermal capacitances for the thermal storage elements at each heat storage level. |
| m_AmbientTemp | Ambient temperature to which the farthest level of heat storage elements is exposed. This value is a constant. |
| m_DHSpreadFactor[ HEAT_STORAGE_LEVELS ] | These are the thermal impedances between elements of the same heat storage level. For instance, m_DHSpreadFactor[0] is the thermal impedance between thermal element on the print bead. |
| m_InterLevelImpedance[ HEAT_STORAGE_LEVELS ] | These are the impedances between storage elements at level of the index and the next level up. For index (HEAT_STORAGE_LEVELS − 1), the impedance is between the heat storage elements at that level and the environment. |
| m_DHLevel1SteadyState[ 1 << m_ProcSigBits ] | This array holds the steady-state temperatures at heat storage level 1 for each gray level. This data is used to provide the compensation value for each pixel based on the temp at Level 1 relative to the steady-state value. This way, flat gray fields, which achieve steady-state in the model will have no compensation applied to them. Thus, dot history compensation will not alter sensitometry, which is very important. |

The section above described the software thermal printhead model of the thermal printing system. The software model is used to compensate images to eliminate thermal memory artifacts. An algorithm is designed to apply basic principles of thermodynamics to the model to simulate the operation of the actual hardware during printing. To do this, the algorithm updates the state of the software thermal printhead model at regular intervals using these principles. The basic thermodynamic principles are as follows. The flow of thermal energy is called “heat” or heat flow. Thermal energy always flows from areas of high temperature to areas of low temperature. Uninterrupted, it will do this until everything is at the same temperature, at which point heat flow stops. The temperature for a means of providing a compensation value for the energy level in the image. This method is effective for removing visible smearing and thermal memory artifacts. But it modifies the density transfer function of the printer. In addition, any tuning of the model parameters will also change the density transfer function. These are not desirable behaviors.

In an embodiment, the steady-state of the software thermal printhead model at each gray level is computed by iterating through the software model in the same manner that is used for compensating the image except that it can be performed on one slice of the printhead assembly rather than the whole thing. One element from each thermal storage layer is used.

Since this assumes flat field images, there is no need for heat spreading within layers, and single elements can be used. This method is effective because any non-ideal behaviors of the model due to a slow update rate will be equally reflected in the steady-state computation. Thus, the steady-state computation will correctly match steady-state achieved during printing. The result is no net change in density from the application of thermal memory compensation.

In alternative embodiment of the invention, the steady-state of the software thermal printhead model can be computed for every gray level using theoretically ideal calculations rather than iteration. This is an efficient method, but due to the discrete update rate of the software model, the pre-calculated steady state will not perfectly match the steady state computed during normal printing, and density offset errors can occur. The result is a possible change in the steady-state density transfer function of the printer.

Before the image processing is begun, the software model is reset to predetermined initial conditions (temperatures). This is done at the start of each image, or plane of image in the case of three or four pass color printing, since the printhead will return roughly to a steady-state before each new print pass.

Image compensation starts at the top of the image to be compensated and proceeds down the image, one line at a time. The algorithm follows the following basic steps for compensating each line of image data.

First, the line of image data is converted via a calibration LUT from raw image data, or intended density data, into energy values that are expected to be produced from the printer. These energy values may be expressed in terms of physical properties such as Joules of energy. Alternatively, they can be expressed in digital values ranging from zero to a maximum value that map from the minimum energy the multi-media printer can provide to the maximum energy the multi-media printer can provide. Once conversion to energy space has occurred, the image data is assumed to be proportional to the energy that will be provided by the printer. In all subsequent discussion, reference to image data will assume that the data has already been transformed to energy space, e.g., energy levels.

Next, the line of image data is compensated based on the state of the software thermal printhead model at the start of the line. Thermal storage level 1 (the thermal elements, themselves) have very low thermal mass. As a result, it is assumed that between each print line, the thermal elements deliver all their excess energy to their neighbors and eventually to the glaze bead that they rest on. As a result, the thermal elements are assumed to start out each line with the same temperature as the glaze. Given the temperature of the glaze, e.g., thermal level 2, that supports it, the desired energy of the pixel, and the desired energy of its neighbors, an adjustment energy is determined for each pixel of the line, and therefore, each thermal heater of the printhead. The pixels of the image map one to one with the thermal heaters of the printhead. This adjustment must be relative to the pre-computed steady-state glaze temp for the desired gray level of the pixel. This way, we will not affect steady-state density.

In an embodiment, the adjustment of a pixel is accomplished as follows:

$$\text{thermal\_variance} = T_i - T_{Ei}$$

$$E_{i\_ideal} = E_i - \text{thermal\_variance} \cdot K_{DH} \quad (2)$$

where:

thermal_variance is the difference in temperature in the model between thermal element i and its steady-state temperature $T_i$ is the temperature of thermal element i in the model $T_{Ei}$ is the steady-state temperature of thermal element i for given desired energy level E $E_i$ is the desired energy level for thermal element i $E_{i\_ideal}$ is the energy that must actually be imparted to thermal element i in order to produce the desired output density for the marked pixel, given the initial temperature of the thermal element $K_{DH}$ is an experimentally-determined gain constant.

At this point, $E_{i\_ideal}$ is the energy value needed for pixel i so that the desired gray level can be achieved, given the temperature of the substrate (glaze) behind pixel i. This value will be assumed to be the net energy applied to the thermal element when the line is marked, and it is the value that will be used to update the software thermal printhead model in preparation for the next line of image data. However, this is not the gross energy that will be applied. Instead, $E_{i\_ideal}$ must be adjusted to account for energy flow between the thermal element i and its neighboring elements, (i−1) and (i+1). Recall that the model assumption is that heat flow into an element is positive in sign and heat flow out of an element is negative. Each pixel energy in the row of image data is adjusted according to the following formula:

$$\text{delta\_energy\_}rt = E_{i+1\_ideal} - E_{i\_ideal}$$

$$\text{delta\_energy\_}lt = E_{i-1\_ideal} - E_{i\_ideal}$$

$$E_{i\_actual} = E_{i\_ideal} - (\text{delta\_energy\_}lt + \text{delta\_energy\_}rt) \cdot KS_1 \quad (3)$$

where:

$E_{i\_ideal}$=the energy that must be imparted to thermal element in order to produce the desired output density for the marked pixel, given the initial temperature of the thermal element delta_temp_rt=the difference in desired energy between thermal element i and its neighboring pixel to the right delta_temp_lt=the difference in desired energy between thermal element i and its neighboring pixel to the left $KS_1$=an experimentally-determined constant that denotes the spread of energy between elements at thermal layer 1 (thermal heater level)

$E_{i\_actual}$=the energy that must actually be applied to thermal element i to produce energy $E_{i\_ideal}$.

$E_{i\_actual}$ is the compensated energy value for pixel i in the current line of image data that will produce the correct marked density given the present state of the thermal model.

Once every pixel in the current line of image data is compensated, the software thermal printhead model must be updated with the excitation energy that printing the line of image energies provides. Updating the model will prepare it for compensating the next line of image data in the compensation process. Updating the software model is performed in two parts. First, heat is propagated outward from each thermal storage element to the thermal storage element behind it. This is done through all the layers of the model. Then the heat is spread or shared between storage elements within the same heat storage layers.

Heat propagation outward starts with the layer farthest from the thermal heater layer. The reason for this is that capacitance decreases as we move toward the glaze. The temperature effect will be much greater for the capacitor that is nearer the glaze. If the print bead first is updated first, the change in the glaze will be very small compared to the change that it would have been had the software model updated the heatsink first. So, starting outward and moving inward reduces model errors. In addition, doing this eliminates potential stability problems in the software model. Because of the slow update rate of the software model, this becomes important.

Heat propagation uses the idealized energies, $E_{i\_ideal}$, for this computation, to avoid figuring out how much energy flows between elements at level 1. This information has been figured into the idealized energies already.

Starting with the outermost layer, the energy flow into each heat storage level from the level below it is computed using the difference in temperature and the thermal impedance between them. Then, the temperatures of both levels are updated using the calculated heat flow and the thermal capacitance at both levels. These operations are performed as follows:

$$heatflow_{i,level} = \frac{(T_{i,level-1} - T_{i,level})}{I_{level-1,level}} \quad (4)$$

$$T_{i,level,new} = T_{i,level} + heatflow * C_{level}$$

$$T_{i,level-1,new} = T_{i,level-1} - heatflow * C_{level-1}$$

where:

$T_{i,level}$ is the temperature of the thermal storage element i in thermal storage layer "level"

$T_{i,level-1}$ is the temperature of the thermal storage element i in thermal storage layer "level−1"

$heatflow_{i,level}$ is the heatflow into thermal storage element i in layer "level"

$C_{level}$ is thermal capacitance of elements in thermal layer "level"

$C_{level-1}$ is thermal capacitance of elements in thermal layer "level−1"

$T_{i,level,new}$ is the updated temperature of thermal storage element i in thermal storage layer "level"

$T_{i,level-1,new}$ is the updated temperature of thermal storage element i in thermal storage layer "level-1"

$I_{level-1,level}$ is the interlevel thermal impedance between layers (level−1) and (level)

In an alternative embodiment of the invention, the update rate is more frequent than once per line, or less frequent than once per line.

In an alternative embodiment of the invention, the heat is propagated outward starting with the thermal heating elements and iterating outward toward the heatsink.

In an alternative embodiment of the invention, the software thermal element model is developed in three dimensions rather than two, and the heat is propagated outward one plane at a time.

In an alternative embodiment of the invention, the number of thermal storage elements is not fixed, but is fewer or more than the number of heaters in the printhead, depending on the thermal layer in question. In this case, the heat flow from a layer with fewer elements is divided proportionately into the nearest two storage elements of the layer with more elements.

In an alternative embodiment of the invention, the heat flow between two storage layers is computed using differential equations such that the decay and charge of the thermal capacitances sharing the energy is taken into account, rather than using just the initial temperatures to calculate the heat flow.

Once heat propagation outward is completed, heat spreading within individual layers is performed. The energy flow between neighboring elements in each heat storage level is computed. Because every thermal storage element at a given level has the same thermal capacitance, the computation is very straightforward. Temperature is distributed among elements in equal proportions. There is no capacitance difference that would cause differences in the magnitude of change for the same heat flow.

In order to computer the energy flow between neighboring elements, a simple running average approach is used. For each storage element, the average temperature of a given number of elements to each side of it is computed. The element is then adjusted up or down based on the difference between its temperature and the average of its neighbors. This averaging approach spreads heat much faster in the software model than does looking only at single neighboring elements and does this with a fairly low computation cost. First, a list of average temps of neighboring elements is created for each thermal storage element in the layer.

$$Tave_{i,level} = \frac{\sum_{j=i-reach}^{j=i+reach} T_{j,level}}{2 \cdot \mathrm{reach} + 1} \quad (5)$$

where:

$Tave_{i,level}$ is the average temperature of the window of thermal storage elements ranging around element i in thermal storage layer "level", where the window ranges from (i−reach) to (i+reach)

$T_{j,level}$ is the temperature of the thermal storage element j in thermal storage layer "level"

reach is the number of elements to each side of a thermal storage element to include in the sum to be compared against element i for heat spreading purposes Once the list of averages is computed for all thermal storage elements in the storage layer, energy is spread or transferred among elements of the layer in the model. This is accomplished according to the following formula:

$$\Delta T_{i,level} = Tave_{i,level} - T_{i,level}$$

$$T_{i,level,new} = T_{i,level} + \Delta T_{i,level} \cdot KS_{level} \quad (6)$$

where:

$KS_{level}$ is an experimentally-determined constant that denotes the spread of energy between elements within thermal layer "level". This number is related to the conductance and capacitance of the thermal storage elements of the layer.

Once each element i in each thermal layer is updated with a new temperature based on the computed spreading of heat within a layer, the process of updating of the model state is complete. At this point, the model is ready to be used for compensating a new row of image data as discussed above, and the process is repeated. This continues until the entire image has been compensated using the thermal storage model, at which point, the image is ready for printing.

Pseudo-code is listed below for an embodiment of the software thermal printhead storage model or software thermal printhead model.

1. Set up default parameters in model, including
thermal capacitance of each storage level,
thermal impedances between levels,
number of pixels and spread factors for spreading
heat within a storage level,
and ambient conditions (ambient Temperature).
2. Compute steady-state model values for
storage level 1 by applying each
of the possible pixel energy values to modeled
"thermal elements" and iterating outward propagation,
of heat among levels until model reaches
steady-state. Store results in memory.
3. Set ImageRow = 0.
4. For each pixel in ImageRow, apply calibration
LUT to pixel value to convert from gray
values to energy values.
5. For each pixel in ImageRow, compute ideal
energy it would require in order to produce
desired density, based on modeled temperature of
storage element behind it, according to equation (2).
(if temperature of storage element behind pixel is
less than computed steady-state temperature for the
pixel gray value, then increase energy value of
pixel to compensate)
(if temperature of storage element behind pixel is
greater than computed steady-state temperature for the
pixel gray value, then decrease energy value of
pixel to compensate)
6. For each pixel in ImageRow, compute true
energy to apply based on ideal energy
computed in 5, above and the amount of
energy that will flow into neighboring
thermal elements of printhead rather
than into the element for the pixel
in question, according to equation (3).
This true energy is the compensated energy
value for the pixel that will actually be
printed. It is compensated for thermal behavior
of printing system.
7. Start of Update Model State
(state is defined as
temperature of thermal
storage elements)
8. Start of propagate heat outward
away from thermal elements in
thermal model.
9. Set Level = outermost level (ie: 4)
10. For each storage element in level, compute
heatflow from relative storage element in
level below it according to equation (4)
11. Update temperature of each element in level
based on net heatflow into it and its
thermal capacitance according to
equation (4)
12. Decrement level, i.e., level = level − 1, If level equals second-lowest level, go to 14.
13. Go to 10. above.
14. Start of spread heat out within storage level.
15. Set Level = outermost level (ie: 4)
16. Compute average temperature of neighbors for each
storage element in level according to
equation (5)
17. Spread thermal energy among storage elements
in level according to equation (6).
18. Decrement level, i.e., Level = Level − 1, If Level equals lowest level, go to 20.
19. Go to 16. above.
20. Increment ImageRow, i.e., ImageRow = ImageRow + 1.
If ImageRow is Less than the total number of image rows, Go to 4. above.
21. Done compensating image for thermal
storage behavior of printing system.
--- End of PsuedoCode ----

FIG. 12(*a*) illustrates a flowchart of the software thermal printhead model according to an embodiment of the present invention. The flowchart is an illustrative example of a potential model with many other models possible. In FIG. 12(*a*), the default parameters in the model are set 1250. This includes thermal capacitances of each storage level, thermal impedances between levels, number of pixels and spread factors for spreading heat within a storage level and ambient conditions.

The steady-state model values are computed 1252 for storage level 1 by applying each of the possible pixel energy values to modeled thermal elements and iterating outward propagation of heat among levels until the model reaches steady-state. The results are stored in a memory.

The image row (ImageRow) is set 1254 to 0. For each pixel in ImageRow, a calibration LUT is applied 1256 to the pixel value to convert from gray values to energy values. For each pixel in ImageRow, ideal energy is computed 1258, where the ideal energy is the energy required to produce the desired density, based on modeled temperature of the storage element behind it, according to equation (2) above.

Energy value of pixel is increased or decreased 1260 based on the comparison of the temperature of the storage element behind the pixel to the computed steady-state temperature for the pixel gray value. If temperature of storage element behind pixel is less than computed steady-state temperature for the pixel gray value, then increase energy value of pixel to compensate. If temperature of storage element behind pixel is greater than computed steady-state temperature for the pixel gray value, then decrease energy value of pixel to compensate.

For each pixel in ImageRow, compute 1262 true energy to apply based on ideal energy computed in step 1258 and also on the amount of energy that will flow into neighboring thermal elements of the printhead rather than into element for the pixel in question, according to equation (3) above. This true energy is compensated energy for value of the pixel that will be printed.

Set 1264 the level to the outermost level. For each storage element in the level, compute 1266 the heatflow from relative storage element in level below it according to equation (4), discussed above. Update 1268 the temperature of each element in level based on net heatflow into it and its thermal capacitance according to equation (4) discussed above.

Decrement the level 1270. If level equals second-lowest level, proceed to next step. If level is greater than second-lowest level, return to step 1266. Set 1272 level to outermost level. Compute 1274 the average temperature of the neighbors for each storage element in the level according to equation (5) discussed above.

Spread 1276 the thermal energy among storage elements in the level according to equation (6) discussed above. Decrement the level 1278. If the level is equal to the lowest level, proceed to the next step. If the level is not equal to lowest level, return to step 1274. Increment ImageRow 1280. If ImageRow is less than the total number of image rows, then return to step 1256.

In an embodiment of the present invention, the update rate is more frequent than once per line, or less frequent than once per line. The faster the update rate that is used, the more iterations are used and the smaller the change per iteration. The result is a model that more accurately reflects the real system. However, faster update rates also require more computation time.

In an embodiment of the present invention, the thermal model is developed in three dimensions rather than two, and the heat is spread within a plane of thermal storage elements in the model rather than a line.

In an embodiment of the invention, the number of thermal storage elements is not fixed, but is fewer or more than the number of heaters in the printhead, depending on the thermal layer in question. In this case, the thermal spreading operation may not be required for some or any thermal storage layers by virtue of the fact that the number of storage elements can be chosen that produces an intrinsic spreading effect when heat is propagated outward from one layer to the next.

In an embodiment of the invention, the heat spreading within layers is computed using differential equations such that the decay and charge of the thermal capacitances sharing the energy is taken into account, rather than using just the initial temperatures to calculate the heat flow.

In an embodiment of the invention, heat spreading within layers is computed by applying a weighted average of the temperatures of the thermal storage elements in the range around the thermal element in question. This way, greater significance can be given to nearest neighbors, more accurately reflecting the physical system.

Tuning model parameters and compensation values is an iterative process that requires some trial and error as well as some skill in evaluating image quality and image artifacts. In an embodiment of the invention, an ambient temperature may be chosen that reflects reality, such as 45° C. A number of thermal storage layers for the model are selected that roughly approximates the number of thermal time constants believed to be in the system. In an embodiment, three or four storage layers may be utilized. A number of storage elements per thermal layer is chosen or selected. Computation is easiest when the number is equal to the number of thermal heating elements in the printhead. Then, null values for thermal spreading are chosen. Inter-layer thermal impedance values are selected such that, for the range of gray values, the steady-state temperatures of the model reflect knowledge of the real temperatures that develop in the printing system. Null starting values are selected for thermal capacitance for each layer. A very large value for $K_{DH}$ is chosen so that the effect of model parameters is very visible in the printed output. Test prints are created and, starting with the capacitance nearest the print glaze, increase its value until it provides an effect in the image with a thermal time constant on the order of a few pixels. The capacitance of the next layer outward from the glaze is adjusted until it provides an effect in the image with a thermal time constant on the order of a half inch or so. The capacitance of the next layer outward from the glaze is adjusted until it provides an effect in the image with a thermal time constant of a next reasonable value. The process continues until all time constants of the artifact are handled by the model.

In an embodiment of the invention, using a method similar to the above, thermal time spreading reaches and KS values are added in such that the spreading of the artifacts are equally demonstrated in the effect of the model. $K_{DH}$ is adjusted to a value such that the artifacts are compensated away or eliminated rather than under- or over-compensated. Model parameters and compensation values are iterated until the results are acceptable.

Full-bleed printing may be utilized in the multi-media printer. Various measures can be taken to allow full-bleed printing without damaging the thermal print head. To achieve this, the following pieces of information are needed and should be detected: (1) the location of the media in the direction of media motion; (2) the lateral location of the media; and (3) the media skew.

FIGS. 13(*a*) and 13(*b*) illustrate edge sensing systems according to an embodiment of the present invention. The edge (side) of the media can be detected optically using a linear array 1312 of photosensitive elements (sensor) 1302 and a single illumination source 1304. The edge (side) of the media can be detected optically using a linear array 1312 of photosensitive elements (sensor) 1302 and two illumination sources 1306 and 1308. In the single illumination source embodiment, the illumination source 1304 may be placed on one side of the edge of the media 1310 while the detector (sensor) 1302 is placed on the other side. When the edge of the media 1310 is passed between the source 1304 and the detector (sensor) 1302, an image of the edge of the media 1310 will be projected on the linear detecting array 1312 of the (sensor) 1302. The portions of the sensor 1302 that are covered by the media 1310 will receive a different light level than the portions that are not covered by the media 1310. The multi-media printer applies a smoothing and edge detection algorithm to the data to allow the location of the edge of the media 1310 to be measured with respect to the sensor's 1302 linear array of detectors 1312. Due to the geometry of the placement, it may be necessary to use more than one illumination source to achieve a sensing range that is adequate. The illumination sources 1306 and 1308 can be turned on one at a time while the edge of the media 1310 is sensed in order to achieve a sensing range that is adequate.

The use of multiple illuminators 1306 and 1308 also provides the ability to use triangulation to determine the location of the edge of the media 1310 in three dimensions.

FIG. 14 illustrates an embodiment of the invention using a lens or series of lenses for edge detection according to an embodiment of the present invention. A lens 1402 or series of lenses may be used to collimate the light emitted from the illumination source 1304 and reduce or eliminate geometry considerations. FIG. 14 illustrates a sample configuration for using the lens 1402 to collimate the light and allow for a larger sensing range by the linear array 1312 in the sensor 1302.

In an embodiment of the invention, linear detecting arrays 1312 of the sensors 1302 could be placed in the media path. FIG. 15 illustrates a placement of a leading edge sensor and a side edge sensor according to an embodiment of the present invention. One sensor 1502 could be used to detect the leading edge of the media 1310. A second sensor 1504 may be used to detect the side edge of the media 1310.

In an embodiment of the invention where multiple media widths are supported, multiple sensors could be placed properly to detect the edge of the different medias 1310. In one embodiment of the invention, the location of the opposite edge, e.g., side, of the media 1310 is calculated using the measured location of a primary edge and the known width of the media. In an alternate embodiment of the present invention, two side edge-detection sensors 1504 and 1506 are used, one for each side edge of the media. This eliminates errors due to inconsistent media width.

In the case where the leading or trailing edge of the media 1310 is being detected, these methods could be adapted slightly to better suit the application. Instead of using a linear sensing array for optical detection, a single optical sensor can be used to detect the media as it passes by the sensor. FIG. 16 illustrates a linear array slightly from a line that is parallel to an edge of media according to an embodiment of the invention. For more accurate edge location measurement, a linear sensing array 1312 of the sensor 1602 can be placed in an orientation where the linear array 1312 is angled slightly from the line that is parallel to the edge of the media. When the leading or trailing edge of the media 1310 is partially covering the sensor 1602, some of the photosensitive elements will be covered while others are not. By analyzing all of the elements of the sensor 1602, the precise location of the leading edge can be determined.

Once the edge location of the media 1310 is known with respect to the sensor, this information needs to be extended to calculate the location of the edge of the media with respect to the thermal print head. In the case of detecting the leading edge of the media 1310, a black bar can be printed on an image and then feed forward or backward until it is detected by the sensor. By keeping track of the distance moved between printing the black bar and detecting the black bar, the distance between the thermal print head and the sensor can be calculated.

FIG. 17 illustrates a calibration test pattern that is utilized to detect a side edge of the media according to an embodiment of the present invention. To correlate the location of a sensor that detects the side edge of the film, a test pattern can be printed and then fed forward and backward and detected by a side edge sensor 1604. The location of the edges of the test pattern 1602 with respect to the thermal print head 1606 is known since the thermal print head 1606 imaged the calibration pattern 1602. The edge sensor 1604 is then used to detect the various steps of the test pattern 1602 edge. These known thermal print head 1606 locations and detected sensor locations 1604 can be used to create a transfer function that maps edge sensor locations to thermal print head locations.

To allow optical detection of the edge of both opaque and transparent media, a series of polarizers can be used. Two sets of circular polarizers are arranged in a way such that one set, consisting of a linear polarizer followed by a quarter-wave retarder arranged at a 45-degree angle from the polarizing axis of the linear polarizer, causes emitted light of the sensing system to be circularly polarized. The second set of circular polarizers is formed by a quarter-wave retarder followed by a linear polarizer. When arranged properly, the second set of quarter wave retarders decodes the circularly polarized light. The two linear polarizers are arranged normal to each other such that decoded light is almost completely stopped. Addition of film media between the circular polarizers allows more light to pass due to a scrambling of the circular polarization. In normal operation, light is not completely stopped, so a measurable amount of light is transmitted. This system allows opaque and transparent media types to be detected. Opaque light further reduces the small amount of light that transmits during unhindered operation. Transparent media increases the light transmittal. Both of these configurations can be sensed for detecting the presence of media.

In an alternative embodiment, the linear polarizers at the outer layers of the polarizing system are positioned with the polarizing axes parallel to each other rather than normal or nearly normal to each other. With this configuration, the second set of polarizers decodes the circularly-polarized light and allows light to pass through the system in normal operation. In this configuration, the addition of opaque media reduces light transmittal and can be detected. In this configuration, the addition of clear or translucent media also reduces the amount of light retransmitted. By scrambling the circular polarization, the transparent or translucent media makes the decoding performed by the second set of circular polarizers imperfect, causing more light to be attenuated by the final linear polarizer than in the nominal case. This behavior allows the presence of both opaque and transparent media types to be detected.

For purposes of full-bleed printing, this polarization apparatus can be used in conjunction with the sensing systems described above for detection of the leading edge, trailing edge, and side edges of the media 1310.

Alternative embodiments of the inventions utilize means other than a linear photodetection array for detecting the lateral position of the media. In one alternative embodiment of the invention, a mechanical cam is placed in the media path in a location crossing the range of lateral locations of the media edge. As media passes the cam, the cam rotates out of the path of the media in relation to the lateral position of the media. By detecting the degree of rotation, the lateral position of the media can be computed. Any mechanism available for detecting degree of rotation can be used for detecting the cam motion. The mechanisms may include, but are not limited to, optical encoders, electrical synchronous encoders, electrical hall effect encoders, other electrical encoders, switches, switch contacts, etc.

In an alternative embodiment, a linear array of mechanical fingers that contact an electrical plate are placed in the media path, roughly normal to the direction of media motion, and overlapping the range of lateral edge positions of the media. As the media moves past them, the mechanical fingers either make electrical contact with the common electrical plate or the mechanical fingers do not make electrical contact, depending on whether or not the media is present between them or not. By decoding the point at which contact stops, the lateral position of the media can be computed.

In an alternative embodiment of the present invention, a linear array a mechanical switches are placed in the media path, roughly normal to the direction of media motion, and overlapping the range of lateral edge positions of the media. As the media moves past them, the switches open or close depending on whether the media is under them or not. By decoding the point at which the array of switches changes state from open to closed, the lateral position of the media can be computed.

In an alternative embodiment of the present invention, a mechanical gauge or linear encoder is placed in the media path in a location crossing the range of lateral locations of the media edge. As media passes the gauge or linear encoder, the lateral position of the media is measured. By detecting the measured output of the gauge, the lateral position of the media can be computed.

The location of the media in the direction of travel can be monitored utilizing an encoder wheel that is coupled to the media motion via a tracking wheel. Once the position of the media within the printer media path is known, adjustments can be made to the image to allow full-bleed imaging. To compensate for lateral media location variation, the image can be moved laterally with respect to the media before imaging is begun. Alternatively, the image can remain in the same location while the size of the image borders or margins can be increased or decreased to compensate for media lateral location. One method for adjusting the border width is to create a border that extends beyond the edge of the media and then appropriately "blank" or erase the portions that do not need printed.

While the media is being imaged, the image borders can be dynamically adjusted to compensate for media skew and to maintain a consistent distance from the edge of the border to the edge of the media. In the areas where the media has rounded corners or any other non-rectangular shape, the image border can likewise be dynamically adjusted to maintain a consistent distance from the edge of the border to the edge of the media. Various techniques could be used to diminish the appearance of the changes in border width when there is dynamic compensation for skew. Generating a border width at each line down the page utilizing a smoothed running average of edge locations would prevent erroneous edge readings from affecting the image. Also, anti-aliasing could be used to smooth the transition from one border width to a different border width. In one embodiment of the invention, the borders are blanked in the frame buffer as the image is being printed. This requires logic to continuously detect the location of the edge of the media and modify each line in the frame buffer in advance of the time that line is imaged. In an alternate embodiment of the present invention, the logic that transfers image data or pulse stream data from the frame buffer to the thermal print head modifies the border and corner-rounding data as it is being transferred. The logic could be configured to blank any pixels that are outside of a specified pixel range that corresponds to the pixels that would image on the page.

FIG. 18 illustrates image data before and after edge blanking according to an embodiment of the present invention. When the end of the media is reached during the imaging process, the measured media skew data can be used to modify the final image lines to prevent imaging off the edge of the media and yet maintain a consistent distance between the edge of the border and the edge of the film. This may be referred to as edge blanking.

If the image does not contain a border, the above techniques can still be used. Instead of adjusting the size of the border, the image data that would otherwise overlap the edge of the media can be "blanked" and therefore not imaged.

Color mapping from display devices to printing devices is extremely important in medical or health imaging. Display devices produce a temporary visual representation of data known as a display image. Print devices produce a permanent visual representation of data known as a print image. Differences in how display devices and print devices convert data into a visual representation may result in different color representations for the same data. The purpose of mapping colors from display devices to print devices is to produce a print image that is an acceptable representation of a display image. The intended use of the print image can affect the characteristics of the methods used to map the colors. When the intended use of the print image is medical diagnosis, control over the mapping of colors has significant importance. The problem of mapping colors between devices can be classified in two general areas. First, a given data set will produce different colors on different devices. Second, the gamut (a.k.a. color space) of each device can vary. Gamut is defined as all the colors a device can visually represent. Since different devices have different gamuts, there are colors on some devices that cannot be presented on other devices. This problem particularly applies to colors that are highly saturated. Print devices typically have smaller color spaces than display devices which makes the problem of color mapping more difficult when mapping from display images to print images.

Many methods have been developed to handle the mapping of colors from display devices to print devices. Most of these methods are based on the needs of graphic design and photographic applications. For diagnostic medical applications, the existing methods have proven inadequate. Color medical images often use a psuedo-color scheme that assigns each digital value of the image to a specific color. Typically, color medical images use 256 values of colors for each pixel of the image. Each of the 256 values is assigned to a unique color. Many of the color schemes used on medical images include highly saturated colors. These colors have been carefully selected to assign diagnostic meaning to digital values of the image. The use of specific colors and the transitions between colors is an important diagnostic component of the image. Achieving an acceptable color mapping from display images to print images is required to preserve the diagnostic information in the image.

To effectively map display device colors to print device colors for diagnostic medical applications, the methods used for mapping colors must require that all uniquely identifiable colors on the display image will have corresponding uniquely identifiable colors on the print image. In other words, out of gamut colors (colors that cannot be represented by the print device) must be represented in such a way that new colors are selected that preserve the uniquely identifiable nature of each color. While it is desirable to have colors on the print image match the colors on the display image, the greater concern is to find a color mapping that preserves the uniqueness of each color. This often means shifting highly saturated colors, as viewed on the display device, to a new range of colors on the print device that allows all the colors to be uniquely identified on the print image.

Another problem of mapping colors from a display device to a print device for diagnostic medical applications is a lack of profiling of the display device. The expectation is that the print device will provide adequate configuration and adjustment mechanisms to provide an acceptable hardcopy print image. The display device and software that generate the image data for the display device are validated as a functional unit by a governmental entity. Modification of the display unit and associated software is usually not an option because this could alter the efficacy and safety of the medical device. Therefore, the print device must provide all the adjustments to adapt to the image device.

Methods of color mapping that meet the requirements of hardcopy print images for diagnostic medical applications and other applications where more control is required are as follows:

1. Use of an orthogonal transformation matrix that maps display colors to print colors. The matrix is set up in an RGB representation with each axis representing one color channel (Red, Green or Blue). This allows the entire data set that defines the color space of the display device to be represented.

2. The transformation matrix is constructed such that the position in the matrix represents the RGB data associated with the color on the display device.

3. The transformation matrix can be divided into a plurality of equally spaced sample points that are specific mappings of individual display colors to print colors using the RGB color representation. Each axis has the same number of equally spaced sub-divisions. Example: If the RGB channels each have 256 color values from 0 to 255, and the number of sub-divisions is 4, then the sample points on each axis would be 0, 64, 128, 192.

4. The number of sub-divisions along each axis can be increased to allow a more control over the mapping of the colors. This provides for more accurate mapping of the colors and provides a method to improve the handling of out of gamut colors.

5. The sub-divisions along each color axis define a plurality of sub-matrices that are orthogonal and equal in size. These sub-matrices form a logical cube with the corners defining 8 color mappings from the screen device to the print device.

6. An algorithm for transforming the incoming display colors to corresponding print colors by performing an interpolation of the screen color using the 8 RGB end-points of the sub-matrix that encloses the color and creating a mapped print device color.

7. An algorithm that determines the color saturation of the input display device color and uses that information to identify those colors that are close to a pure grayscale color. As the saturation of a color approaches zero, the color becomes more grayscale.

8. A tolerance is specified that allows identification of those colors close to pure grayscale for additional processing of that color.

9. Colors that are within the tolerance for pure grayscale are handled by the first color mapping algorithm and a second color mapping algorithm to provide a more continuous range of print device grayscale colors that show no discontinuities in the printed colors close to grayscale.

10. A second color-mapping algorithm is applied to colors within the grayscale tolerance to provide a true grayscale mapping that is continuous along the entire range of input values.

11. An adjustment to RGB values produced by the second color-mapping algorithm is performed to allow the RGB representation of a pure grayscale color to be shifted slightly in hue to provide a more desirable grayscale tone.

12. A weighed average of grayscale colors within the grayscale tolerance is used to provide a smooth transition from the first color-mapping algorithm to the second algorithm. This eliminates discontinuities and undesirable color hue shifts in pure grayscale colors.

Following is a pseudo-code description of color mapping method for converting display device colors to print device colors. This may be referred to as the color mapping module.

Define the transformation matrix. The transformation matrix represents a sampling of the color space of the display device and maintains a corresponding mapping to the print device color. The matrix has one axis for each color component of the display device. (Example: A display device using a color system based on red, green and blue would have 3 color components and therefore 3 axes, illustrated in FIG. 20.) Each axis represents the entire range of valid data for that color component. Each axis is divided into equal sized sub-divisions. The number of sub-divisions can differ from axis to axis. End points are at the intersections of the sub-divisions on a given axis. There are always one more end point per axis than there are sub-divisions.

DEFINE THE TRANSFORMATION_MATRIX.

Assign the number of sub-divisons along each axis of The transformation matrix. Increasing the number of Sub-divisions on each axis increases the accuracy of The mapping algorithm. Each axis can have a unique Number of sub-divisions.

DEFINE AXIS_SUB_DIVISION.

Calculate the number of end points on each axis. The number of end points is always one greater than the number of sub-divisions.

AXIS_END_POINTS = AXIS_SUB_DIVISIONS+1.

Assign color mapping data to the transformation matrix. The intersections of the end points for the axes defines the sample data set on the display device. The colors defined in the sample data set are visualized on the display device and a corresponding color selected on the print device. Selection of the corresponding print device color is a key element in the success of mapping colors from display devices for medical applications. The print device colors must be selected to maintain uniqueness of the colors through the mapping algorithm. This is best done by human visualization of colors from the display device and the print device along with analysis of the numerical data representing the colors. This ensures that the transformation algorithm has a sufficient range of data representing colors to allow mapping of the critical display device colors to unique print device colors in all cases. The transformation matrix, an example of which is shown in FIG. 21, maintains the relationship between the display device sample color set and the print device corresponding colors.

```
FOR EACH DISPLAY DEVICE SANOLE COLOR
  DEFINED BY THE INTERSECTION OF AXIS_END_
  POINTS OF ALL AXES IN THE TRANSFORMATION
  MATRIX.
BEGIN.
  DEFINE CORRESPONKING PRINT DECICE COLOR.
  MAP DISPLAY DEVICE SAMPLE COLOR TO CORE-
    SPONDING PRINT DEVICE COLOR IN TRANS-
    FORMATION MATRIX.
END.
```

Process data from a display image. A display image is comprised of data representing colors. A single data element from a display image is called a pixel. Each pixel of the display image must be mapped to a corresponding colors on the print device. This is done using the data representation of a given display image pixel and locating the closest end point intersections in the transformation matrix, an example of which is illustrated in FIG. 22, that enclose that particular pixel. The relative position of the display image pixel within the region is calculated and the corresponding print device color is interpolated.

```
FOR EACH PIXEL IN DISPLAY IMAGE.
BEGIN.
  INPUT NEXT DISPLAY_PIXEL.
  IF THE COLOR OF THE CURRENT DISPLAY_PEXEL
    EQUALS A DISPLAY DEVECE SAMPLE COLOR.
  THEN.
    PRINT_PIXEL = CORRESPONDING PRINT
      DEVICE COLOR.
  ENDIF.
  LOCATE THE REGION DEFINED BY THE CLOSEST
    AXIS END POINT INTERSECTIONS IN THE
    TRANSFORMATION MATRIX THAT ENCLOSES
    THE CURRENT DISPLAY_PIXEL.
  DETERMINE THE RELATIVE POSITION WITH THE
    CURRENT DISPLAY_PIXEL INSIDE THE REGION.
  CALCULATE THE PRINT DEVICE COLOR THAT
    CORRESPONDS TO THE CURRENT DISPLAY
    IMAGE PIXEL BY INTERPOLATION.
    PRINT_COLOR = INTERPOLATED PRINT DEVICE
      COLOR.
```

Adjust print image colors to improve grayscale continuity and hue of grayscale colors when printed on color media.

Identify display image colors that are close to pure grayscale by examining the saturation of the color. A tolerance is used to select those colors close to pure grayscale for additional processing. Colors that are within the tolerance for pure grayscale are processed by a second color mapping algorithm to provide a more continuous range of grayscale colors on the print device. A weighed average of grayscale colors within the grayscale tolerance is used to provide a smooth transition from the first color mapping algorithm to the second algorithm. This eliminates discontinuities and undesirable color hue shifts in pure grayscale colors.

```
  DEFINE GRAYSCALE_SATURATION_TOLERANCE.
  CALCULATE SATURATION OF DISPLAY_PIXES.
  IF SATURATION OF DISPLAY_PIXEL IS WITHIN
    GRAYSCALE_SATURATION_TOLERANCE.
  BEGIN.
    CALCULATE THE PURE GRAYSCALE_PRINT_
      PIXEL FROM THE COLOR COMPONENTS OF
      THE PRINT_PIXEL.
    CALCULATE THE PURE GRAYSCALE_DISPLAY_
      PIXEL FROM THE COLOR COMPONENTS OF
      THE DISPLAY PIXEL.
    ADJUST COLOR COMPONENTS OF THE PURE
      GRAYSCALE_DISPLAY_PIXEL TO PROVIDE
      THE NESESSATY HUE SHIFT TO PRODUCE
      WARMER OR COLOR GRAYSCALE HUES ON
      THE PRINT DEVICE.
    CALCULATE AN ADJUSTED PRINT_PIXEL
      USING THE RELATIVE POSITION OF THE
      SATURATION OF THE DESPLAY_PIXEL
      BETWEEN PURE GRAYSCALE AND THE GRAY-
      SCALE SATURATION TOLERANCE AS AND
      THE GRAYSCALE_SATURATION_TOLER-
```

ANCE AS THE BASIS FOR INTERPOLATING BETWEEN THE PRINT_PIXEL AND THE GRAY-SCALE_PRINT_PIXEL.

END.

OUTPUT PRINT_PIXEL.

END.

End of color mapping procedure psuedocode.

FIG. 19 illustrates a flowchart for multiple registration on media in a multi-media printer according to an embodiment of the present invention. A method was developed for registering the multiple color passes in the CMY or CMYK thermal transfer process such that the individual passes overlap each other correctly. This improves three-pass or 4-pass registration such that laser-printing quality is more accurately presented.

The registration invention makes use of the methods described in the Full Bleed Printing for sensing the lead edge of the color media with a high degree of accuracy. With this information, the media can be positioned to same location in the print mechanism prior to printing each color pass. This positioning compensates for error in media motion resulting from differences in image data applied to different color passes. It also compensates for error in media motion that arises because forward motion during printing on the media has different mechanical loading characteristics than does rewind motion when no printing is performed on the media. Without re-detecting the lead edge of the media on each pass, it is not possible to mechanically rewind the media to the same starting position for each color pass with the required degree of registration accuracy. This method allows thermal printing devices to more effectively produce color output quality expected from laser hardcopy devices.

In the registration process illustrated in FIG. 19, a media is picked or selected 1902. The media leading edge is detected 1904 with a sensor. The media is rewound 1906, or transported in a reverse direction, a known distance to the start of where the imprinting is to occur on the media. The media lead edge is redetected 1908 for positional accuracy. The media is imprinted 1910 on color pass N. If the media has not reached the maximum number of passes for the print, the media is rewound or transported 1912 in a reverse direction. After the media is rewound or transported in the reverse direction, the media leading edge is redetected 1908 for positional accuracy and the next color is imprinted 1910 on the media. After the maximum number of passes of the color print have occurred, the media is ejected 1914.

What is claimed:

1. A method of density control for imaging output devices, comprising:

storing a first profile, the first profile identifying densities produced on a media by a thermal element and the associated temperature of a heat sink of the thermal element; and storing a second profile, the second profile identifying densities produced on the media by the thermal element and the associated energy applied to the thermal element.

2. The method of claim 1, further including:

measuring a temperature of the heat sink; and adjusting an energy applied to the thermal element to obtain a desired density utilizing the stored first profile and the stored second profile.

3. The method of claim 2, wherein adjusting the energy applied to the thermal element includes:

retrieving an expected temperature for the heat sink of the thermal element;

subtracting the expected temperature from the measured temperature to determine a difference temperature value for the heat sink;

utilizing the difference temperature value to determine a delta density value from the first profile; and determining an adjustment in the applied energy based on the determined delta density value utilizing the second profile.

4. The method of claim 2, wherein the energy is adjusted by adjusting a pulse width of pulses applied to thermal element.

5. The method of claim 2, wherein the energy is adjusted by adjusting a voltage level of the pulses applied to the thermal element.

6. The method of claim 2, wherein the energy is adjusted by adjusting a composition of bits in a stream of energy pulses applied to the thermal element.

7. The method of claim 1, further including storing an additional plurality of first profiles, each of the additional plurality of first profiles relating to a unique starting temperature for the imaging output device and each of the additional plurality of first profiles identifying densities produced on a media by a thermal element and the associated temperature of a heat sink of the thermal element, storing an additional plurality of second profiles, each of the additional plurality of second profiles relating to a unique starting temperature for the imaging output device and each of the additional plurality of second profiles identifying densities produced on the media by the thermal element and the associated energy applied to the thermal element, selecting one first profile and one second profile based on a starting temperature of the printer; and selecting an energy adjustment to be applied to the thermal element during printing, the selection utilizing the selected one first profile and the selected one second profile.

8. A method of density control for output devices, comprising:

storing a first profile, the first profile identifying a change in energy applied to the thermal element in relation to a temperature of a heat sink needed to obtain a corresponding density; and measuring an actual temperature of the heat sink; and adjusting an energy applied to the thermal element to obtain a desired density utilizing the stored first profile and the measured temperature.

9. A method of density control, comprising:

printing, by a printer, a plurality of areas of an image on a calibration media, each of the plurality of areas having a different energy applied;

measuring densities of each of the plurality of areas of the calibration media and storing the measured densities with the corresponding energy;

identifying a number of densities corresponding to a number of areas of the calibration media which surround a target density reading, the target density reading being a density of a reference printer printing on a media from a same group of media as the calibration media; and interpolating an adjusted energy value to be applied to the thermal element to achieve the target density, the adjusted energy value being based on the target density, the measured densities, and corresponding energy levels used to produce the measured densities.

10. The method of claim 9, wherein a number of densities includes a first density and a second density corresponding to a first area of the calibration media and a second area of the calibration media, further including determining a density ratio by dividing a difference between the target density and the first density by a difference between the second density and the first density, and interpolating the adjusted energy value to be applied to the thermal element by adding a first energy corresponding to the first area to the density ratio multiplied by the difference between a second energy corresponding to the second area and the first energy.

11. The method of claim 9, wherein non-linear equations are utilized in interpolating the adjusted energy value.

12. The method of claim 9, further including determining a percentage change in energy based on a change in energy required to produce the target density on the calibration media by the printer, and applying the percentage change in energy to a nominal energy required to print on the printer on other media before printing on the other media besides the calibration media.

13. A method of density control for a printer, comprising:

measuring a density for a plurality of points on a uniform gray value image, the plurality of points each representing a pixel;

generating a profile, the profile identifying the measured density for each of the plurality of points;

identifying density variation for each of the plurality of points due to bowing of the print head; and pre-adjusting a new image being printed on the printer including the plurality of points based on the identified density variation of each of the plurality of points.

14. A method of density control for a printer, comprising:

generating a density change profile for each of a plurality of points, where the plurality of points each represent a pixel and the generated profile is based on a prediction of the effect of printhead bowing; and pre-adjusting a new image being printed on the printer which includes the plurality of points based on the density change profile for each of the plurality of points.

15. A method of density control for an imaging device, comprising:

setting a plurality of energy storage elements and a plurality of energy transfer impedances to initial values, the energy transfer impedances being impedances between adjacent energy storage elements, the plurality of energy storage elements and the plurality of energy transfer impedances representing the imaging device;

converting each pixel in a line of image data into a line of desired energy values;

comparing a potential developed by energy stored in a first level of energy storage elements to a nominal potential developed by nominal energy expected in each of the first level of energy storage elements to generate a delta potential value for the first level of energy storage elements; and compensating the desired energy value for each of the pixels in the line of image data based on the delta potential value for the first level of energy storage elements to produce an adjusted energy value for each of the pixels in the line of image data.

16. The method of claim 15, wherein the plurality of storage elements and the plurality of energy transfer impedances form a two-dimensional model of the imaging device, the two-dimensional model including the first level of storage elements and additional levels of storage elements behind storage elements in the first level of storage elements, wherein the first level of storage elements corresponds to imaging elements of the imaging device which correspond to pixels in the line of image data;

introducing a portion of the adjusted energy value to the first level of the energy storage elements;

propagating the portion of the adjusted energy value across the first level of the energy storage elements; and propagating the portion of the adjusted energy value from the first level of the energy storage elements to a second level of energy storage elements to simulate an operation of the imaging device, the second level of energy storage elements being part of the additional levels of storage elements.

17. The method claim 16, further including propagating the portion of the adjusted energy value from the second level of energy storage elements to remaining levels of the additional levels of storage elements.

18. The method of claim 16, wherein propagating the portion of the adjusted energy across the first level of storage elements of the two-dimensional model includes:

calculating an average potential of a number of storage elements to each side of each storage element within the first level of energy storage elements;

calculating a difference between the potential of each of the energy storage elements and the calculated average potential for the surrounding energy storage elements for each of the energy storage elements in the first level; and adjusting the potential of each of the energy storage elements in the first level of energy storage elements based on the calculated differences.

19. The method of claim 16, wherein propagating the portion of the adjusted energy from the first level of energy storage elements to the second level of energy storage elements includes calculating a difference in potential between at least one storage element in the first level and the corresponding at least one storage element in the second level, dividing the calculated difference by the thermal impedance between the at least one storage element in the first level and the corresponding at least one storage element in the second level to determine the amount of energy transferred between the at least one storage element in the first level and the corresponding at least one storage element in the second level during the simulated printing operation; and computing the resulting energy and resulting potential for the at least one storage element in the first level and the corresponding at least one storage element in the second level resulting from the determined transferred energy.

20. The method of clam 19, further including storing, in the model, the resulting energy and resulting potential for the at least one storage element in the first level and the corresponding at least one storage element in the second level.

21. The method of claim 16, wherein propagating the portion of the adjusted energy value includes utilizing non-linear equations to compute the energy transferred between the first level of the energy storage elements and at least the second level of the energy storage elements.

22. The method of claim 16, wherein propagating the portion of the adjusted energy value includes utilizing exponential heat transfer equations to compute the energy transferred between the first level of energy storage elements and at least the second level of energy storage elements.

23. The method of claim 15, wherein the potential is a temperature, the impedance is a thermal impedance, and the storage element represents a thermal capacitance, and the energy flow is heat.

24. The method of claim 15, wherein the potential is a voltage, the impedance is an electrical impedance, and the energy storage element represents an electrical capacitance, and the energy flow is electrical current.

25. The method of claim 15, wherein the plurality of storage elements and the plurality of energy transfer impedances form a two-dimensional model of the imaging device, the two-dimensional model including a first level of energy storage elements and values of energy transfer impedance between adjacent storage elements in the first level of energy storage elements and at least a second level of storage elements behind each storage element in the first level of storage elements and including values of energy transfer impedance between corresponding storage elements in the first level and the second level, wherein the first level of storage elements corresponds to imaging elements in the imaging device which correspond to pixels in the line of image data;

applying a portion of the adjusted energy value for each of the pixels to a first level of the energy storage elements which correspond to each of the pixels;

propagating the portion of the adjusted energy value across the first level of storage elements; and propagating the portion of the adjusted energy value through the first level of storage elements and the remaining levels of storage elements to simulate a printing operation of the imaging device which results in an updated energy value in the first level of storage elements and the remaining levels of storage elements, wherein the applying step and propagating step occur more than once to further refine the simulation of the printing operation of the imaging device.

26. A method of density control for an imaging device, comprising:

setting a plurality of energy storage elements and a plurality of energy transfer impedances to initial values, the energy transfer impedances being impedances between adjacent energy storage elements, the plurality of energy storage elements and the plurality of energy transfer impedances representing the imaging device, the plurality of storage elements and the plurality of energy transfer impedances forming a three-dimensional model of the imaging device, the three-dimensional model including a plurality of first levels of storage elements and additional levels behind the storage elements in each of the plurality of first levels, wherein a selected first level of the plurality of first levels of energy storage elements corresponds to imaging elements of the imaging device which correspond to pixels in a line of image data;

converting each pixel in the line of image data into a desired energy value;

comparing a potential developed by energy stored in a selected first level of the plurality of first levels of energy storage elements to a nominal potential developed by nominal energy expected in each of the selected first level of energy storage elements to generate a delta potential value for the selected first level of energy storage elements;

compensating the desired energy value for each of the pixels in the line of image data based on the delta potential value for the selected first level of energy storage elements to produce an adjusted energy value for each of the pixels in the line of image data;

introducing a portion of the adjusted energy value to the selected first level of the energy storage elements; and propagating the portion of the adjusted energy value across the selected first level of the energy storage elements;

propagating the portion of the adjusted energy value from the selected first level of the energy storage elements to the additional levels behind the selected first level of energy storage elements and also the remaining plurality of first levels of energy storage elements along with the additional levels behind a remaining plurality of first level of energy storage elements to simulate an operation of the imaging device.

27. A method of density control for an imaging device, comprising:

setting a plurality of energy storage elements and a plurality of energy transfer impedances to initial values, the energy transfer impedances being impedances between adjacent energy storage elements, the plurality of energy storage elements and the plurality of energy transfer impedances forming a two-dimensional model of the imaging device, the two-dimensional model including the first level of energy storage elements and additional levels of energy storage elements behind the storage elements in the first level of storage elements, wherein the first level of storage elements corresponds to imaging elements of the imaging device which correspond to pixels in the lines of image data;

generating a line of image data representing a medical image acquired by a medical imaging device;

converting each pixel in the generated line of image data into an acquired energy value in a line of desired energy values;

comparing a potential developed by energy stored in a first level of energy storage elements to a nominal potential developed by nominal energy expected in each of the first level of energy storage elements to generate a delta potential value for the first level of energy storage elements;

adjusting the acquired energy value for each of the pixels in the line of image data based on the delta potential value for the first level of energy storage elements to produce an adjusted acquired energy value for each of the pixels in the line of image data introducing a portion of the adjusted acquired energy value to the first level of the energy storage elements;

propagating the portion of the adjusted acquired energy value across the first level of the energy storage elements; and propagating the adjusted acquired energy value from the first level of the energy storage elements to a second level of energy storage elements to simulate an operation of the imaging device, the second level of energy storage elements being part of the additional levels of storage elements.

* * * * *